United States Patent
Zambetti et al.

(10) Patent No.: US 10,503,388 B2
(45) Date of Patent: Dec. 10, 2019

(54) CROWN INPUT FOR A WEARABLE ELECTRONIC DEVICE

(71) Applicant: Apple Inc., Cupertino, CA (US)

(72) Inventors: Nicholas Zambetti, San Francisco, CA (US); Imran Chaudhri, Cupertino, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Chanaka G. Karunamuni, San Jose, CA (US); Duncan Robert Kerr, San Francisco, CA (US); Stephen O. Lemay, Palo Alto, CA (US); Christopher Wilson, San Francisco, CA (US); Eric Lance Wilson, San Jose, CA (US); Lawrence Y. Yang, San Francisco, CA (US); Gary Ian Butcher, San Jose, CA (US); Jonathan P. Ive, San Francisco, CA (US); Kevin Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/049,049

(22) Filed: Feb. 20, 2016

(65) Prior Publication Data

US 2016/0170598 A1    Jun. 16, 2016

Related U.S. Application Data

(63) Continuation of application No. 14/913,345, filed as application No. PCT/US2014/053951 on Sep. 3,
(Continued)

(51) Int. Cl.
*G06F 3/048* (2013.01)
*G06F 3/0485* (2013.01)
(Continued)

(52) U.S. Cl.
CPC ............ *G06F 3/0485* (2013.01); *G06F 1/163* (2013.01); *G06F 3/0362* (2013.01)

(58) Field of Classification Search
CPC .......................................... G06F 3/0481–0489
See application file for complete search history.

(56) References Cited

U.S. PATENT DOCUMENTS

| 4,395,134 | A | * | 7/1983 | Luce ...................... G04B 47/00 368/10 |
| 5,088,070 | A | * | 2/1992 | Shiff ...................... G04G 21/00 345/156 |

(Continued)

FOREIGN PATENT DOCUMENTS

| AU | 2007283771 A1 | 4/2008 |
| AU | 2008201540 A1 | 6/2008 |

(Continued)

OTHER PUBLICATIONS

YouTube.com, Author unknown; "watchpad 1.5 demo"; retreived from https://www.youtube.com/watch?v=7xjvVbeUn80, pp. 1-9 submitted Jun. 20, 2010.*

(Continued)

*Primary Examiner* — Steven B Theriault
(74) *Attorney, Agent, or Firm* — Dentons US LLP

(57) ABSTRACT

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount
(Continued)

of rotation of the crown, respectively. In some examples, the amount of scrolling or scaling can be proportional to the change in rotation angle of the crown. In other examples, a speed of scrolling or a speed of scaling can depend on a speed of angular rotation of the crown. In these examples, a greater speed of rotation can cause a greater speed of scrolling or scaling to be performed on the displayed view.

27 Claims, 45 Drawing Sheets

Related U.S. Application Data 2014, which is a continuation-in-part of application No. 14/476,657, filed on Sep. 3, 2014, now abandoned.

(60) Provisional application No. 61/873,356, filed on Sep. 3, 2013, provisional application No. 61/959,851, filed on Sep. 3, 2013, provisional application No. 61/873,359, filed on Sep. 3, 2013, provisional application No. 61/873,360, filed on Sep. 3, 2013.

(51) Int. Cl.
G06F 1/16 (2006.01)
G06F 3/0362 (2013.01)

(56) References Cited

U.S. PATENT DOCUMENTS

| | | | |
|---|---|---|---|
| 5,204,600 A | 4/1993 | Kahkoska | |
| 5,220,260 A | 6/1993 | Schuler | |
| 5,313,229 A * | 5/1994 | Gilligan | G06F 3/0312 345/157 |
| 5,477,508 A * | 12/1995 | Will | G04G 21/00 368/189 |
| 5,519,393 A * | 5/1996 | Brandestini | G01D 5/2492 341/10 |
| 5,528,260 A | 6/1996 | Kent | |
| 5,563,631 A * | 10/1996 | Masunaga | G05G 9/047 345/161 |
| 5,634,064 A | 5/1997 | Warnock et al. | |
| 5,691,747 A * | 11/1997 | Amano | G04G 21/00 345/156 |
| 5,739,775 A * | 4/1998 | Brandestini | G01D 5/2492 341/10 |
| 5,825,353 A * | 10/1998 | Will | G06F 1/1626 345/184 |
| 5,852,413 A * | 12/1998 | Bacchi | H03M 1/308 341/13 |
| 5,874,961 A * | 2/1999 | Bates | G06F 3/04855 715/786 |
| 5,903,229 A * | 5/1999 | Kishi | G06F 3/04883 178/19.01 |
| 5,940,521 A * | 8/1999 | East | H04H 60/04 381/119 |
| 5,960,366 A * | 9/1999 | Duwaer | G04G 21/04 368/13 |
| 5,982,710 A * | 11/1999 | Rawat | G04G 9/0076 368/21 |
| 6,061,063 A | 5/2000 | Wagner et al. | |
| 6,081,256 A | 6/2000 | Herget et al. | |
| 6,128,006 A | 10/2000 | Rosenberg et al. | |
| 6,141,018 A | 10/2000 | Beri et al. | |
| 6,157,381 A | 12/2000 | Bates et al. | |
| 6,161,957 A | 12/2000 | Guanter | |
| 6,192,258 B1 | 2/2001 | Kamada et al. | |
| 6,203,190 B1 * | 3/2001 | Stotz | G04C 3/005 368/190 |
| 6,266,098 B1 | 7/2001 | Cove et al. | |
| 6,297,795 B1 * | 10/2001 | Kato | G06F 1/1626 345/169 |
| 6,300,939 B1 * | 10/2001 | Decker | B60K 35/00 345/157 |
| 6,305,234 B1 * | 10/2001 | Thies | G01D 5/145 250/231.18 |
| 6,310,648 B1 * | 10/2001 | Miller | H04N 5/23293 348/333.05 |
| 6,323,846 B1 | 11/2001 | Westerman et al. | |
| 6,339,438 B1 | 1/2002 | Bates et al. | |
| 6,351,657 B2 * | 2/2002 | Yamada | H04M 1/274525 345/157 |
| 6,356,283 B1 | 3/2002 | Guedalia | |
| 6,396,482 B1 * | 5/2002 | Griffin | G06F 1/3215 345/156 |
| 6,477,117 B1 | 11/2002 | Narayanaswami et al. | |
| 6,501,487 B1 | 12/2002 | Taguchi | |
| 6,525,997 B1 * | 2/2003 | Narayanaswami | G04G 9/0082 368/223 |
| 6,535,461 B1 * | 3/2003 | Karhu | G04C 3/001 368/10 |
| 6,556,222 B1 * | 4/2003 | Narayanaswami | G04G 9/0064 368/295 |
| 6,570,557 B1 | 5/2003 | Westerman et al. | |
| 6,590,595 B1 | 7/2003 | Wagner et al. | |
| 6,636,197 B1 * | 10/2003 | Goldenberg | G05G 1/02 345/156 |
| 6,647,338 B1 * | 11/2003 | Hamberger | G01C 21/3664 345/184 |
| 6,650,343 B1 | 11/2003 | Fujita et al. | |
| 6,661,438 B1 * | 12/2003 | Shiraishi | G06F 1/1626 715/781 |
| 6,677,932 B1 | 1/2004 | Westerman | |
| 6,686,911 B1 | 2/2004 | Levin et al. | |
| 6,690,387 B2 | 2/2004 | Zimmerman et al. | |
| 6,700,564 B2 * | 3/2004 | McLoone | G06F 3/0213 345/156 |
| 6,720,860 B1 * | 4/2004 | Narayanaswami | G06F 21/31 340/5.54 |
| 6,788,220 B2 * | 9/2004 | Netzer | G01D 5/2415 33/1 N |
| 6,809,275 B1 * | 10/2004 | Cheng | H01H 25/008 200/11 TW |
| 6,809,724 B1 * | 10/2004 | Shiraishi | G06F 1/163 345/157 |
| 6,820,237 B1 | 11/2004 | Abu-Hakima et al. | |
| 6,842,169 B2 * | 1/2005 | Griffin | G06F 1/1626 341/35 |
| 6,967,642 B2 * | 11/2005 | SanGiovanni | G06F 3/0233 345/156 |
| 6,967,903 B2 * | 11/2005 | Guanter | G04G 11/00 368/224 |
| 6,985,178 B1 | 1/2006 | Morita et al. | |
| 7,046,230 B2 * | 5/2006 | Zadesky | G06F 1/1626 345/156 |
| 7,058,904 B1 | 6/2006 | Khan et al. | |
| 7,075,513 B2 * | 7/2006 | Silfverberg | G06F 1/1626 345/157 |
| 7,081,905 B1 * | 7/2006 | Raghunath | G04G 5/00 345/684 |
| 7,116,317 B2 * | 10/2006 | Gregorio | G06F 3/0482 345/184 |
| 7,130,664 B1 | 10/2006 | Williams | |
| 7,143,355 B2 * | 11/2006 | Yamaguchi | G06F 1/1616 709/203 |
| 7,146,005 B1 * | 12/2006 | Anft | H04M 1/23 345/157 |
| 7,168,047 B1 * | 1/2007 | Huppi | G06F 3/03543 345/165 |
| 7,227,963 B1 | 6/2007 | Yamada et al. | |
| 7,256,770 B2 * | 8/2007 | Hinckley | A63F 13/06 345/156 |
| 7,272,077 B2 * | 9/2007 | Nobs | G04G 9/0076 368/187 |
| 7,286,063 B2 * | 10/2007 | Gauthey | G06F 21/83 340/5.61 |

(56) References Cited

U.S. PATENT DOCUMENTS

| | | | |
|---|---|---|---|
| 7,286,119 B2* | 10/2007 | Yamaguchi | G06F 3/04815 345/156 |
| 7,317,449 B2* | 1/2008 | Robbins | G06F 3/0481 345/169 |
| 7,333,084 B2* | 2/2008 | Griffin | G06F 3/0362 345/156 |
| 7,339,573 B2 | 3/2008 | Andert et al. | |
| 7,463,239 B2* | 12/2008 | Ledbetter | G06F 3/0213 345/156 |
| 7,469,381 B2 | 12/2008 | Ording | |
| 7,469,386 B2* | 12/2008 | Bear | G06F 1/1632 715/771 |
| 7,477,890 B1 | 1/2009 | Narayanaswami | H04L 67/42 455/414.1 |
| 7,489,303 B1 | 2/2009 | Pryor | |
| 7,499,040 B2* | 3/2009 | Zadesky | G06F 3/0338 345/173 |
| 7,506,269 B2* | 3/2009 | Lang | G06F 1/163 715/786 |
| 7,519,468 B2* | 4/2009 | Orr | G01C 21/36 340/990 |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,794,138 B2* | 9/2010 | Hilfiker | A61B 5/02438 368/190 |
| 7,844,914 B2 | 11/2010 | Andre et al. | |
| 7,844,915 B2 | 11/2010 | Platzer et al. | |
| 7,856,255 B2* | 12/2010 | Tsuchiya | G06F 1/1616 200/11 TW |
| 7,890,882 B1 | 2/2011 | Nelson | |
| 7,916,157 B1 | 3/2011 | Kelley et al. | |
| 7,957,762 B2 | 6/2011 | Herz et al. | |
| 8,001,488 B1* | 8/2011 | Lam | G06F 3/0238 345/156 |
| 8,006,002 B2 | 8/2011 | Kalayjian et al. | |
| 8,009,144 B2* | 8/2011 | Yajima | H04M 1/0225 345/156 |
| 8,050,997 B1 | 11/2011 | Nosek et al. | |
| 8,140,996 B2* | 3/2012 | Tomkins | G06F 3/0485 715/730 |
| 8,209,606 B2 | 6/2012 | Ording | |
| 8,239,784 B2 | 8/2012 | Hotelling et al. | |
| 8,255,798 B2 | 8/2012 | Ording | |
| 8,279,180 B2 | 10/2012 | Hotelling et al. | |
| 8,307,306 B2* | 11/2012 | Komatsu | H04N 5/44513 715/834 |
| 8,311,727 B2* | 11/2012 | Eckstein | B60K 35/00 701/532 |
| 8,312,371 B2 | 11/2012 | Ording | |
| 8,365,090 B2 | 1/2013 | Ording | |
| 8,381,135 B2 | 2/2013 | Hotelling et al. | |
| 8,479,122 B2 | 7/2013 | Hotelling et al. | |
| 8,566,722 B2 | 10/2013 | Gordon et al. | |
| 8,627,236 B2 | 1/2014 | Jung et al. | |
| 8,686,944 B1* | 4/2014 | Charlton | G06F 3/0338 345/163 |
| 8,717,302 B1* | 5/2014 | Qin | G06F 3/044 178/18.06 |
| 8,799,816 B2* | 8/2014 | Wells | G06F 3/0482 715/830 |
| 8,824,245 B2* | 9/2014 | Lau | G04G 21/08 368/296 |
| 9,007,057 B2* | 4/2015 | Villaret | G01D 5/145 324/207.2 |
| 9,007,302 B1 | 4/2015 | Bandt-horn | |
| 9,007,323 B2 | 4/2015 | Araki | |
| 9,052,814 B2 | 6/2015 | Ording | |
| 9,104,705 B2* | 8/2015 | Fujinaga | G06F 17/30274 |
| 9,395,867 B2* | 7/2016 | Griffin | G06F 3/041 |
| 9,395,905 B2* | 7/2016 | Wherry | G06F 3/0485 |
| 9,442,649 B2 | 9/2016 | Davis et al. | |
| 9,823,828 B2 | 11/2017 | Zambetti et al. | |
| 2001/0004337 A1* | 6/2001 | Paratte | G04C 10/00 368/203 |
| 2001/0011991 A1* | 8/2001 | Wang | G06F 3/038 345/156 |
| 2001/0028369 A1 | 10/2001 | Gallo et al. | |
| 2002/0015024 A1 | 2/2002 | Westerman et al. | |
| 2002/0019296 A1* | 2/2002 | Freeman | A63F 13/02 482/4 |
| 2002/0027547 A1* | 3/2002 | Kamijo | G04G 21/00 345/157 |
| 2002/0030665 A1* | 3/2002 | Ano | G06F 1/1616 345/168 |
| 2002/0030668 A1* | 3/2002 | Hoshino | G06F 3/0338 345/175 |
| 2002/0036623 A1* | 3/2002 | Kano | G06F 3/03545 345/179 |
| 2002/0063684 A1 | 5/2002 | Tran | |
| 2002/0093578 A1 | 7/2002 | Kowno et al. | |
| 2002/0101458 A1* | 8/2002 | SanGiovanni | G06F 3/0233 715/863 |
| 2002/0118169 A1* | 8/2002 | Hinckley | G06F 3/0362 345/163 |
| 2002/0126099 A1 | 9/2002 | Engholm | |
| 2002/0154150 A1* | 10/2002 | Ogaki | G06F 1/1626 345/684 |
| 2002/0154175 A1 | 10/2002 | Abello et al. | |
| 2002/0171689 A1 | 11/2002 | Fox et al. | |
| 2002/0186621 A1* | 12/2002 | Lai | G04G 9/0058 368/82 |
| 2003/0025673 A1* | 2/2003 | Ledbetter | G06F 3/0213 345/163 |
| 2003/0076301 A1* | 4/2003 | Tsuk | G06F 1/1626 345/159 |
| 2003/0103044 A1 | 6/2003 | Sunda et al. | |
| 2003/0112279 A1 | 6/2003 | Irimajiri | |
| 2003/0115384 A1* | 6/2003 | Sonehara | G06F 1/1616 710/10 |
| 2003/0123329 A1* | 7/2003 | Guanter | G04G 11/00 368/82 |
| 2003/0142081 A1* | 7/2003 | Iizuka | G06F 1/1626 345/173 |
| 2003/0179239 A1 | 9/2003 | Lira | |
| 2003/0184525 A1 | 10/2003 | Tsai | |
| 2003/0189598 A1 | 10/2003 | Lipstein et al. | |
| 2003/0210286 A1* | 11/2003 | Gerpheide | G06F 3/04847 715/863 |
| 2004/0013042 A1* | 1/2004 | Farine | G04G 17/005 368/10 |
| 2004/0021676 A1 | 2/2004 | Chen et al. | |
| 2004/0027398 A1 | 2/2004 | Jaeger | |
| 2004/0047244 A1* | 3/2004 | Iino | G04B 47/00 368/276 |
| 2004/0056880 A1 | 3/2004 | Matsuoka et al. | |
| 2004/0085328 A1* | 5/2004 | Maruyama | G06F 3/0481 345/619 |
| 2004/0100479 A1 | 5/2004 | Nakano et al. | |
| 2004/0113819 A1* | 6/2004 | Gauthey | G06F 21/83 341/34 |
| 2004/0130580 A1* | 7/2004 | Howard | H04H 20/38 715/854 |
| 2004/0145595 A1 | 7/2004 | Bennett | |
| 2004/0150621 A1* | 8/2004 | Bohn | G06F 3/0312 345/163 |
| 2004/0155888 A1 | 8/2004 | Padgitt et al. | |
| 2004/0155907 A1* | 8/2004 | Yamaguchi | G06F 3/0481 715/810 |
| 2004/0170270 A1* | 9/2004 | Takashima | G01D 5/145 379/363 |
| 2004/0205624 A1 | 10/2004 | Lui et al. | |
| 2004/0218472 A1* | 11/2004 | Narayanaswami | G04G 9/02 368/10 |
| 2004/0225613 A1* | 11/2004 | Narayanaswami | G06Q 10/087 705/64 |
| 2004/0239692 A1 | 12/2004 | Balle et al. | |
| 2005/0001815 A1 | 1/2005 | Tsunoda | |

(56) References Cited

U.S. PATENT DOCUMENTS

| | | | |
|---|---|---|---|
| 2005/0001849 A1 | 1/2005 | Arcas | |
| 2005/0007884 A1* | 1/2005 | Lorenzato | G04F 5/025 368/10 |
| 2005/0012723 A1 | 1/2005 | Pallakoff | |
| 2005/0062729 A1 | 3/2005 | Hinckley et al. | |
| 2005/0081164 A1* | 4/2005 | Hama | G06F 3/0482 715/830 |
| 2005/0088418 A1 | 4/2005 | Nguyen | |
| 2005/0097466 A1* | 5/2005 | Levi Montalcini | G06F 3/0485 715/700 |
| 2005/0116941 A1* | 6/2005 | Wallington | G06F 3/0362 345/184 |
| 2005/0122806 A1 | 6/2005 | Arakawa et al. | |
| 2005/0168566 A1* | 8/2005 | Tada | G06F 1/1615 348/14.01 |
| 2005/0183012 A1 | 8/2005 | Petro et al. | |
| 2005/0183026 A1 | 8/2005 | Amano et al. | |
| 2005/0190059 A1 | 9/2005 | Wehrenberg | |
| 2005/0195216 A1 | 9/2005 | Kramer et al. | |
| 2005/0195373 A1 | 9/2005 | Feigel et al. | |
| 2005/0209051 A1* | 9/2005 | Santomassimo | A63B 24/00 482/8 |
| 2005/0215848 A1* | 9/2005 | Lorenzato | G04F 5/025 600/27 |
| 2005/0259077 A1* | 11/2005 | Adams | G06F 3/0213 345/163 |
| 2005/0275636 A1 | 12/2005 | Dehlin et al. | |
| 2006/0007129 A1* | 1/2006 | Pletikosa | G06F 1/1626 345/156 |
| 2006/0010400 A1 | 1/2006 | Dehlin et al. | |
| 2006/0017692 A1 | 1/2006 | Wehrenberg et al. | |
| 2006/0020904 A1* | 1/2006 | Aaltonen | G06F 3/048 715/850 |
| 2006/0025218 A1 | 2/2006 | Hotta | |
| 2006/0026521 A1* | 2/2006 | Hotelling | G06F 3/0418 715/702 |
| 2006/0026535 A1 | 2/2006 | Hotelling et al. | |
| 2006/0026536 A1 | 2/2006 | Hotelling et al. | |
| 2006/0028444 A1 | 2/2006 | Hinckley et al. | |
| 2006/0033724 A1 | 2/2006 | Chaudhri et al. | |
| 2006/0085764 A1 | 4/2006 | Klementiev et al. | |
| 2006/0092177 A1* | 5/2006 | Blasko | G04G 21/08 345/619 |
| 2006/0112350 A1* | 5/2006 | Kato | G06F 3/04845 715/781 |
| 2006/0136631 A1 | 6/2006 | Eid et al. | |
| 2006/0139375 A1 | 6/2006 | Rasmussen et al. | |
| 2006/0152480 A1 | 7/2006 | Senn | |
| 2006/0181506 A1* | 8/2006 | Fyke | G06F 3/0485 345/156 |
| 2006/0197753 A1 | 9/2006 | Hotelling | |
| 2006/0255683 A1 | 11/2006 | Suzuki et al. | |
| 2006/0268019 A1 | 11/2006 | Wang et al. | |
| 2006/0268020 A1 | 11/2006 | Han | |
| 2006/0274053 A1 | 12/2006 | Kinouchi | |
| 2006/0277454 A1 | 12/2006 | Chen | |
| 2006/0279533 A1 | 12/2006 | Hsieh et al. | |
| 2006/0288313 A1 | 12/2006 | Hillis | |
| 2006/0290671 A1* | 12/2006 | Bohn | G06F 3/0338 345/163 |
| 2007/0050732 A1 | 3/2007 | Chapman et al. | |
| 2007/0063995 A1 | 3/2007 | Bailey et al. | |
| 2007/0070090 A1 | 3/2007 | Debettencourt et al. | |
| 2007/0081726 A1 | 4/2007 | Westerman et al. | |
| 2007/0085841 A1 | 4/2007 | Tsuk et al. | |
| 2007/0087775 A1 | 4/2007 | Richardson et al. | |
| 2007/0097151 A1 | 5/2007 | Rosenberg | |
| 2007/0109277 A1 | 5/2007 | Lira | |
| 2007/0120819 A1* | 5/2007 | Young | G06F 3/0485 345/156 |
| 2007/0137076 A1 | 6/2007 | Cowden | |
| 2007/0146318 A1 | 6/2007 | Juh et al. | |
| 2007/0182743 A1 | 8/2007 | Aguera Y Arcas | |
| 2007/0188518 A1 | 8/2007 | Vale et al. | |
| 2007/0192692 A1 | 8/2007 | Chen et al. | |
| 2007/0209017 A1 | 9/2007 | Gupta et al. | |
| 2007/0211042 A1 | 9/2007 | Kim et al. | |
| 2007/0226646 A1* | 9/2007 | Nagiyama | G06F 3/016 715/784 |
| 2007/0229458 A1* | 10/2007 | Moon | G06F 3/0362 345/157 |
| 2007/0236475 A1 | 10/2007 | Wherry | |
| 2007/0242569 A1* | 10/2007 | Inoue | G02F 1/167 368/205 |
| 2007/0247435 A1 | 10/2007 | Benko et al. | |
| 2007/0262964 A1 | 11/2007 | Zotov et al. | |
| 2007/0277124 A1 | 11/2007 | Shin et al. | |
| 2007/0279401 A1* | 12/2007 | Ramstein | G06F 3/016 345/184 |
| 2007/0290045 A1* | 12/2007 | Cisar | G06F 3/0362 235/462.46 |
| 2007/0296711 A1* | 12/2007 | Yee | G06F 3/0354 345/184 |
| 2008/0001915 A1* | 1/2008 | Pihlaja | G06F 1/1616 345/156 |
| 2008/0004084 A1* | 1/2008 | Park | G06F 1/1626 455/566 |
| 2008/0020810 A1 | 1/2008 | Park | |
| 2008/0043028 A1 | 2/2008 | Tanaka | |
| 2008/0104544 A1 | 5/2008 | Collins et al. | |
| 2008/0123473 A1* | 5/2008 | Ozawa | G02F 1/167 368/18 |
| 2008/0148177 A1 | 6/2008 | Lang et al. | |
| 2008/0155461 A1 | 6/2008 | Ozaki | |
| 2008/0155475 A1* | 6/2008 | Duhig | G06F 3/0482 715/830 |
| 2008/0158149 A1 | 7/2008 | Levin | |
| 2008/0163132 A1 | 7/2008 | Lee et al. | |
| 2008/0165140 A1 | 7/2008 | Christie et al. | |
| 2008/0168382 A1* | 7/2008 | Louch | G06F 9/451 715/781 |
| 2008/0168404 A1 | 7/2008 | Ording | |
| 2008/0204478 A1 | 8/2008 | Hung | |
| 2008/0257701 A1* | 10/2008 | Wlotzka | H01H 25/008 200/336 |
| 2008/0284799 A1 | 11/2008 | Hollemans et al. | |
| 2008/0288880 A1* | 11/2008 | Reponen | G06F 3/04812 715/764 |
| 2008/0320391 A1 | 12/2008 | Lemay et al. | |
| 2009/0015550 A1 | 1/2009 | Koski | |
| 2009/0050465 A1* | 2/2009 | Asada | H01H 25/06 200/6 A |
| 2009/0051649 A1* | 2/2009 | Rondel | G06F 1/163 345/156 |
| 2009/0059730 A1* | 3/2009 | Lyons | G04G 21/04 368/69 |
| 2009/0070705 A1 | 3/2009 | Ording | |
| 2009/0079698 A1* | 3/2009 | Takashima | G06F 3/0224 345/169 |
| 2009/0100373 A1 | 4/2009 | Pixley et al. | |
| 2009/0109069 A1* | 4/2009 | Takasaki | G06F 3/018 341/35 |
| 2009/0143117 A1* | 6/2009 | Shin | H04B 1/385 455/575.6 |
| 2009/0152452 A1* | 6/2009 | Lee | G01D 5/04 250/231.15 |
| 2009/0156255 A1* | 6/2009 | Shin | H04B 1/385 455/558 |
| 2009/0196124 A1* | 8/2009 | Mooring | G04B 37/005 368/204 |
| 2009/0199130 A1* | 8/2009 | Tsern | G04G 21/08 715/810 |
| 2009/0204920 A1 | 8/2009 | Beverley et al. | |
| 2009/0213086 A1 | 8/2009 | Chae et al. | |
| 2009/0284478 A1 | 11/2009 | De la Torre Baltierra et al. | |
| 2009/0288039 A1* | 11/2009 | Mail | G06F 3/038 715/815 |
| 2009/0325563 A1* | 12/2009 | Horodezky | G06F 3/0489 455/418 |
| 2010/0029327 A1 | 2/2010 | Jee | |

(56) References Cited

U.S. PATENT DOCUMENTS

| | | | |
|---|---|---|---|
| 2010/0058223 A1* | 3/2010 | Price | G06F 3/0362 715/784 |
| 2010/0058240 A1 | 3/2010 | Bull et al. | |
| 2010/0093400 A1 | 4/2010 | Ju et al. | |
| 2010/0110044 A1 | 5/2010 | Englund | |
| 2010/0128570 A1* | 5/2010 | Smith | G04G 21/04 368/10 |
| 2010/0169097 A1 | 7/2010 | Nachman et al. | |
| 2010/0187074 A1* | 7/2010 | Manni | G04C 3/004 200/4 |
| 2010/0220562 A1* | 9/2010 | Hozumi | G04B 3/043 368/308 |
| 2010/0248778 A1 | 9/2010 | Biswas | |
| 2010/0259481 A1* | 10/2010 | Oh | G06F 3/03548 345/163 |
| 2010/0269038 A1 | 10/2010 | Tsuda | |
| 2010/0271340 A1* | 10/2010 | Nagashima | G01C 21/265 345/184 |
| 2010/0271342 A1* | 10/2010 | Nagashima | G06F 3/016 345/184 |
| 2010/0271343 A1* | 10/2010 | Nagashima | G06F 3/016 345/184 |
| 2010/0277126 A1* | 11/2010 | Naeimi | H02K 7/1853 320/137 |
| 2010/0315417 A1 | 12/2010 | Cho et al. | |
| 2010/0325575 A1 | 12/2010 | Platzer et al. | |
| 2010/0331145 A1* | 12/2010 | Lakovic | G04F 10/00 482/8 |
| 2011/0004830 A1 | 1/2011 | Von Kaenel et al. | |
| 2011/0006980 A1* | 1/2011 | Taniguchi | G06F 3/0338 345/156 |
| 2011/0014956 A1 | 1/2011 | Lee et al. | |
| 2011/0025311 A1* | 2/2011 | Chauvin | G01D 5/145 324/207.25 |
| 2011/0037725 A1 | 2/2011 | Pryor | |
| 2011/0057886 A1 | 3/2011 | Ng et al. | |
| 2011/0078025 A1 | 3/2011 | Shrivastav et al. | |
| 2011/0099509 A1 | 4/2011 | Horagai | |
| 2011/0131494 A1* | 6/2011 | Ono | G06F 3/0338 715/716 |
| 2011/0131531 A1* | 6/2011 | Russell | G06F 3/0482 715/835 |
| 2011/0157046 A1 | 6/2011 | Lee et al. | |
| 2011/0164042 A1 | 7/2011 | Chaudhri | |
| 2011/0167262 A1* | 7/2011 | Ross | H04W 12/06 713/168 |
| 2011/0187355 A1* | 8/2011 | Dixon | G01D 5/145 324/207.25 |
| 2011/0224967 A1 | 9/2011 | Van Schaik | |
| 2011/0252357 A1* | 10/2011 | Chaudhri | G06F 3/04883 715/780 |
| 2011/0270833 A1 | 11/2011 | von Kaenel et al. | |
| 2011/0296312 A1* | 12/2011 | Boyer | G06F 3/0488 715/736 |
| 2011/0298830 A1 | 12/2011 | Lam | |
| 2012/0026198 A1 | 2/2012 | Maesaka | |
| 2012/0044267 A1 | 2/2012 | Fino | |
| 2012/0066638 A1 | 3/2012 | Ohri | |
| 2012/0092383 A1* | 4/2012 | Hysek | G04G 9/00 345/684 |
| 2012/0099406 A1 | 4/2012 | Lau et al. | |
| 2012/0105484 A1 | 5/2012 | Cui | |
| 2012/0131504 A1 | 5/2012 | Fadell et al. | |
| 2012/0174005 A1 | 7/2012 | Deutsch et al. | |
| 2012/0186951 A1 | 7/2012 | Wu et al. | |
| 2012/0200689 A1 | 8/2012 | Friedman et al. | |
| 2012/0223971 A1 | 9/2012 | Hillis | |
| 2012/0278725 A1 | 11/2012 | Gordon et al. | |
| 2012/0324390 A1* | 12/2012 | Tao | G06F 3/04847 715/771 |
| 2013/0067390 A1 | 3/2013 | Kwiatkowski et al. | |
| 2013/0120301 A1 | 5/2013 | Lira | |
| 2013/0142016 A1* | 6/2013 | Pozzo Di Borgo | G04C 3/002 368/82 |
| 2013/0145292 A1 | 6/2013 | Cohen et al. | |
| 2013/0169579 A1 | 7/2013 | Havnor | |
| 2013/0176020 A1 | 7/2013 | Chauvin et al. | |
| 2013/0205939 A1* | 8/2013 | Meerovitsch | G05G 1/02 74/553 |
| 2013/0218517 A1* | 8/2013 | Ausserlechner | G01B 7/30 702/151 |
| 2013/0258819 A1* | 10/2013 | Hoover | G04C 3/146 368/184 |
| 2013/0303087 A1* | 11/2013 | Hauser | H04W 4/206 455/41.2 |
| 2014/0028688 A1* | 1/2014 | Houjou | G09G 5/006 345/520 |
| 2014/0074717 A1 | 3/2014 | Evans | |
| 2014/0132640 A1 | 5/2014 | Sharma et al. | |
| 2014/0137020 A1* | 5/2014 | Sharma | G06F 3/0486 715/769 |
| 2014/0143678 A1 | 5/2014 | Mistry et al. | |
| 2014/0253487 A1* | 9/2014 | Bezinge | G04G 17/045 345/173 |
| 2014/0258935 A1 | 9/2014 | Nishida et al. | |
| 2014/0260776 A1* | 9/2014 | Burleson | G05G 1/10 74/553 |
| 2014/0282214 A1 | 9/2014 | Shirzadi et al. | |
| 2014/0306989 A1 | 10/2014 | Doubleday et al. | |
| 2014/0347289 A1* | 11/2014 | Suh | G06F 3/017 345/173 |
| 2015/0039494 A1 | 2/2015 | Sinton et al. | |
| 2015/0121405 A1 | 4/2015 | Ekselius et al. | |
| 2015/0234562 A1 | 8/2015 | Ording | |
| 2015/0277559 A1* | 10/2015 | Vescovi | G06F 3/014 345/173 |
| 2015/0370529 A1* | 12/2015 | Zambetti | G06F 3/165 345/156 |
| 2015/0378447 A1 | 12/2015 | Nagano et al. | |
| 2016/0034133 A1* | 2/2016 | Wilson | G06F 3/0488 715/772 |
| 2016/0034166 A1* | 2/2016 | Wilson | G06F 3/04842 715/771 |
| 2016/0034167 A1* | 2/2016 | Wilson | G06F 3/04845 715/771 |
| 2016/0062466 A1* | 3/2016 | Moussette | G06F 3/016 345/173 |
| 2016/0063828 A1* | 3/2016 | Moussette | G08B 6/00 340/540 |
| 2016/0098016 A1* | 4/2016 | Ely | G04G 21/00 368/308 |
| 2016/0170624 A1 | 6/2016 | Zambetti et al. | |
| 2016/0170625 A1* | 6/2016 | Zambetti | G06F 3/0362 715/771 |
| 2016/0202866 A1* | 7/2016 | Zambetti | G06F 3/0485 715/835 |
| 2016/0209939 A1 | 7/2016 | Zambetti et al. | |
| 2016/0231883 A1 | 8/2016 | Zambetti et al. | |
| 2016/0259535 A1* | 9/2016 | Fleizach | G09B 21/006 |
| 2016/0269540 A1* | 9/2016 | Butcher | H04M 1/72569 |
| 2016/0327911 A1 | 11/2016 | Eim et al. | |
| 2017/0212674 A1 | 7/2017 | Ording | |
| 2018/0074690 A1 | 3/2018 | Zambetti et al. | |
| 2018/0210516 A1 | 7/2018 | Zambetti et al. | |

FOREIGN PATENT DOCUMENTS

| | | |
|---|---|---|
| AU | 2009208103 A1 | 9/2009 |
| CN | 1330310 A | 1/2002 |
| CN | 1398366 A | 2/2003 |
| CN | 1620642 A | 5/2005 |
| CN | 1695105 A | 11/2005 |
| CN | 1757011 A | 4/2006 |
| CN | 2829257 Y | 10/2006 |
| CN | 1975652 A | 6/2007 |
| CN | 101431545 A | 5/2009 |
| CN | 101446802 A | 6/2009 |
| CN | 101241407 B | 7/2011 |
| CN | 102402328 A | 4/2012 |

(56) References Cited

FOREIGN PATENT DOCUMENTS

| | | |
|---|---|---|
| CN | 102591579 A | 7/2012 |
| CN | 101034328 B | 2/2013 |
| CN | 103460164 A | 12/2013 |
| EP | 0622722 A2 | 11/1994 |
| EP | 0701220 A1 | 3/1996 |
| EP | 0536715 B1 | 7/2000 |
| EP | 1052566 A1 | 11/2000 |
| EP | 1168149 A2 | 1/2002 |
| EP | 1486860 A1 | 12/2004 |
| EP | 1850213 A2 | 10/2007 |
| EP | 2207084 A2 | 7/2010 |
| EP | 2302492 A2 | 3/2011 |
| EP | 2385451 A1 | 11/2011 |
| JP | 3-271976 A | 12/1991 |
| JP | 5-88812 A | 4/1993 |
| JP | 6-348408 A | 12/1994 |
| JP | 7-152478 A | 6/1995 |
| JP | 9-152856 A | 6/1997 |
| JP | 11-110106 A | 4/1999 |
| JP | 11-126149 A | 5/1999 |
| JP | 11-289484 A | 10/1999 |
| JP | 2000-503153 A | 3/2000 |
| JP | 2000-305760 A | 11/2000 |
| JP | 2001-100905 A | 4/2001 |
| JP | 2001-202178 A | 7/2001 |
| JP | 2001-202181 A | 7/2001 |
| JP | 2002-288690 A | 10/2002 |
| JP | 2002-373312 A | 12/2002 |
| JP | 2003-248544 A | 9/2003 |
| JP | 2003-330586 A | 11/2003 |
| JP | 2003-330856 A | 11/2003 |
| JP | 2003-345491 A | 12/2003 |
| JP | 2004-184396 A | 7/2004 |
| JP | 2004-259063 A | 9/2004 |
| JP | 2005-004891 A | 1/2005 |
| JP | 2005-108211 A | 4/2005 |
| JP | 2005-196077 A | 7/2005 |
| JP | 2006-11690 A | 1/2006 |
| JP | 2006-011862 A | 1/2006 |
| JP | 2008-508601 A | 3/2008 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-294526 A | 12/2009 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2013-114844 A | 6/2013 |
| JP | 2013-122738 A | 6/2013 |
| JP | 2014-42164 A | 3/2014 |
| JP | 2014-222527 A | 11/2014 |
| KR | 10-2001-0040410 A | 5/2001 |
| KR | 10-2003-0016313 A | 2/2003 |
| KR | 10-2003-0088374 A | 11/2003 |
| KR | 10-2004-0107472 A | 12/2004 |
| KR | 10-2006-0014874 A | 2/2006 |
| KR | 10-2006-0085850 A | 7/2006 |
| KR | 10-0630154 B1 | 9/2006 |
| KR | 10-2011-0093090 A | 8/2011 |
| KR | 10-2011-0114294 A | 10/2011 |
| KR | 10-2012-0079707 A | 7/2012 |
| KR | 10-2013-0027017 A | 3/2013 |
| TW | D122820 S | 5/2008 |
| WO | 93/08517 A1 | 4/1993 |
| WO | WO 96/19872 * | 12/1995 |
| WO | 99/38149 A1 | 7/1999 |
| WO | 0169369 A1 | 9/2001 |
| WO | 02/01338 A1 | 1/2002 |
| WO | 03/060622 A2 | 7/2003 |
| WO | 03/060682 A1 | 7/2003 |
| WO | 03/081458 A1 | 10/2003 |
| WO | 2005/008444 A2 | 1/2005 |
| WO | 2005/052773 A2 | 6/2005 |
| WO | 2006/003591 A2 | 1/2006 |
| WO | 2006/013485 A2 | 2/2006 |
| WO | 2006/020304 A2 | 2/2006 |
| WO | 2006/020305 A2 | 2/2006 |
| WO | 2006/037545 A2 | 4/2006 |
| WO | 2006/045530 A2 | 5/2006 |
| WO | 2009/026508 A1 | 2/2009 |
| WO | 2010/024969 A1 | 3/2010 |
| WO | 2010/150768 A1 | 12/2010 |
| WO | 2012080020 A1 | 6/2012 |
| WO | 2013/114844 A1 | 8/2013 |
| WO | 2013/169849 A2 | 11/2013 |
| WO | 2014105276 A1 | 7/2014 |

OTHER PUBLICATIONS

IBM et. al. "watchpad 1.5", Jan. 20, 2011; Retrieved from web.archive.org/web/20011205071448/http://www.trl.ibm.com/projects/ngm/index_e.htm.*
Raghunath et. al. "User interfaces for applications on a wrist watch"; 2002.*
Office Action received for Taiwanese Patent Application No. 103130520, dated Oct. 1, 2015, 58 pages (22 pages of English translation and 36 pages of Official copy).
Office Action received for Taiwan Patent Application No. 103130519.0, dated Mar. 25, 2016, 14 pages( 6 pages of English Translation and 8 pages of Official Copy).
International Preliminary Report on Patentability received for PCT Patent Application No. PCT/US2014/053951, dated Mar. 17, 2016, 9 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053958, dated Feb. 19, 2015, 10 pages.
International Preliminary Report on Patentability received for PCT Patent Application No. PCT/US2014/053958, dated Mar. 17, 2016, 8 pages.
Invitation to Pay Additional Fees received for PCT Application No. PCT/US2014/053961, dated Aug. 3, 2015, 6 pages.
Kamijo, Noboru, "Next Generation Mobile System—WatchPad1.5", Available at <http://researcher.ibm.com/researcher/view_group_subpage.php?id=5617>, retrieved on Jul. 4, 2015, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
International Preliminary Report on Patentability received for PCT Patent Application No. PCT/US2014/053961, dated Jul. 21, 2016, 24 pages.
International Search Report and Written Opinion received for PCT Patent Application No. PCT/US2016/019637, dated Aug. 18, 2016, 18 pages.
International Search Report received for PCT Patent Application No. PCT/US2014/053961, dated Jul. 11, 2016, 10 pages.
Invitation to Pay Additional Fees received for PCT Patent Application No. PCT/US2016/019637, dated Jun. 1, 2016, 6 pages.
Notice of Allowance received for Taiwanese Patent Application No. 103130518, dated May 19, 2016, 2 pages (Official Copy Only) (See Communication under 37 CFR § 1.98(a) (3)).
Office Action and Search Report received for Danish Patent Application No. PA 201670118, dated Jul. 1, 2016, 7 pages.
Office Action received for Taiwanese Patent Application No. 103130520, dated May 23, 2016, 38 pages (15 pages of English Translation and 23 pages of Official Copy).
Written Opinion received for PCT Patent Application No. PCT/US2014/053961, dated Jul. 11, 2016, 22 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.

(56) References Cited

OTHER PUBLICATIONS

Notice of Allowance received for Taiwanese Patent Application No. 103130519, dated Oct. 27, 2016, 3 pages (Official Copy only) (see attached 37 CFR § 1.98(a) (3)).
Office Action received for Australian Patent Application No. 2014315234, dated Nov. 2, 2016, 3 pages.
Office Action received for Australian Patent Application No. 2014315319, dated Oct. 17, 2016, 3 pages.
Office Action received for Australian Patent Application No. 2014315325, dated Nov. 3, 2016, 3 pages.
Office Action received for Taiwanese Patent Application No. 103130520, dated Sep. 29, 2016, 39 pages (16 pages of English Translation and 23 pages of Official Copy).
Office Action received for Korean Patent Application No. 10-2016-7008474, dated Dec. 28, 2016, 10 pages (4 pages of English Translation and 6 pages of Official Copy).
Office Action received for Korean Patent Application No. 10-2016-7008488, dated Jan. 12, 2017, 14 pages (6 pages of English Translation and 8 pages of Official Copy).
Office Action received for Korean Patent Application No. 10-2016-7008682, dated Dec. 30, 2016, 11 pages (4 pages of English Translation 7 pages of Official Copy).
Office Action received for Danish Patent Application No. PA201670118, dated Feb. 2, 2017, 2 pages.
Final Office Action received for U.S. Appl. No. 15/049,064, dated Feb. 27, 2017, 13 Pages.
Office Action received for Australian Patent Application No. 2014315234, dated Apr. 19, 2017, 4 pages.
Notice of Allowance received for Danish Patent Application No. PA201670118, dated Mar. 30, 2017, 2 pages.
Office Action received for Japanese Patent Application No. 2016-537947, dated Feb. 24, 2017, 6 pages (3 pages of English Translation and 3 pages of Official Copy).
Advisory Action received for U.S. Appl. No. 15/049,064, dated May 10, 2017, 3 Pages.
Final Office Action received for U.S. Appl. No. 15/049,058, dated May 8, 2017, 21 pages.
Notice of Allowance received for Australian Patent Application No. 2014315325, dated Apr. 19, 2017, 3 Pages.
Office Action received for Japanese Patent Application No. 2016-537945, dated Apr. 7, 2017, 6 pages (3 pages of English Translation and 3 pages of Official Copy).
Office Action received for Taiwanese Patent Application No. 103130520, dated Apr. 17, 2017, 8 pages (3 pages of English Translation and 5 pages of Official Copy).
"The Interview With a Key Person. IBM and CITIZEN met and Applied Linux to a Watch", ASCII Corporation, vol. 25, No. 12, Consecutive vol. 294, Dec. 1, 2001, pp. 137-143.
Advisory Action received for U.S. Appl. No. 15/049,058, dated Oct. 18, 2017, 3 pages.
International Preliminary Report on Patentability received for PCT Patent Application No. PCT/US2016/019637, dated Sep. 21, 2017, 12 pages.
Non-Final Office Action received for U.S. Appl. No. 14/841,656, dated Jul. 26, 2017, 20 pages.
Notice of Allowance received for Japanese Patent Application No. 2016-537947, dated Jun. 5, 2017, 3 pages (Official Copy only) {See Communication under 37 CFR § 1.98(a) (3)}.
Notice of Allowance received for U.S. Appl. No. 15/049,064, dated Jul. 18, 2017, 24 pages.
Office Action received for Australian Patent Application No. 2014315234, dated Jul. 12, 2017, 4 pages.
Office Action received for Danish Patent Application No. PA201770181, dated Jun. 13, 2017, 6 pages.
Office Action received for European Patent Application No. 14772002.3, dated Jul. 4, 2017, 8 pages.
Office Action received for Japanese Patent Application No. 2016-537948, dated Jun. 9, 2017, 10 pages (5 pages of English Translation and 5 pages of Official Copy).
Notice of Allowance received for Australian Patent Application No. 2014315319, dated Oct. 12, 2017, 3 pages.
Office Action received for European Patent Application No. 14772494.2, dated Jun. 20, 2017, 7 pages.
Wikipedia, "Rotary encoder", Online Available at <https://en.wikipedia.org/wiki/Rotary_encoder>, Retrieved on May 17, 2017, 17 pages (10 pages of English Translation and 7 pages of Official Copy).
Office Action received for Australian Patent Application No. 2014315319, dated Aug. 3, 2017, 3 pages.
Brinkmann, Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Office Action received for European Patent Application No. 14771688.0, dated Nov. 30, 2017, 15 pages.
Office Action received for Korean Patent Application No. 10-2016-7008488, dated Nov. 27, 2017, 6 pages (3 page of English Translation and 3 pages of Official Copy).
Office Action received for Korean Patent Application No. 10-2016-7008474, dated Nov. 27, 2017, 6 pages (2 page of English Translation and 4 pages of Official Copy).
Office Action received for Korean Patent Application No. 10-2016-7008682, dated Nov. 27, 2017, 7 pages (3 page of English Translation and 4 pages of Official Copy).
Office Action received for Chinese Patent Application No. 201480060082.7, dated Jan. 26, 2018, 15 pages (4 pages of English translation and 11 pages of Official Copy).
Non-Final Office Action received for U.S. Appl. No. 14/913,345, dated Apr. 5, 2018, 15 pages.
Corrected Notice of Allowance received for U.S. Appl. No. 14/841,656, dated Apr. 11, 2018, 2 pages.
Office Action received for Chinese Patent Application No. 201480059543.9, dated Jan. 26, 2018, 17 pages (4 pages of English Translation and 13 pages of Official Copy).
Office Action received for European Patent Application No. 14771688.0, dated May 31, 2018, 6 pages.
Office Action received for Korean Patent Application No. 10-2016-7008474, dated May 15, 2018, 7 pages (3 pages of English Translation and 4 pages of Official Copy).
Non-Final Office Action received for U.S. Appl. No. 15/049,058, dated Feb. 20, 2018, 21 pages.
Notice of Allowance Action received for U.S. Appl. No. 14/841,656, dated Feb. 12, 2018, 9 pages.
Office Action received for Japanese Patent Application No. 2016-537945, dated Jan. 9, 2018, 5 pages (2 page of English Translation and 3 pages of Official copy).
Office Action received for Korean Patent Application No. 10-2016-7008682, dated Feb. 8, 2018, 7 pages (3 pages of English Translation and 4 pages of Official Copy).
Decision to Grant received for Danish Patent Application No. PA201770181, dated Mar. 7, 2018, 2 pages.
Notice of Allowance received for U.S. Appl. No. 14/841,656, dated Mar. 5, 2018, 3 pages.
Office Action received for Australian Patent Application No. 2018200998, dated Mar. 9, 2018, 5 pages.
Office Action received for Korean Patent Application No. 10-2016-7008488, dated Feb. 8, 2018, 8 pages (4 page of English Translation and 4 pages of Official Copy).
Office Action received for Korean Patent Application No. 10-2018-7002695, dated Feb. 27, 2018, 12 pages (5 pages of English Translation and 7 pages of Official Copy).
Office Action received for Taiwanese Patent Application No. 103130520, dated Jan. 23, 2018, 5 pages (2 pages of English Translation and 3 pages of Official Copy).
Office Action received for Danish Patent Application No. PA201770181, dated Jan. 3, 2018, 2 pages.
Corrected Notice of Allowance received for U.S. Appl. No. 14/841,656, dated May 7, 2018, 14 pages.
Non-Final Office Action received for U.S. Appl. No. 14/913,350, dated May 14, 2018, 30 pages.
Notice of Allowance received for Taiwanese Patent Application No. 103130520, dated Apr. 27, 2018, 4 pages (1 page of English Translation and 3 pages of Official copy).

(56) References Cited

OTHER PUBLICATIONS

Office Action received for European Patent Application No. 18157131.6, dated May 8, 2018, 12 pages.
Office Action received for Japanese Patent Application No. 2016-537948, dated Apr. 6, 2018, 5 pages (2 pages of English Translation and 3 pages of Official Copy).
Search Report received for European Patent Application No. 18157131.6, dated Apr. 19, 2018, 4 pages.
Final Office Action received for U.S. Appl. No. 14/913,345, dated Oct. 26, 2018, 20 pages.
Notice of Allowance received for Korean Patent Application No. 10-2018-7002695, dated Oct. 8, 2018, 5 pages (2 pages of English Translation and 3 pages of Official Copy).
Office Action received for Chinese Patent Application No. 201480060082.7, dated Sep. 25, 2018, 6 pages (3 pages of English Translation and 3 pages of Official copy).
Office Action received for Japanese Patent Application No. 2016-537948, dated Sep. 3, 2018, 4 pages (2 pages of English Translation and 2 pages of Official copy).
Office Action received for Korean Patent Application No. 10-2017-7024506, dated Sep. 28, 2018, 11 pages (4 pages of English Translation and 7 pages of Official Copy).
Notice of Allowance received for U.S. Appl. No. 14/913,350, dated Dec. 19, 2018, 27 pages.
Office Action received for Australian Patent Application No. 2018200289, dated Dec. 4, 2018, 4 pages.
Final Office Action received for U.S. Appl. No. 15/049,058, dated Aug. 8, 2018, 23 pages.
Office Action received for Australian Patent Application No. 2016229407, dated Aug. 15, 2018, 4 pages.
Office Action received for Australian Patent Application No. 2017254897, dated Aug. 29, 2018, 4 pages.
Office Action received for European Patent Application No. 14772494.2, dated Oct. 2, 2018, 9 pages.
Office Action received for Japanese Patent Application No. 2017-545561, dated Aug. 6, 2018, 8 pages (4 pages of English Translation and 4 pages of Official copy).
Office Action received for Korean Patent Application No. 10-2018-7002695, dated Jun. 19, 2018, 8 pages (4 pages of English Translation and 4 pages of Official copy).
Office Action received for Korean Patent Application No. 10-2018-7013265, dated Aug. 10, 2018, 12 pages (5 pages of English Translation and 7 pages of Official copy).
Office Action received for Chinese Patent Application No. 201480059543.9, dated Sep. 19, 2018, 18 pages (5 pages of English Translation and 13 pages of Official Copy).
Notice of Allowance received for Japanese Patent Application No. 2016-537945, dated Aug. 3, 2018, 4 pages (1 page of English translation and 3 pages of Official copy).
Office Action received for Korean Patent Application No. 10-2016-7008474, dated Aug. 6, 2018, 10 pages (5 pages of English Translation and 5 pages of Official Copy).
Decision to Grant received for European Patent Application No. 18157131.6, dated May 16, 2019, 2 pages.
Non-Final Office Action received for U.S. Appl. No. 15/049,058, dated Jun. 5, 2019, 25 pages.
Office Action received for Australian Patent Application No. 2019201628, dated May 13, 2019, 2 pages.
Non-Final Office Action received for U.S. Appl. No. 15/483,743, dated Mar. 21, 2019, 10 pages.
Notice of Allowance received for Chinese Patent Application No. 201480060082.7, dated Mar. 12, 2019, 2 pages (1 page of English Translation and 1 page of Official Copy).
Office Action received for Chinese Patent Application No. 201480059543.9, dated Feb. 28, 2019, 16 pages (4 pages of English Translation and 12 pages of Official Copy).
Office Action received for Japanese Patent Application No. 2018-090084, dated Feb. 15, 2019, 6 pages (3 pages of English Translation and 3 pages of official copy).

Notice of Allowance received for Japanese Patent Application No. 2018-143982, dated Apr. 8, 2019, 4 pages (1 page of English Translation and 3 pages of Official Copy).
Office Action received for Australian Patent Application No. 2018200289, dated Apr. 9, 2019, 5 pages.
Notice of Allowance received for Korean Patent Application No. 10-2018-7010593, dated Jan. 30, 2019, 3 pages (1 pages of English Translation and 2 pages of Official Copy).
Office Action received for Australian Patent Application No. 2018200998, dated Jan. 30, 2019, 4 pages.
Office Action received for European Patent Application No. 16710372.0, dated Feb. 22, 2019, 7 pages.
"A truly Inventive Invention", Dec. 23, 2014, 4 pages.
Advisory Action received for U.S. Appl. No. 14/624,518, dated Sep. 27, 2016, 3 pages.
"*Apple Inc.* Vs. *Samsung Electronice Co. Ltd.*", Case No. 11-CV-01846-LHK, Aug. 9, 2011, 85 pages.
"*Apple Inc.* Vs. *Samsung Electronics GmbH*", Landgericht Mannheim 7. Zivilkammer Beschluss, Feb. 8, 2013, 13 pages (Official Copy Only{See communication under 37 CFR § 1.98(a) (3)}.
"*Apple* Vs. *Samsung Electronics GmbH*", Landgericht Munchen 1, 21 O 26022/11, Feb. 27, 2012, 16 pages (Official Copy Only). {See communication under 37 CFR § 1.98(a) (3)}.
Karlson et al., "Applens and Launch Tile: Two Designs for One-Handed Thumb Use on Small Devices", CHI 2005, Apr. 2-7, 2005, 10 pages.
Decision on Appeal received for European Patent Application No. 08713567.9, mailed on Sep. 10, 2018, 36 pages.
Decision on Appeal received for Korean Patent Application No. 10-2015-7022918, mailed on Oct. 29, 2018, 20 Pages (1 page for English translation and 19 pages of Office Action).
Decision to Grant received for European Patent Application No. 11182954.5, dated Aug. 10, 2017, 3 pages.
Decision to Grant received for European Patent Application No. 11182959.4, dated Feb. 2, 2017, 3 pages.
Decision to Grant received for European Patent Application No. 11182962.8, dated Jun. 22, 2017, 3 pages.
Decision to Refuse received for European Patent Application No. 11182963.6, dated Mar. 28, 2017, 17 pages.
"Declaration of Benjamin B. Bederson", *Apple Inc.* vs. *Samsung Electronics Co., Ltd.*, Case No. 11-cv-01846-LHK, Document 165, Filed on Aug. 22, 2011, 12 pages.
Butz, Andreas, "Expert Statement Regarding European Patent No. 2126678", Sep. 21, 2013, 31 pages.
Extended European Search Report received for European Patent Application No. 17186896.1, dated Dec. 15, 2017, 9 pages.
Final Office Action received for U.S. Appl. No. 14/624,518, dated Jul. 13, 2016, 10 pages.
Grounds of appeal against revocation of European Patent No. EP 2126678, Nov. 3, 2015, 41 pages.
Intention to Grant received for European Patent Application No. 11182954.5, dated Mar. 31, 2017, 10 pages.
Intention to Grant received for European Patent Application No. 11182959.4, dated Dec. 9, 2016, 9 pages.
Intention to Grant received for European Patent Application No. 18157131.6, dated Jan. 9, 2019, 9 pages.
Intention to Grant received for European Patent Application No. 11182962.8, dated Feb. 6, 2017, 9 Pages.
"IOS Security", White Paper, Available online at <https://web.archive.org/web/20150526223200/http://www.apple.com/business/docs/iOS_Security_Guide.pdf>, Apr. 2015, 55 pages.
"iPhone", Wikipedia, the free Encyclopedia, retrieved on Aug. 18, 2017, 46 pages.
"Landgericht Dusseldorf Geschftsstelle", Jun. 18, 2014, 2 pages (Official Copy Only). {See communication under 37 CFR § 1.98(a) (3)}.
"Microsoft Word 2003 Screenshots", 1983-2003, 2 pages.
Minutes of the Oral Proceedings received for European Application No. 08713567.9, dated Jun. 29, 2018, 6 pages.
"*Motorola Mobility Germany GmbH* Vs. *Samsung Electronics GmbH*", Bundespatentgericht, Sep. 26, 2013, 50 pages (Official Copy Only). {See communication under 37 CFR § 1.98(a) (3)}.

(56) References Cited

OTHER PUBLICATIONS

Notice of Acceptance received for Australian Patent Application No. 2015201905, dated Jan. 13, 2017, 3 pages.
Notice of Allowance received for Canadian Patent Application No. 2,890,732, dated Apr. 19, 2017, 1 page.
Notice of Allowance received for Canadian Patent Application No. 2,915,678, dated Dec. 27, 2017, 1 page.
Notice of Allowance received for Canadian Patent Application No. 2,944,195, dated Jun. 27, 2018, 1 page.
Notice of Allowance received for Chinese Patent Application No. 201210573107.6, dated Oct. 30, 2017, 3 pages (Official Copy only). {See communication under 37 CFR § 1.98(a) (3)}.
Notice of Allowance received for Chinese Patent Application No. 201210570519.4, dated Jan. 20, 2017, 4 pages (1 page of English Translation and 3 pages of Official Copy).
Notice of Allowance received for Chinese Patent Application No. 201310024905.8, dated Jul. 11, 2017, 2 pages (1 page of English Translation and 1 page of Official Copy).
Notice of Allowance received for Japanese Patent Application No. 2014-140817, dated Mar. 31, 2017, 3 pages. (Official Copy Only) {See communication under 37 CFR § 1.98(a) (3)}.
Notice of Allowance received for Japanese Patent Application No. 2017-090133, dated Jul. 27, 2018, 4 pages (1 page of English Translation and 3 pages of Official copy).
Notice of Allowance received for Korean Patent Application No. 10-2013-7034633, dated Oct. 31, 2016, 3 pages (1 page of English Translation and 2 pages of Official Copy).
Notice of Allowance received for Korean Patent Application No. 10-2015-7022918, dated Nov. 27, 2018, 4 pages (2 pages of English Translation and 2 pages of Official Copy).
Notice of Allowance received for Korean Patent Application No. 10-2017-7002923, dated Feb. 28, 2018, 3 pages (1 page of English Translation and 2 pages of Official Copy).
Notice of Allowance received for U.S. Appl. No. 14/624,518, dated Dec. 30, 2016, 8 pages.
Corrected Notice of Allowance received for U.S. Appl. No. 14/624,518, dated Feb. 13, 2017, 5 Pages.
Corrected Notice of Allowance received for U.S. Appl. No. 14/624,518, dated Jan. 20, 2017, 5 pages.
*Apple Inc.* Vs. *Samsung Electronics GmbH*, Jul. 26, 2012, 27 pages. (Official Copy Only) {See communication under 37 CFR § 1.98(a) (3)}.
Office Action received for Australian Patent Application No. 2015201905, dated May 9, 2016, 3 pages.
Office Action received for Australian Patent Application No. 2017202917, dated Jul. 20, 2018, 3 pages.
Office Action received for Canadian Patent Application No. 2,890,732, dated May 12, 2016, 5 pages.
Office Action received for Canadian Patent Application No. 2,915,678, dated Aug. 6, 2018, 4 pages.
Office Action received for Canadian Patent Application No. 2,915,678, dated Jan. 23, 2017, 5 pages.
Office Action received for Canadian Patent Application No. 2,944,195, dated Jul. 26, 2017, 3 pages.
Office Action received for Chinese Patent Application No. 201210570519.4, dated Jul. 6, 2016, 6 pages (3 pages of English Translation and 3 pages of Official Copy).
Office Action received for Chinese Patent Application No. 201210573107.6, dated Jan. 25, 2017, 10 pages (3 pages of English Translation and 7 pages of Official Copy).
Office Action received for Chinese Patent Application No. 201310024905.8, dated Oct. 21, 2016, 12 pages (5 pages of English Translation and 7 pages of Official Copy).
Office Action received for Chinese Patent Application No. 201480060083.1, dated Dec. 5, 2018, 11 pages (5 pages of English Translation and 6 pages of Official Copy).
Office Action received for European Patent Application No. 14771688.0, dated Jan. 21, 2019, 8 pages.
Office Action received for European Patent Application No. 17186896.1, dated Oct. 12, 2018, 5 pages.
Office Action received for Japanese Patent Application No. 2017-090133, dated Jan. 22, 2018, 14 pages (7 pages of English translation and 7 pages of Official Copy).
Office Action received for Japanese Patent Application No. 2018-143982, dated Dec. 7, 2018, 10 pages (5 pages of English Translation and 5 pages of Official Copy).
Office Action received for Japanese Patent Application No. 2014-140817, dated Aug. 19, 2016, 8 pages (4 pages of English Translation and 4 pages of Official Copy).
Office Action received for Korean Patent Application No. 10-2015-7022918, dated Nov. 29, 2016, 6 pages (3 pages of English Translation and 3 Pages of Official Copy).
Office Action received for Korean Patent Application No. 10-2017-7002923, dated Apr. 28, 2017, 5 pages (2 pages of English Translation and 3 pages of Official Copy).
Office Action received for Korean Patent Application No. 10-2018-7010593, dated Jul. 11, 2018, 5 pages (2 pages of English Translation and 3 pages of Official Copy).
Office Action received for Korean Patent Application No. 10-2018-7032106, dated Dec. 26, 2018, 10 pages (4 pages of English translation and 6 pages of Official Copy).
"Oxford English Dictionary—The definitive Record of the English Language", Oxford University Press, Jun. 2015, 11 pages.
Statement of appeal for the European Patent Application No. 08713567.9, filed on Mar. 10, 2016, 54 pages.
Summons to Attend Oral Proceedings received for European Patent Application No. 11182962.8, mailed on Jul. 4, 2016, 7 pages.
Summons to Attend Oral Proceedings received for European Patent Application No. 08713567.9, mailed on Feb. 27, 2018, 13 pages.
Summons to Attend Oral Proceedings received for European Patent Application No. 11182954.5, mailed on Aug. 12, 2016, 5 pages.
Summons to Attend Oral Proceedings received for European Patent Application No. 11182959.4, mailed on Jun. 23, 2016, 6 pages.
Summons to Attend Oral Proceedings received for European Patent Application No. 11182963.6, mailed on Jul. 14, 2016, 4 pages.
Auxiliary request in the Opposition Proceedings against the European Patent No. 08713567.9, filed on Dec. 5, 2014, 77 pages.
Decision to Revoke Patent Received for European Patent Application No. 08713567.9, dated Jun. 23, 2015, 50 pages.
Office Action received for European Application No. 08713567.9, dated Dec. 29, 2009, 5 pages.
Office communication received for the European Patent Application No. 08713567.9, dated Mar. 9, 2015, 4 pages.
Office Action received for Korean Patent Application No. 10-2013-7000337, dated Apr. 28, 2014, 7 pages (3 pages of English Translation and 4 pages of Official Copy).
Office Action received for Korean Patent Application No. 10-2013-7000337, dated Jun. 25, 2013, 7 pages (3 pages of English Translation and 4 pages of Official Copy).
Office Action received for Korean Patent Application No. 10-2013-7034633, dated Apr. 8, 2014, 4 pages (1 page of English Translation and 3 pages of Official copy).
Office Action received for Korean Patent Application No. 10-2013-7034633, dated Dec. 29, 2015, 10 pages (5 pages of English Translation and 5 pages of Official copy).
Office Action received for Korean Patent Application No. 10-2013-7034633, dated Feb. 24, 2015, 3 pages (Official Copy only). {See communication under 37 CFR § 1.98(a) (3)}.
Office Action received for Korean Patent Application No. 10-2015-7022918, dated Dec. 17, 2015, 7 pages (3 pages of English Translation and 4 pages of Official copy).
Notice of Allowance received for U.S. Appl. No. 11/956,969, dated Oct. 29, 2008, 6 pages.
Extended European Search Report received for European Patent Application No. 11182954.5, dated Nov. 29, 2011, 6 pages.
Office Action received for European Patent Application No. 11182954.5, dated Nov. 19, 2014, 5 pages.
Extended European Search Report received for European Patent Application No. 11182959.4, dated Nov. 30, 2011, 7 pages.
Office Action received for European Patent Application No. 11182959.4, dated Nov. 21, 2014, 3 pages.
Extended European Search Report received for European Patent Application No. 11182962.8, dated Dec. 1, 2011, 8 pages.

(56) References Cited

OTHER PUBLICATIONS

Office Action received for European Patent Application No. 11182962.8, dated Nov. 21, 2014, 4 pages.
Extended European Search Report received for European Patent Application No. 11182963.6, dated Dec. 1, 2011, 7 pages.
Office Action received for European Patent Application No. 11182963.6, dated Nov. 21, 2014, 4 pages.
Non-Final Office Action received for U.S. Appl. No. 12/270,805, dated Oct. 11, 2011, 27 pages.
Notice of Allowance received for U.S. Appl. No. 12/270,805, dated May 17, 2012, 14 pages.
Non-Final Office Action received for U.S. Appl. No. 12/270,807, dated Oct. 11, 2011, 26 pages.
Notice of Allowance received for U.S. Appl. No. 12/270,807, dated May 11, 2012, 12 pages.
Non-Final Office Action received for U.S. Appl. No. 12/270,810, dated Oct. 12, 2011, 12 pages.
Notice of Allowance received for U.S. Appl. No. 12/270,810, dated Jul. 11, 2012, 17 pages.
Non-Final Office Action received for U.S. Appl. No. 12/270,812, dated May 17, 2012, 14 pages.
Non-Final Office Action received for U.S. Appl. No. 12/270,812, dated Oct. 13, 2011, 12 pages.
Notice of Allowance received for U.S. Appl. No. 12/270,812, dated Sep. 19, 2012, 20 pages.
Final Office Action received for U.S. Appl. No. 12/270,815, dated Feb. 14, 2013, 12 pages.
Non-Final Office Action received for U.S. Appl. No. 12/270,815, dated Aug. 23, 2013, 12 pages.
Non-Final Office Action received for U.S. Appl. No. 12/270,815, dated Jul. 11, 2014, 12 pages.
Non-Final Office Action received for U.S. Appl. No. 12/270,815, dated May 17, 2012, 13 pages.
Non-Final Office Action received for U.S. Appl. No. 12/270,815, dated Oct. 11, 2011, 12 pages.
Notice of Allowance received for U.S. Appl. No. 12/270,815, dated Jan. 28, 2015, 12 pages.
Non-Final Office Action received for U.S. Appl. No. 14/624,518, dated Nov. 23, 2015, 10 pages.
Non-Final Office Action received for U.S. Appl. No. 14/624,518, dated Mar. 25, 2016, 8 pages.
Notice of Allowance received for Canadian Patent Application No. 2,759,066, dated Nov. 4, 2014, 1 page.
Office Action received for Canadian Patent Application No. 2,759,066, dated Nov. 4, 2013, 3 pages.
Notice of Allowance received for Canadian Patent Application No. 2,759,090, dated Jun. 23, 2015, 1 page.
Office Action received for Canadian Patent Application No. 2,759,090, dated Nov. 4, 2013, 3 pages.
Office Action received for Canadian Patent Application No. 2,759,090, dated Oct. 29, 2014, 4 pages.
Notice of Allowance received for Canadian Patent Application No. 2,759,091, dated Apr. 8, 2016, 1 page.
Office Action received for Canadian Patent Application No. 2,759,091, dated Oct. 8, 2015, 3 pages.
Office Action Received for Canadian Patent Application No. 2,759,091, dated Oct. 31, 2014, 6 pages.
Office Action received for Chinese Patent Application No. 201210570519.4, dated Dec. 23, 2014, 15 pages (7 pages of English Translation and 8 pages of Official Copy).
Office Action received for Chinese Patent Application No. 201210570519.4, dated Oct. 23, 2015, 11 pages (7 pages of English translation and 4 pages of Official copy).
Office Action received for Chinese Patent Application No. 201210570760.7, dated Dec. 2, 2014, 7 pages (Official Copy only). {See communication under 37 CFR § 1.98(a) (3)}.
Office Action received for Chinese Patent Application No. 201210573107.6, dated Apr. 21, 2015, 9 pages (Official Copy Only). {See communication under 37 CFR § 1.98(a) (3)}.
Office Action received for Chinese Patent Application No. 201210573107.6, dated Mar. 3, 2016, 14 pages (7 pages of English Translation and 7 pages of Official Copy).
Notice of Acceptance received for Australian Patent Application No. 2012200689, dated Jun. 9, 2015, 2 pages.
Office Action received for Australian Patent Application No. 2012200689, dated Sep. 9, 2013, 3 pages.
Office Action received for Chinese Patent Application No. 201310024905.8 dated Apr. 30, 2015, 21 pages (12 pages of English Translation and 9 pages of Official Copy).
Office Action received for Chinese Patent Application No. 201310024905.8, dated Feb. 6, 2016, 9 pages (4 pages of English Translation and 5 pages of Official Copy).
Notice of Allowance received for Japanese Patent Application No. 2013-102576, dated Dec. 8, 2014, 3 pages (Official Copy only). {See communication under 37 CFR § 1.98(a) (3)}.
Office Action Received for Japanese Patent Application No. 2013-102576, dated Mar. 10, 2014, 4 pages (2 pages of English Translation and 2 pages of Official Copy).
Office Action received for Japanese Patent Application No. 2014-140817, dated Oct. 2, 2015, 6 pages (3 pages of English translation and 3 pages of Official copy).
Notice of Intent to Issue a Reexam Certificate received for U.S. Appl. No. 90/010,963, dated Jan. 13, 2011, 9 pages.
Notice of Intent to Issue a Reexam Certificate received for U.S. Appl. No. 90/012,304, dated Jun. 12, 2013, 12 pages.
Reexam Final Office Action received for U.S. Appl. No. 90/012,304, dated Mar. 29, 2013, 87 pages.
Reexam Non-Final Office Action received for U.S. Appl. No. 90/012,304, dated Oct. 15, 2012, 11 pages.
Bederson et al., "Photo Mesa 3.1.2 Screen Shots", Windsor Interfaces. Inc., 2004-2006, 5 pages.
Han, Jeff, "Jeff Han Demos his Breakthrough Touchscreen", TED, Ideas Worth Spreading, available at <http://www.ted.com/talks/jeff_han_demos_his_breakthrough_touchscreen.html>, retrieved on May 8, 2012, 12 pages.
Han, Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Klemmer, Scott, "Declaration of Scott Klemmer", in the matter of European Patent No. EP21266788, Nov. 1, 2015, 3 pages.
Koren, J., "Including Images in Web Pages", Online Available at: <http://unsco.org/webworld/infotraining/inline.html>, 1998, 4 pages.
International Preliminary Report on Patentability received for PCT Patent Application No. PCT/US2008/050292, dated Mar. 26, 2013, 17 pages.
International Search Report and Written Opinion received for PCT Patent Application No. PCT/US2008/050292, dated Sep. 19, 2008, 19 pages.
Invitation to Pay Additional Fees received for PCT Patent Application No. PCT/US2008/050292, Jul. 18, 2008, 4 pages.
Tidwell, Jenifer, "Designing Interfaces", Section 85, magnetism, Nov. 21, 2005, 2 pages.
Notice of Allowance received for Japanese Patent Application No. 2018-090084, dated May 24, 2019, 4 pages (1 page of English Translation and 3 pages of Official Copy).
Office Action received for Australian Patent Application No. 2016229407, dated May 27, 2019, 4 pages.
Notice of Acceptance received for Australian Patent Application No. 2018200289, dated Jul. 23, 2019, 3 pages.
Notice of Allowance received for Chinese Patent Application No. 201480059543.9, dated Sep. 4, 2019, 2 pages (1 page of English Translation and 1 page of Official Copy).
Intention to Grant received for European Patent Application No. 14772002.3, dated Jun. 24, 2019, 9 pages.
Non-Final Office Action received for U.S. Appl. No. 15/655,253, dated Jul. 10, 2019, 16 pages.
Non-Final Office Action received for U.S. Appl. No. 14/913,345, dated Jun. 26, 2019, 23 pages.
Notice of Acceptance received for Australian Patent Application No. 2017202917, dated Jun. 7, 2019, 3 pages.

(56) References Cited

OTHER PUBLICATIONS

Notice of Allowance received for Korean Patent Application No. 10-2018-7032106, dated Jun. 28, 2019, 5 pages (2 pages of English Translation and 3 pages of Official Copy).
Office Action received for Australian Patent Application No. 2017254897, dated Jun. 28, 2019, 4 pages.
Office Action received for Korean Patent Application No. 10-2018-7013265, dated Jun. 14, 2019, 6 pages (2 pages of English Translation and 4 pages of official copy).

* cited by examiner

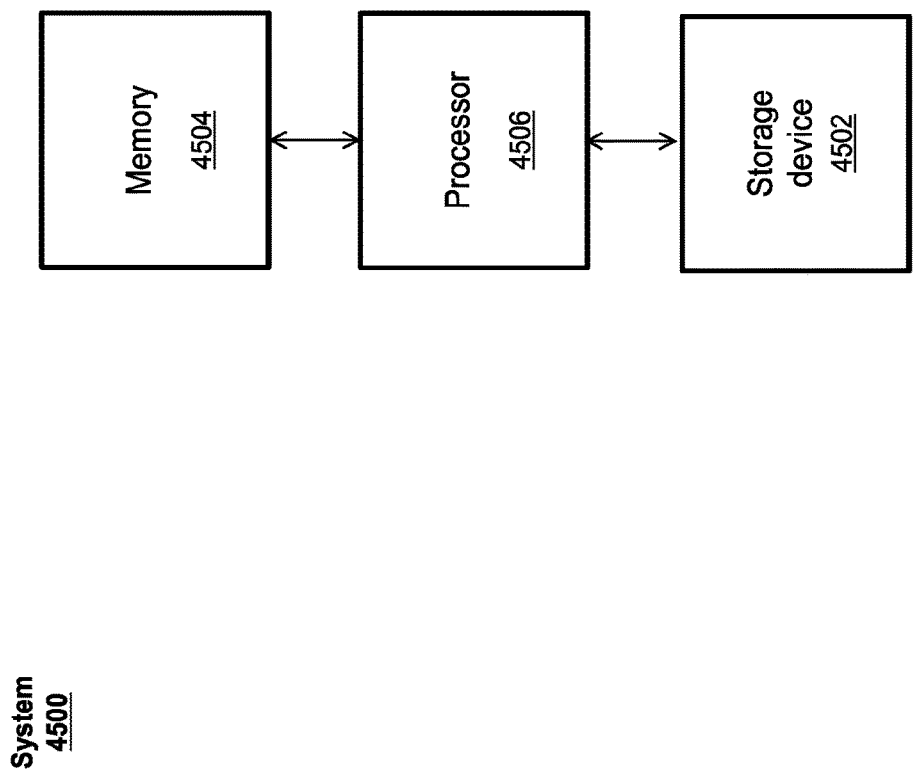

CROWN INPUT FOR A WEARABLE ELECTRONIC DEVICE

CROSS-REFERENCE TO RELATED APPLICATIONS

This application is a continuation of U.S. patent application Ser. No. 14/913,345, filed Feb. 19, 2016, entitled "CROWN INPUT FOR A WEARABLE ELECTRONIC DEVICE," which is a national stage application of International Patent Application Serial Number PCT/US2014/053951, filed Sep. 3, 2014, entitled "CROWN INPUT FOR A WEARABLE ELECTRONIC DEVICE", which claims priority to: U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES. International Patent Application Serial Number PCT/US2014/053951, filed Sep. 3, 2014, entitled "CROWN INPUT FOR WEARABLE A ELECTRONIC DEVICE," is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications is hereby incorporated by reference in its entirety for all purposes.

This application is related to International Patent Application Serial Number PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053957, filed Sep. 3, 2014, entitled "USER INTERFACE FOR MANIPULATING USER INTERFACE OBJECTS"; and International Patent Application Serial Number PCT/US2014/053958 filed Sep. 3, 2014, entitled "USER INTERFACE OBJECT MANIPULATIONS IN A USER INTERFACE".

FIELD

The following disclosure relates generally to wearable electronic devices and, more specifically, to interfaces for wearable electronic devices.

BACKGROUND

Advanced personal electronic devices can have small form factors. These personal electronic devices can include, but are not limited to, tablets and smart phones. Use of such personal electronic devices involves manipulation of user interface objects on display screens that also have small form factors to complement the design of the personal electronic devices.

Exemplary manipulations that users can perform on personal electronic devices can include navigating a hierarchy, selecting a user interface object, adjusting the position, size, and zoom of user interface objects, or otherwise manipulating the user interfaces. Exemplary user interface objects can include digital images, video, text, icons, maps, control elements, such as buttons, and other graphics. A user can perform such manipulations in image management software, video editing software, word processing software, software execution platforms, such as an operating system's desktop, website browsing software, and other environments.

Existing methods for manipulating user interface objects on reduced-size touch-sensitive displays can be inefficient. Further, existing methods generally provide less precision than is preferable.

SUMMARY

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the change in rotation angle of the crown. In other examples, a velocity of scrolling or a velocity of scaling can depend on a velocity of angular rotation of the crown. In these examples, a greater velocity of rotation can cause a greater velocity of scrolling or scaling to be performed on the displayed view.

BRIEF DESCRIPTION OF THE DRAWINGS

FIG. 45 illustrates an exemplary computing system for modifying a user interface in response to a rotation of a crown according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the change in rotation angle of the crown. In other examples, a velocity of scrolling or a velocity of scaling can depend on a velocity of angular rotation of the crown. In these examples, a greater velocity of rotation can cause a greater velocity of scrolling or scaling to be performed on the displayed view.

Figure 1:
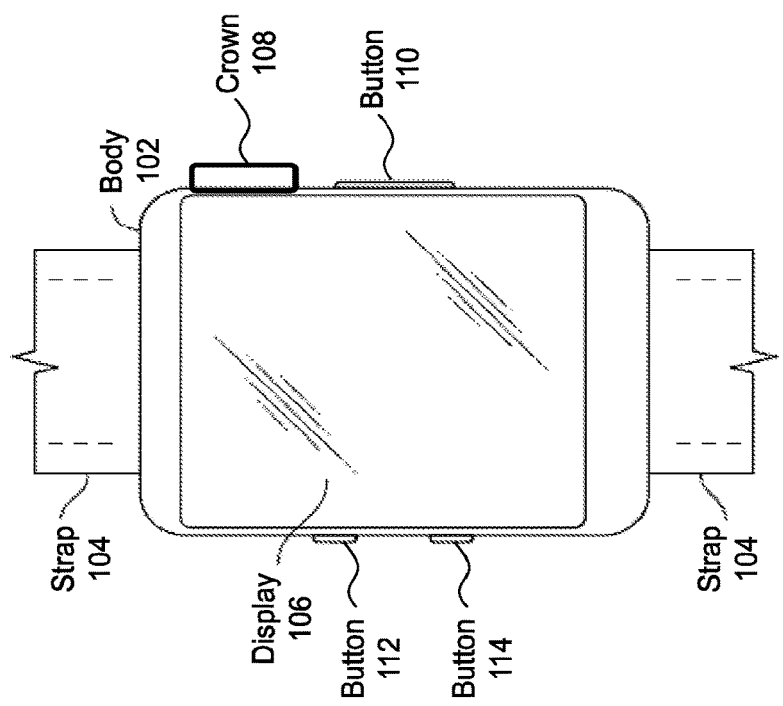
FIG. 1 illustrates an exemplary wearable electronic device according to various examples.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can be designed to couple with straps 104. Device 100 can have touch-sensitive display screen (hereafter touchscreen) 106 and crown 108. Device 100 can also have buttons 110, 112, and 114.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching over hovering near the touch sensor panel using one or more fingers or other object.

In some examples, device 100 can further include one or more pressure sensors (not shown) for detecting an amount of force or pressure applied to the display. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position that the force is being applied to display 106.

Figure 2:
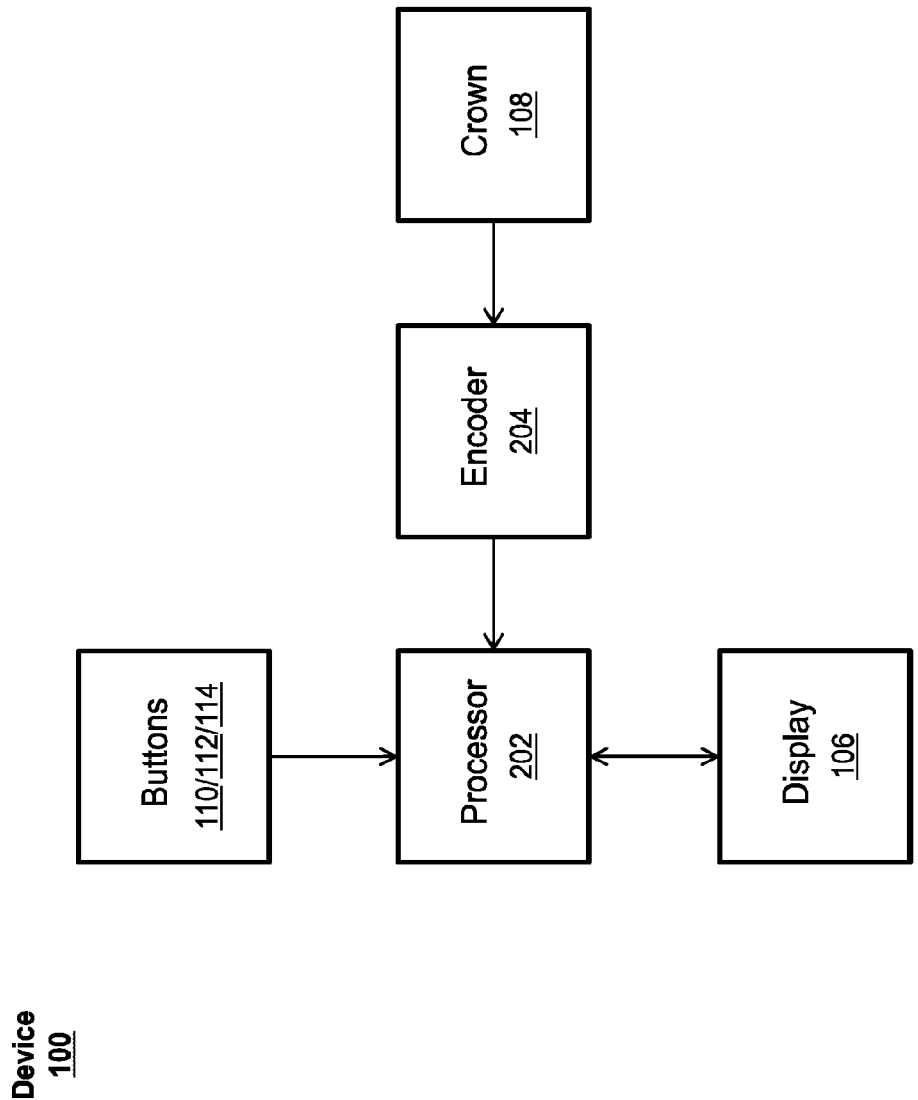
FIG. 2 illustrates a block diagram of an exemplary wearable electronic device according to various examples.

FIG. 2 illustrates a block diagram of some of the components of device 100. As shown, crown 108 can be coupled to encoder 204, which can be configured to monitor a physical state or change of physical state of crown 108 (e.g., the position of the crown), convert it to an electrical signal (e.g., convert it to an analog or digital signal representation of the position or change in position of crown 108), and provide the signal to processor 202. For instance, in some examples, encoder 204 can be configured to sense the absolute rotational position (e.g., an angle between 0-360° of crown 108 and output an analog or digital representation of this position to processor 202. Alternatively, in other examples, encoder 204 can be configured to sense a change in rotational position (e.g., a change in rotational angle) of crown 108 over some sampling period and to output an analog or digital representation of the sensed change to processor 202. In these examples, the crown position information can further indicate a direction of rotation of the crown (e.g., a positive value can correspond to one direction and a negative value can correspond to the other). In yet other examples, encoder 204 can be configured to detect a rotation of crown 108 in any desired manner (e.g., velocity, acceleration, or the like) and can provide the crown rotational information to processor 202. The rotational velocity can be expressed in numerous ways. For example, the rotational velocity can be expressed in a direction and a speed of rotation, such as hertz, as rotations per unit of time, as rotations per frame, as revolutions per unit of time, as revolutions per frame, as a change in angle per unit of time, and the like. In alternative examples, instead of providing information to processor 202, this information can be provided to other components of device 100. While the examples described herein refer to the use of rotational position of crown 108 to control scrolling or scaling of a view, it should be appreciated that any other physical state of crown 108 can be used.

In some examples, the physical state of the crown can control physical attributes of display 106. For example, if crown 108 is in a particular position (e.g., rotated forward), display 106 can have limited z-axis traversal ability. In other words, the physical state of the crown can represent physical modal functionality of display 106. In some examples, a temporal attribute of the physical state of crown 108 can be used as an input to device 100. For example, a fast change in physical state can be interpreted differently than a slow change in physical state.

Processor 202 can be further coupled to receive input signals from buttons 110, 112, and 114, along with touch signals from touch-sensitive display 106. Processor 202 can be configured to interpret these input signals and output appropriate display signals to cause an image to be produced by touch-sensitive display 106. While a single processor 202 is shown, it should be appreciated that any number of processors or other computational devices can be used to perform the general functions discussed above.

Figure 3:
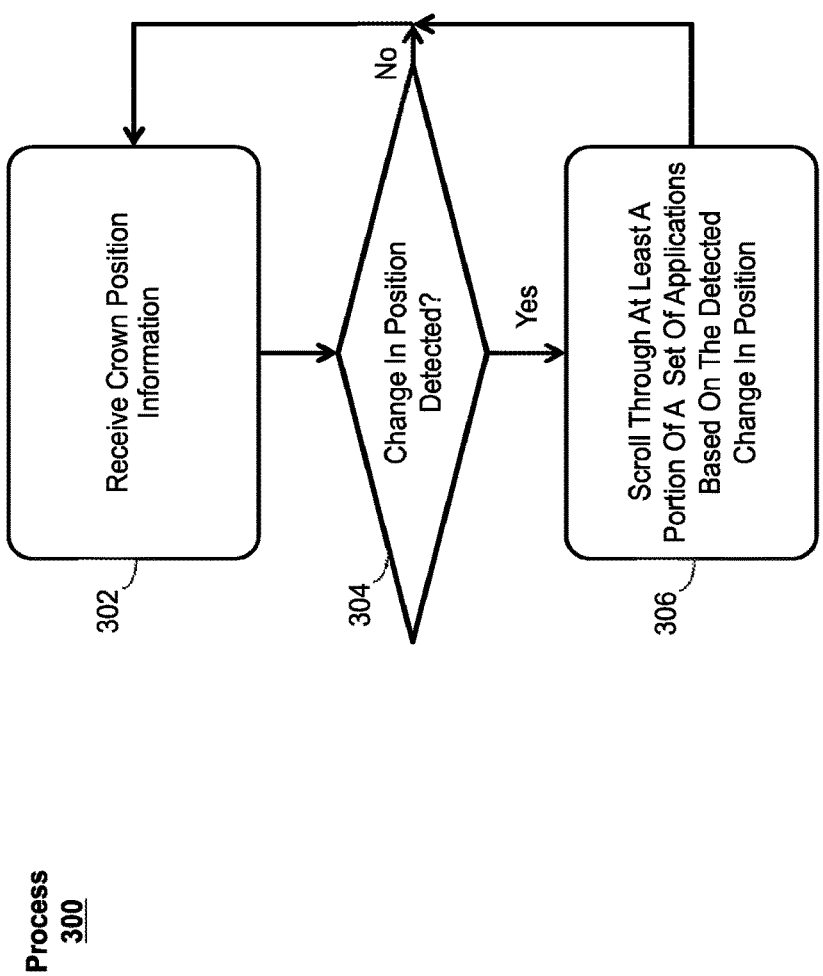
FIG. 3 illustrates an exemplary process for scrolling through applications using a crown according to various examples.

FIG. 3 illustrates an exemplary process 300 for scrolling through a set of displayed applications using a crown according to various examples. In some examples, process 300 can be performed by a wearable electronic device similar to device 100. In these examples, a visual representation (e.g., icons, graphical images, textual images, and the like) of one or more applications of a set of applications can be displayed on display 106 of device 100 and process 300 can be performed to visually scroll through the set of applications by sequentially displaying the applications in response to a turning of crown 108. In some examples, the scrolling can be performed by translating the displayed contents along a fixed axis.

At block 302, crown position information can be received. In some examples, the crown position information can include an analog or digital representation of the absolute position of the crown, such as an angle between 0-360°. In other examples, the crown position information can include an analog or digital representation of a change in rotational position of the crown, such as a change in rotational angle. For example, an encoder similar to encoder 204 can be coupled to a crown similar to crown 108 to monitor and measure its position. The encoder can convert the position of crown 108 into crown position information that can be transmitted to a processor similar to processor 202.

At block 304, it can be determined if a change in position has been detected. In some examples, where the crown position information includes an absolute position of the crown, determining whether a change in position has occurred can be performed by comparing the position of the crown at two different instances in time. For example, the processor (e.g., processor 202) can compare the most recent position of the crown (e.g., crown 108) as indicated by the crown position information to an earlier (e.g., immediately preceding) position of the crown as indicated by previously received crown position information. If the positions are the same or within a threshold value (e.g., a value corresponding to a tolerance of the encoder), it can be determined that no change in position has occurred. If, however, the positions are not the same or are different by at least the threshold value, it can be determined that a change in position has occurred. In other examples, where the crown position information includes a change in position over some length of time, determining whether a change in position has occurred can be performed by determining whether the absolute value of the change in position is equal to zero or is less than a threshold value (e.g., a value corresponding to a tolerance of the encoder). If the absolute value of the change in position is equal to zero or is less than the threshold value, it can be determined that no change in position has occurred. If, however, the absolute value of the change in position is greater than zero or the threshold value, it can be determined that a change in position has occurred.

If it is determined at block 304 that no change in position of the crown has been detected, the process can return to block 302 where new crown position information can be received. If, however, it is instead determined at block 304 that that a change in position of the crown has been detected, the process can proceed to block 306. As described herein, a positive determination at block 304 can cause the process to proceed to block 306, while a negative determination can cause the process to return to block 302. However, it should be appreciated that the determination performed at block 304 can be reversed such that a positive determination can cause the process to return to block 302, while a negative determination can cause the process to proceed to block 306. For example, block 304 can alternatively determine if no change in position is detected.

At block 306, at least a portion of a set of applications can be scrolled through based on the detected change in position. The set of applications can include any ordered or unordered set of applications. For example, the set of applications can include all applications stored on the wearable electronic device, all open applications on the wearable electronic device, a user-selected set of applications, or the like. Additionally, the applications can be ordered based on frequency of use, a user-defined ordering, relevance, or any other desired ordering.

In some examples, block 306 can include visually scrolling through the set of applications by sequentially displaying the applications in response to the detected change in position of the crown. For example, the display (e.g., display 106) can be displaying one or more applications of the set of applications. In response to detecting a change in position of the crown (e.g., crown 108), the currently displayed one or more applications can be translated off the display to make room for one or more other applications to be translated onto the display. In some examples, the one or more other applications being translated onto the display can be selected for display based on their relative ordering within the set of applications corresponding to the direction opposite the direction of translation. The direction of the translation can depend on the direction of the change in position of the crown. For example, turning the crown clockwise can cause a scrolling of the display in one direction, while turning the crown counter-clockwise can cause a scrolling of the display in a second (e.g., opposite) direction. Additionally, the distance or speed of scrolling can depend on the amount of detected change in the position of the crown. The distance of scrolling can refer to the on-screen distance that the content is scrolled. The speed of scrolling can refer to the distance that the content is scrolled over a length of time. In some examples, the distance or speed of the scrolling can be proportional to the amount of detected rotation. For instance, the amount of scroll corresponding to a half-turn of the crown can be equal to 50% of the amount of scroll corresponding to a full turn of the crown. In some examples where the set of applications includes an ordered list of applications, the scrolling can stop in response to reaching the end of the list. In other examples, the scrolling can continue by looping around to the opposite end of the list of applications. The process can then return to block 302 where new crown position information can be received.

It should be appreciated that the actual values used to linearly map the change in crown position to the distance or speed of scrolling can be varied depending on the desired functionality of the device. Moreover, it should be appreciated that other mappings between the scroll amount or speed and the change in the position of the crown can be used. For example, acceleration, velocity (described in greater detail below with respect to FIGS. 21-44), or the like, can be used to determine the distance or speed of scrolling. Additionally, non-linear mappings between the crown characteristic (e.g., position, velocity, acceleration, etc.) and the scroll amount or scroll speed can be used.

Figure 4:
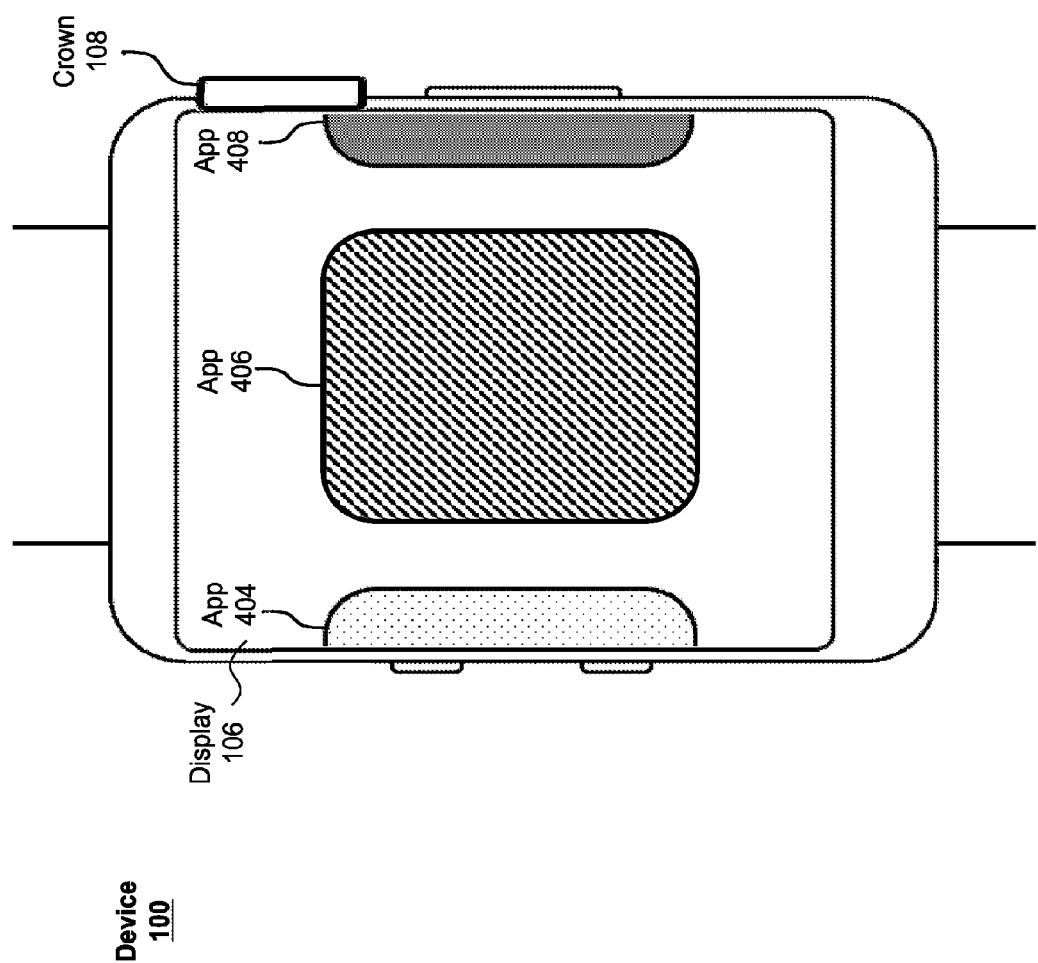
FIGS. 4-8 illustrate screens showing the scrolling of applications using the process of FIG. 3.

To further illustrate the operation of process 300, FIG. 4 depicts an example interface of device 100 having a visual representation (e.g., icons, graphical images, textual images, and the like) of application 406 and portions of the visual representations of applications 404 and 408. Applications 404, 406, and 408 can be part of a set of applications that includes any group of any number of ordered or unordered applications (e.g., all applications on device 100, all open applications on device 100, user favorites, or the like). At block 302 of process 300, processor 202 of device 100 can receive crown position information from encoder 204. Since crown 108 is not being rotated in FIG. 4, a negative determination can be made by processor 202 at block 304, causing the process to return to block 302.

Figure 5:
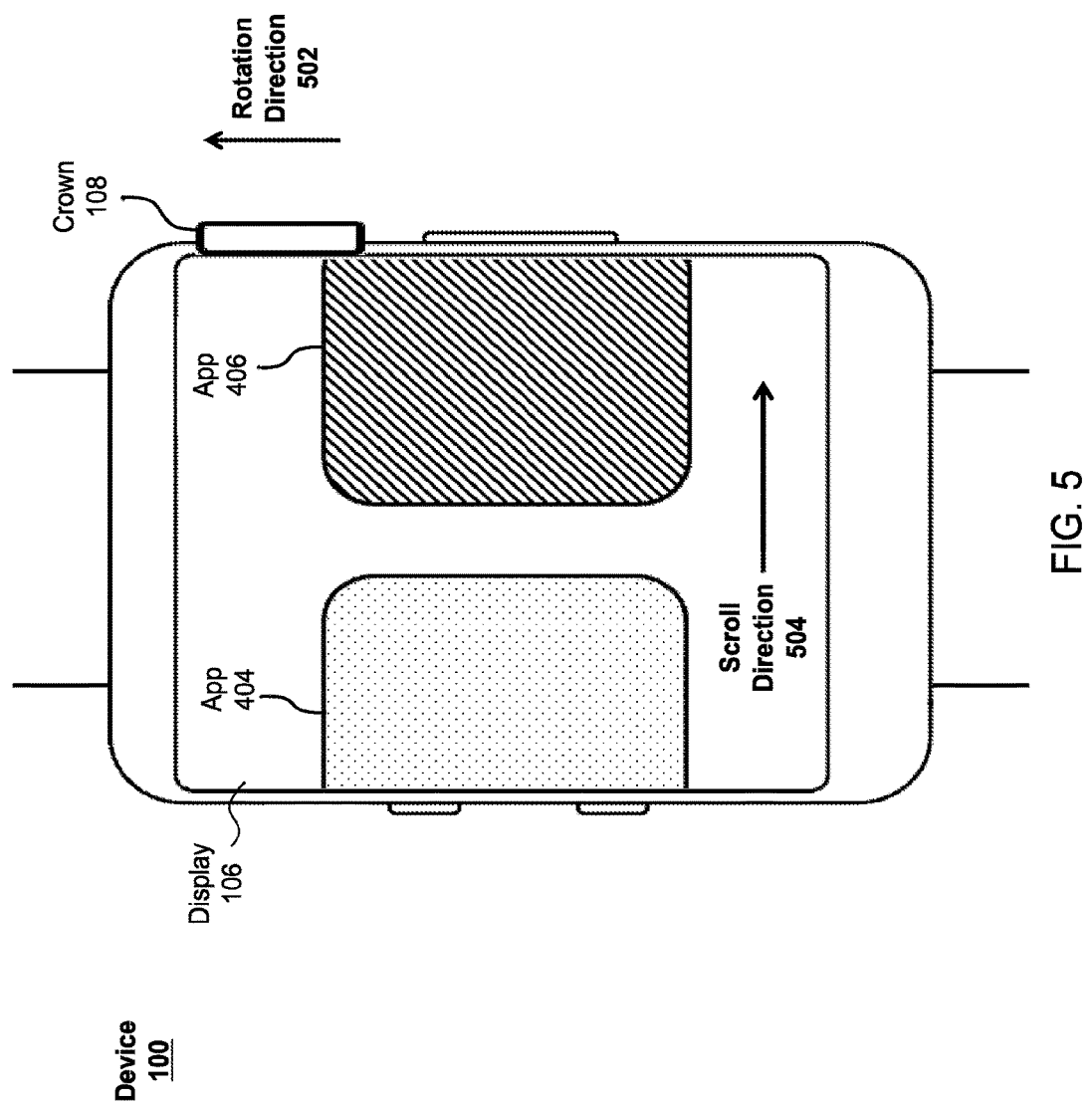

Referring now to FIG. 5, crown 108 is being rotated in the upward direction as indicated by rotation direction 502.

Figure 6:
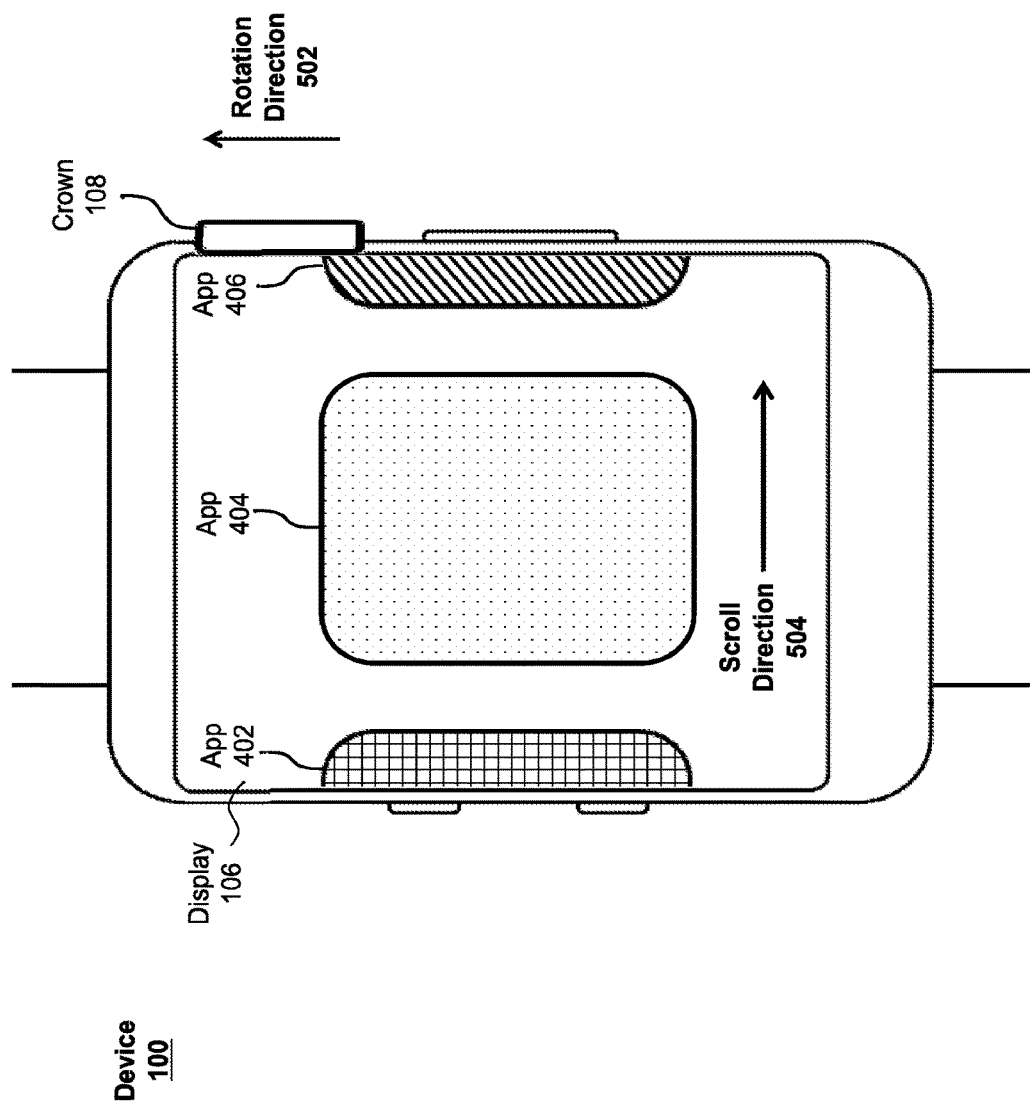

Processor 202 can again receive crown position information that reflects this rotation from encoder 204 at block 302 of process 300. Thus, processor 202 can make a positive determination at block 304, causing the process to proceed to block 306. At block 306, processor 202 can cause display 106 to scroll through at least a portion of the set of applications on device 100. The scrolling can have a scroll direction 504 corresponding to the rotation direction 502 of crown 108 and a scroll amount or speed based on a characteristic (e.g., distance, velocity, acceleration, or the like) of the rotation of crown 108. In the illustrated example, the scroll distance can be proportional to the amount of rotation of crown 108. As shown, display 106 can scroll through the set of applications by causing the visual representations of the applications to translate in scroll direction 504. As a result, application 408 has been completely removed from display 106, a portion of application 406 has been removed from display 106, and a greater portion of application 404 is displayed on display 106. As the user continues to rotate crown 108 in rotation direction 502, processor 202 can continue to cause display 106 to scroll the view of the set of applications in scroll direction 504, as shown in FIG. 6. In FIG. 6, application 406 is barely visible on the right side of display 106, application 404 is centered within display 106, and a newly displayed application 402 is displayed on the left side of display 106. In this example, application 402 can be another application within the set of applications and can have an ordered position to the left or previous to application 404. In some examples, if application 402 is the first application in the list of applications and the user continues to rotate crown 108 in rotation direction 502, processor 202 can limit the scrolling of display 106 to stop scrolling once application 402 is centered within the display. Alternatively, in other examples, processor 202 can continue the scrolling of display 106 by looping to the end of the set of applications to cause the last application (e.g., application 408) of the set of applications to be displayed to the left of application 402.

Figure 7:
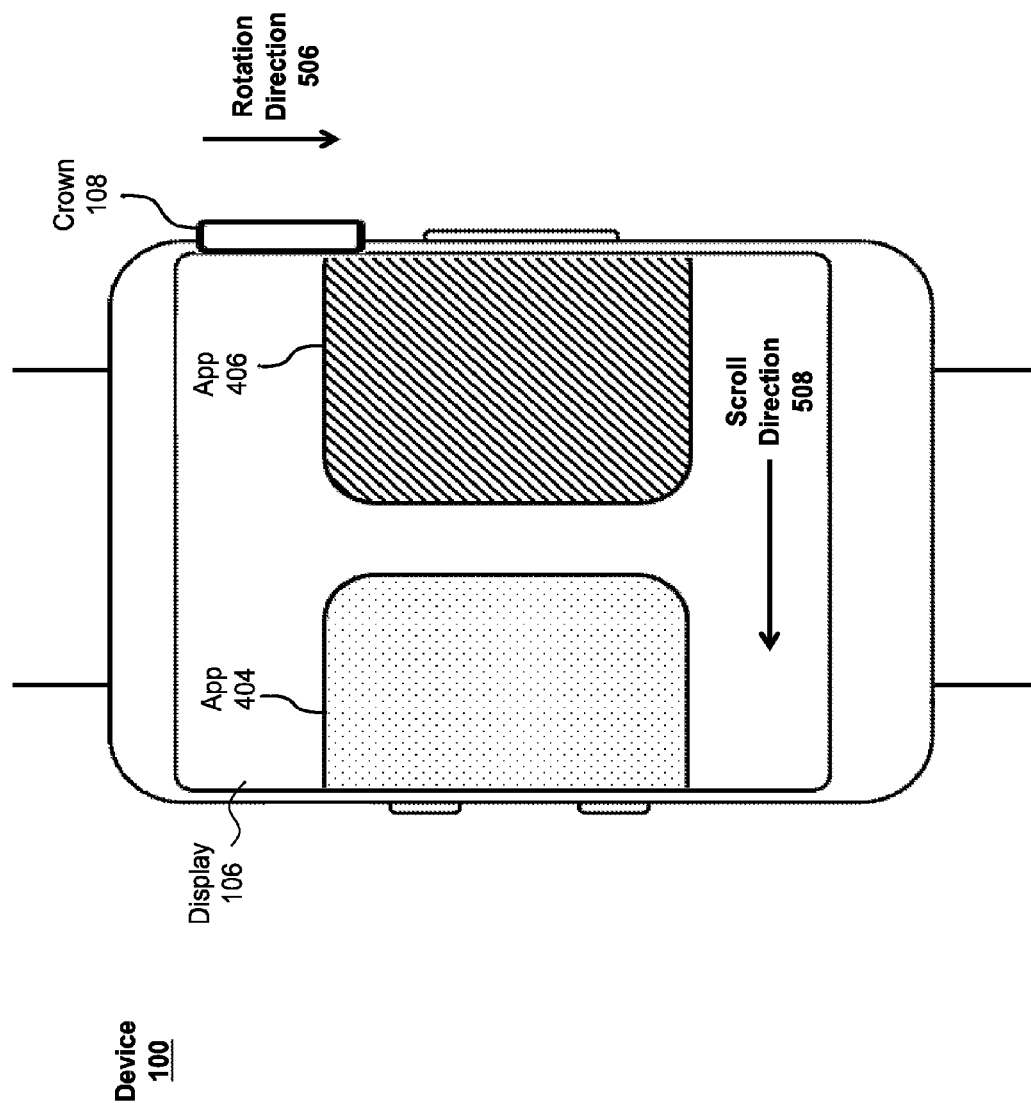
Figure 8:
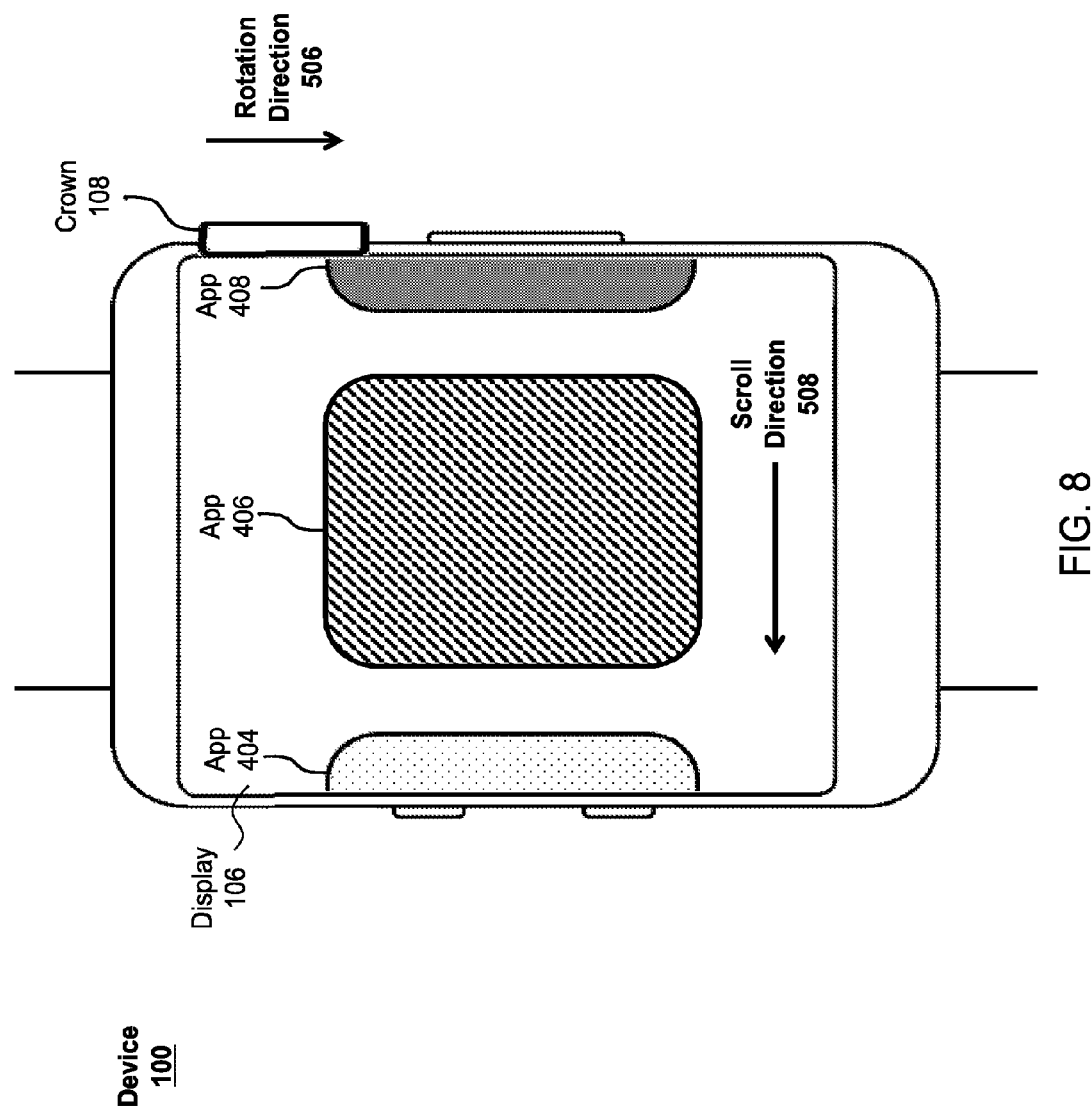

Referring now to FIG. 7, crown 108 is being rotated in the downward rotation direction 506. Processor 202 can again receive crown position information that reflects this rotation from encoder 204 at block 302 of process 300. Thus, processor 202 can make a positive determination at block 304, causing the process to proceed to block 306. At block 306, processor 202 can cause display 106 to scroll the view of applications in scroll direction 508 corresponding to rotation direction 506. In this example, scroll direction 508 is in the opposite direction of scroll direction 504. However, it should be appreciated that scroll direction 508 can be in any desired direction. Similar to the scrolling performed in response to rotation of crown 108 in rotation direction 502, the scrolling performed in response to the rotation of crown 108 in rotation direction 506 can depend on a characteristic (e.g., distance, velocity, acceleration, or the like) of the rotation of crown 108. In the illustrated example, the scroll distance can be proportional to the amount of rotation of crown 108. As shown, display 106 can scroll through the set of applications by causing the visual representations of the applications to translate in scroll direction 508. As a result, application 402 has been completely removed from display 106, a portion of application 404 has been removed from display 106, and a greater portion of application 406 is displayed on display 106. As the user continues to rotate crown 108 in rotation direction 506, processor 202 can continue to cause display 106 to scroll the view of the set of applications in scroll direction 508, as shown in FIG. 8. In FIG. 8, application 404 is barely visible on the left side of display 106, application 406 is centered within display 106, and application 408 is again displayed on the right side of display 106. In some examples, if application 408 is the last application in the list of applications and the user were to continue to rotate crown 108 in rotation direction 508, processor 202 can limit the scrolling of display 106 to stop scrolling once application 408 is centered within the display. Alternatively, in other examples, processor 202 can continue the scrolling of display 106 by looping to the start of the set of applications to cause the first application (e.g., application 402) of the set of applications to be displayed to the right of application 408.

While a specific scrolling example is provided, it should be appreciated that other displays of applications can similarly be scrolled using a mechanical crown of a wearable electronic device in a similar manner. Additionally, the distance or speed of scrolling can be configured to depend on any characteristic of the crown.

Figure 9:
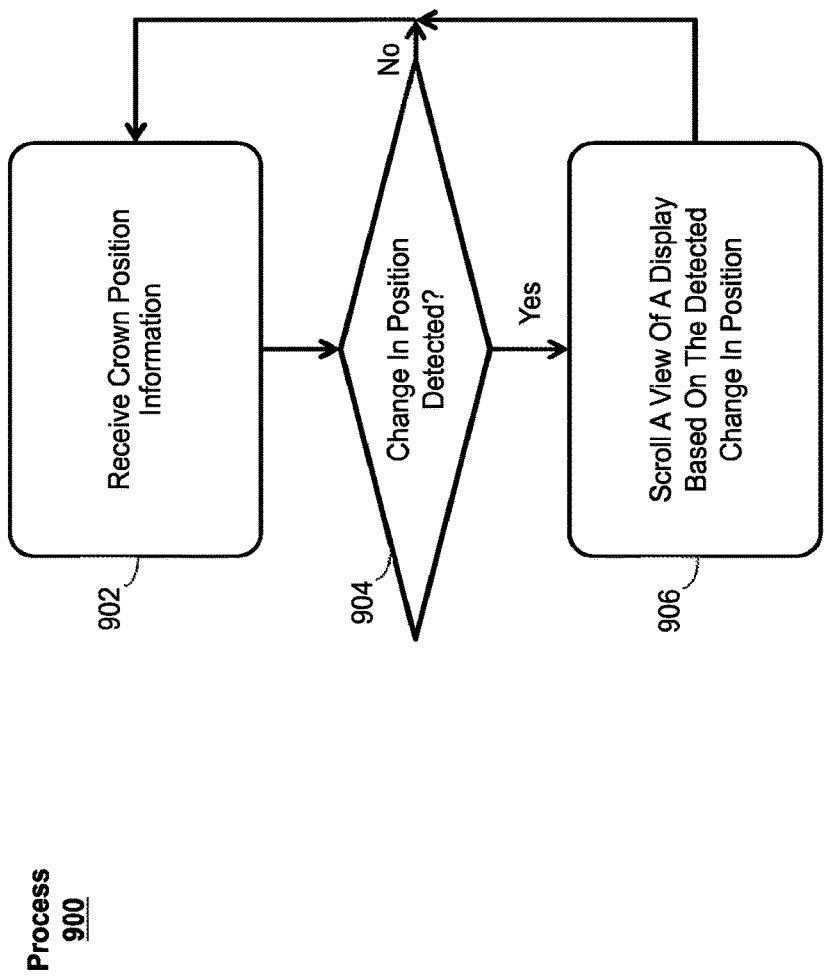
FIG. 9 illustrates an exemplary process for scrolling a view of a display using a crown according to various examples.

FIG. 9 illustrates an exemplary process 900 for scrolling a view of a display using a crown according to various examples. The view can include a visual representation of any type of data being displayed. For example, the view can include a display of a text, a media item, a webpage, a map, or the like. Process 900 can be similar to process 300, except that it can be more generally applied to any type of content or view being displayed on the display of a device. In some examples, process 900 can be performed by a wearable electronic device similar to device 100. In these examples, content or any other view can be displayed on display 106 of device 100 and process 900 can be performed to visually scroll the view in response to a turning of crown 108. In some examples, the scrolling can be performed by translating the displayed contents along a fixed axis.

At block 902, crown position information can be received in a manner similar or identical to that described above with respect to block 302. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 904, it can be determined if a change in position has been detected in a manner similar or identical to that described above with respect to block 304. For instance, block 904 can include comparing the position of the crown at two different instances in time, or can include determining if an absolute value of a change in crown position is equal to zero or below a threshold value. If no change in position is detected, the process can return to block 902. Alternatively, if a change in position is detected, the process can proceed to block 906. As described herein, a positive determination at block 904 can cause the process to proceed to block 906, while a negative determination can cause the process to return to block 902. However, it should be appreciated that the determination performed at block 904 can be reversed such that a positive determination can cause the process to return to block 902, while a negative determination can cause the process to proceed to block 906. For example, block 904 can alternatively determine if no change in position is detected.

At block 906, a view of a display can be scrolled based on the detected change in position. Similar to block 306 of process 300, block 906 can include visually scrolling a view by translating the view of the display in response to the detected change in position of the crown. For example, the display (e.g., display 106) can be displaying a portion of some content. In response to detecting a change in position of the crown (e.g., crown 108), the currently displayed portion of the content can be translated off the display to make room for other portions of the content that were not previously displayed. The direction of the translation can depend on the direction of the change in position of the crown. For example, turning the crown clockwise can cause a scrolling of the display in one direction, while turning the crown counter-clockwise can cause a scrolling of the display in a second (e.g., opposite) direction. Additionally, the distance or speed of scrolling can depend on the amount of detected change in the position of the crown. In some examples, the distance or speed of the scrolling can be proportional to the amount of detected rotation. For instance, the amount of scroll corresponding to a half-turn of the crown can be equal to 50% of the amount of scroll corresponding to a full turn of the crown. The process can then return to block 902 where new crown position information can be received.

It should be appreciated that the actual values used to linearly map the change in crown position to the distance or speed of scrolling can be varied depending on the desired functionality of the device. Moreover, it should be appreciated that other mappings between the scroll amount and change in position can be used. For example, acceleration, velocity (described in greater detail below with respect to FIGS. 21-44), or the like, can be used to determine the distance or speed of scrolling. Additionally, non-linear mappings between the crown characteristic (e.g., position, velocity, acceleration, etc.) and the scroll amount or scroll speed can be used.

Figure 10:
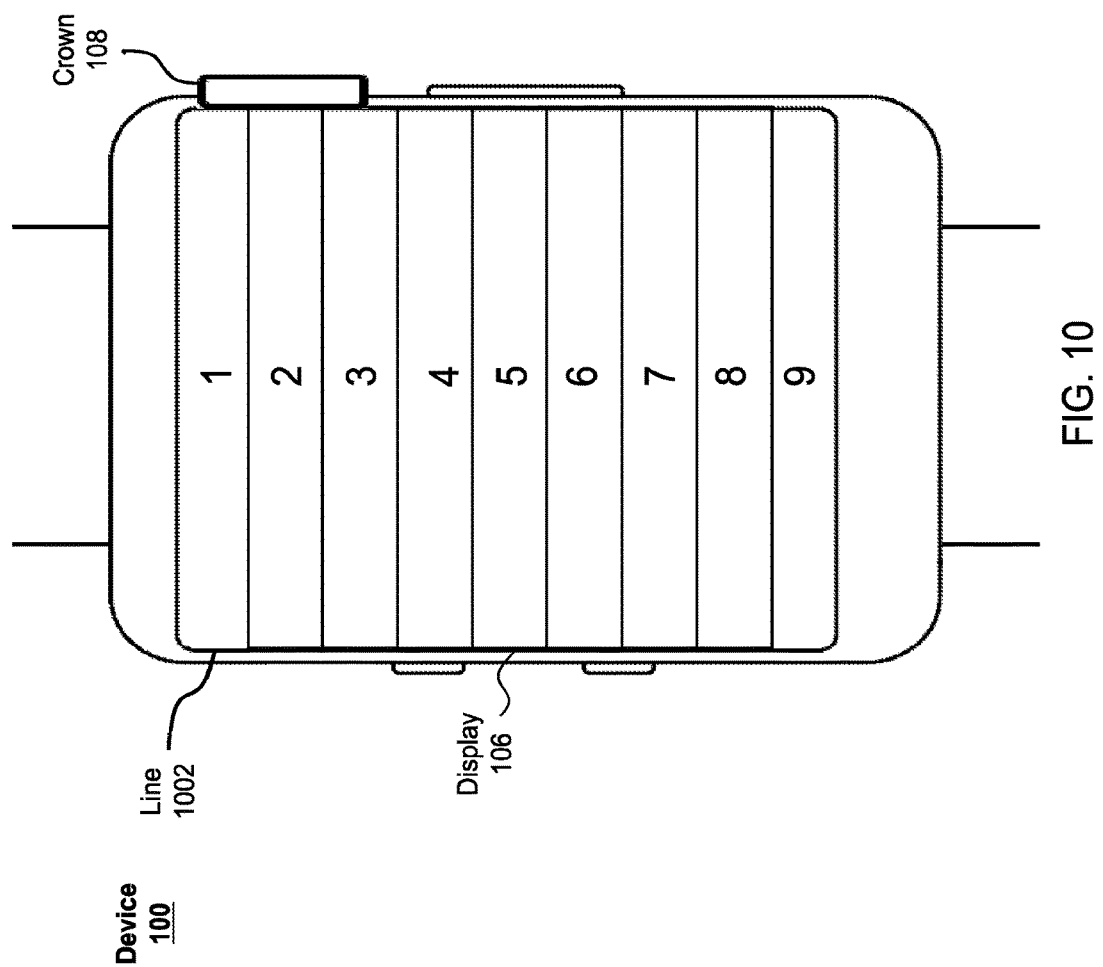
FIGS. 10-14 illustrate screens showing the scrolling of a view of a display using the process of FIG. 9.

To further illustrate the operation of process 900, FIG. 10 depicts an example interface of device 100 having a visual representation of lines of text containing numbers 1-9. At block 902 of process 900, processor 202 of device 100 can receive crown position information from encoder 204. Since crown 108 is not being rotated in FIG. 10, a negative determination can be made by processor 202 at block 904, causing the process to return to block 902.

Figure 11:
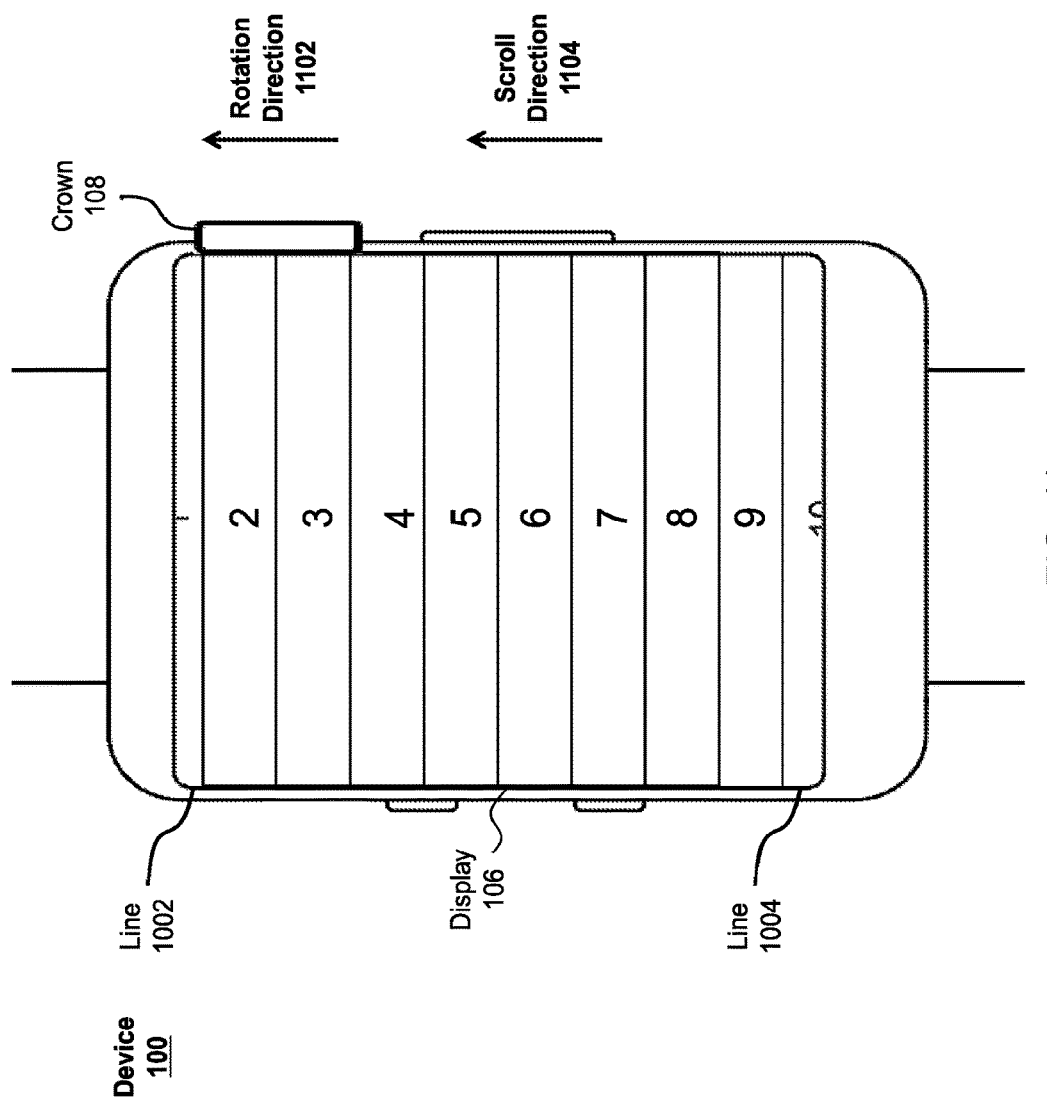
Figure 12:
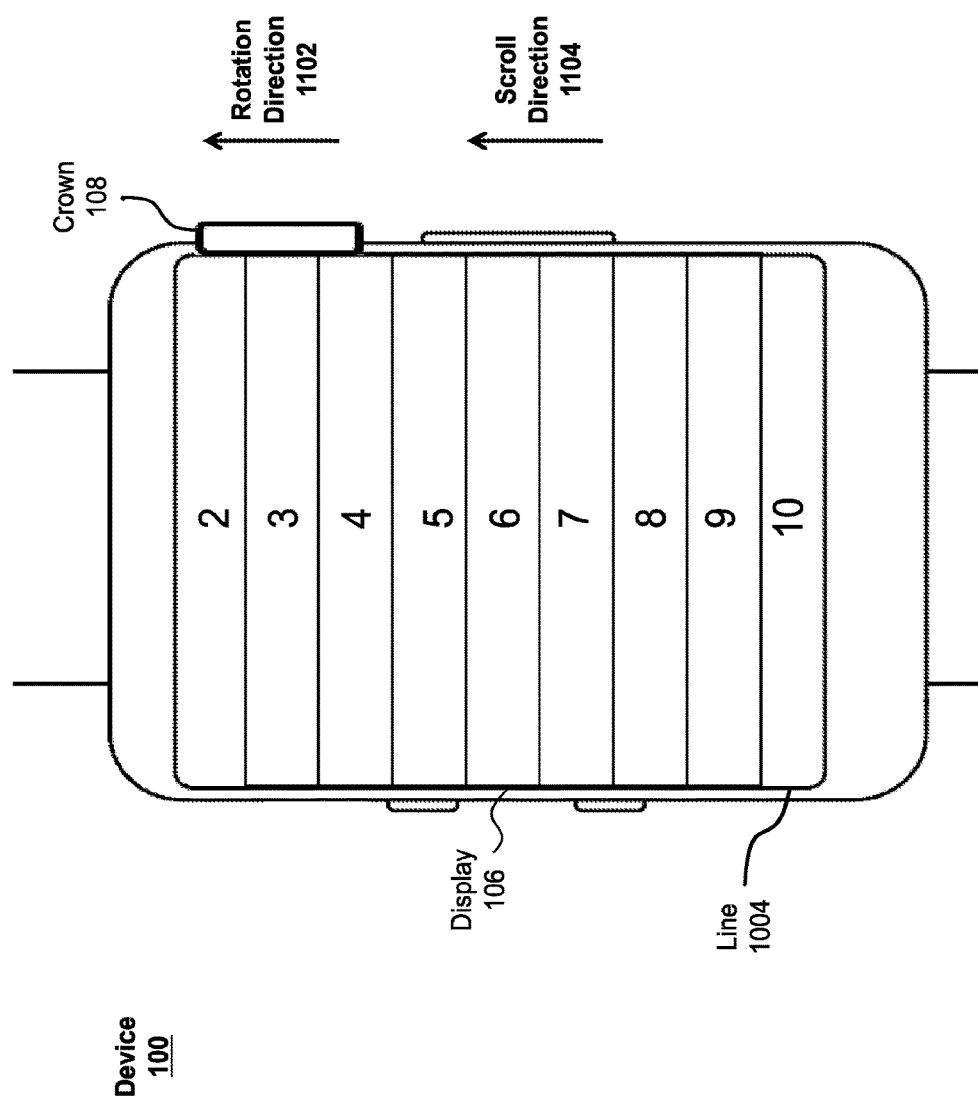

Referring now to FIG. 11, crown 108 is being rotated in the upward rotation direction 1102. Processor 202 can again receive crown position information that reflects this rotation from encoder 204 at block 902 of process 900. Thus, processor 202 can make a positive determination at block 904, causing the process to proceed to block 906. At block 906, processor 202 can cause display 106 to scroll through the lines of text being displayed on display 106. The scrolling can have a scroll direction 1104 corresponding to the rotation direction 1102 of crown 108 and a scroll amount or speed based on a characteristic (e.g., distance, velocity, acceleration, or the like) of the rotation of crown 108. In the illustrated example, the scroll distance can be proportional to the amount of rotation of crown 108. As shown, display 106 can scroll through the lines of text by causing the text to translate in scroll direction 1104. As a result, a portion of line 1002 has been removed from display 106, while a portion of line 1004 is newly displayed on the bottom of display 106. The lines of text between lines 1002 and 1004 have similarly been translated in scroll direction 1104. As the user continues to rotate crown 108 in rotation direction 1102, processor 202 can continue to cause display 106 to scroll the lines of text in scroll direction 1104, as shown in FIG. 12. In FIG. 12, line 1002 is no longer visible within display 106 and line 1004 is now completely in view of display 106. In some examples, if line 1004 is the last line of text and the user continues to rotate crown 108 in rotation direction 1102, processor 202 can limit the scrolling of display 106 to stop scrolling once line 1004 is fully displayed within display 106. In other examples, processor 202 can continue the scrolling of display 106 by looping to the start of the lines of text to cause the first line of text (e.g., line 1002) to be displayed below line 1004. In yet other examples, a rubberbanding effect can be performed by displaying a blank space below line 1004, and snapping the lines of text back to align line 1004 with the bottom of display 106 in response to a stop in rotation of crown 108. It should be appreciated that the action performed in response to reaching the end of content displayed within display 106 can be selected based on the type of data being displayed.

Figure 13:
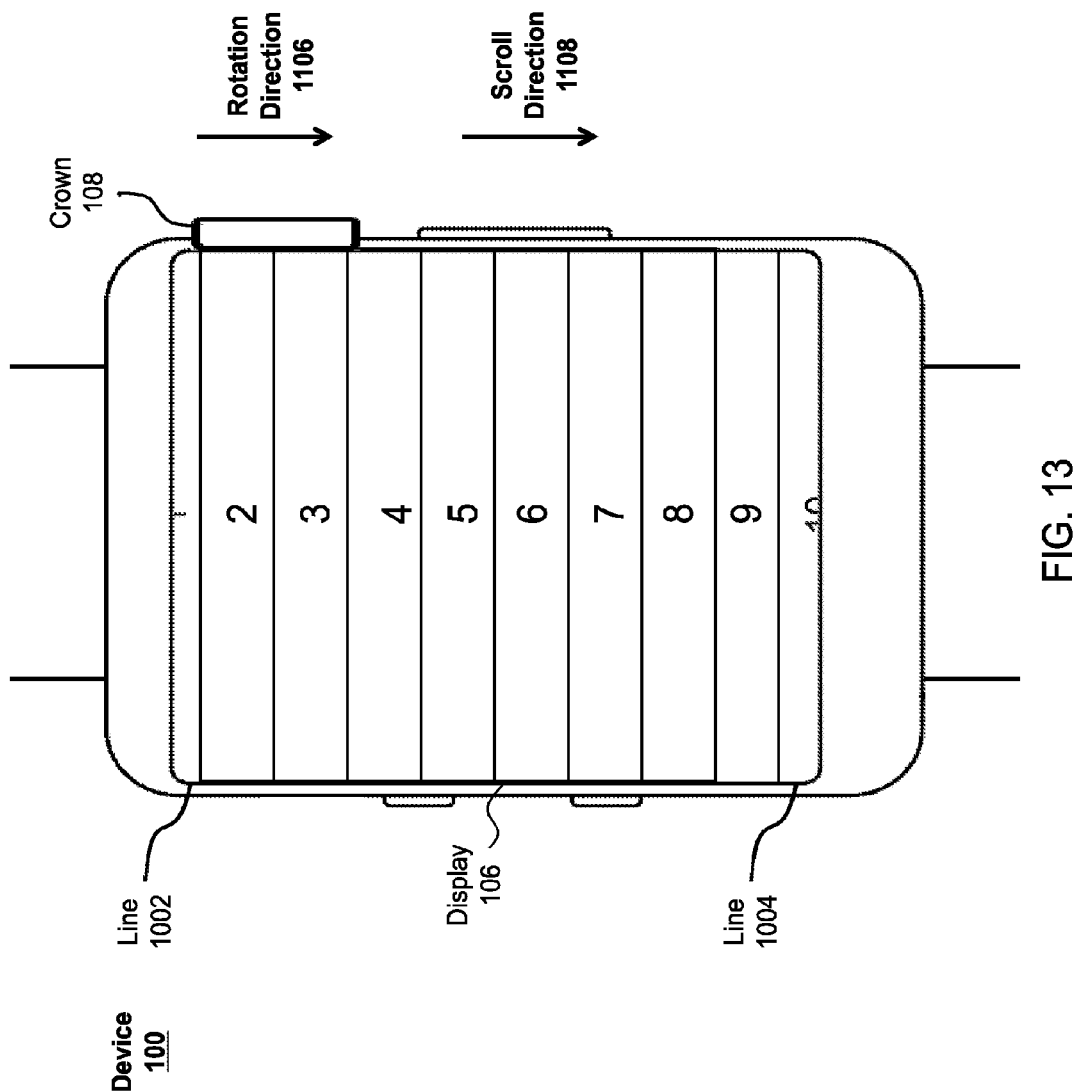
Figure 14:
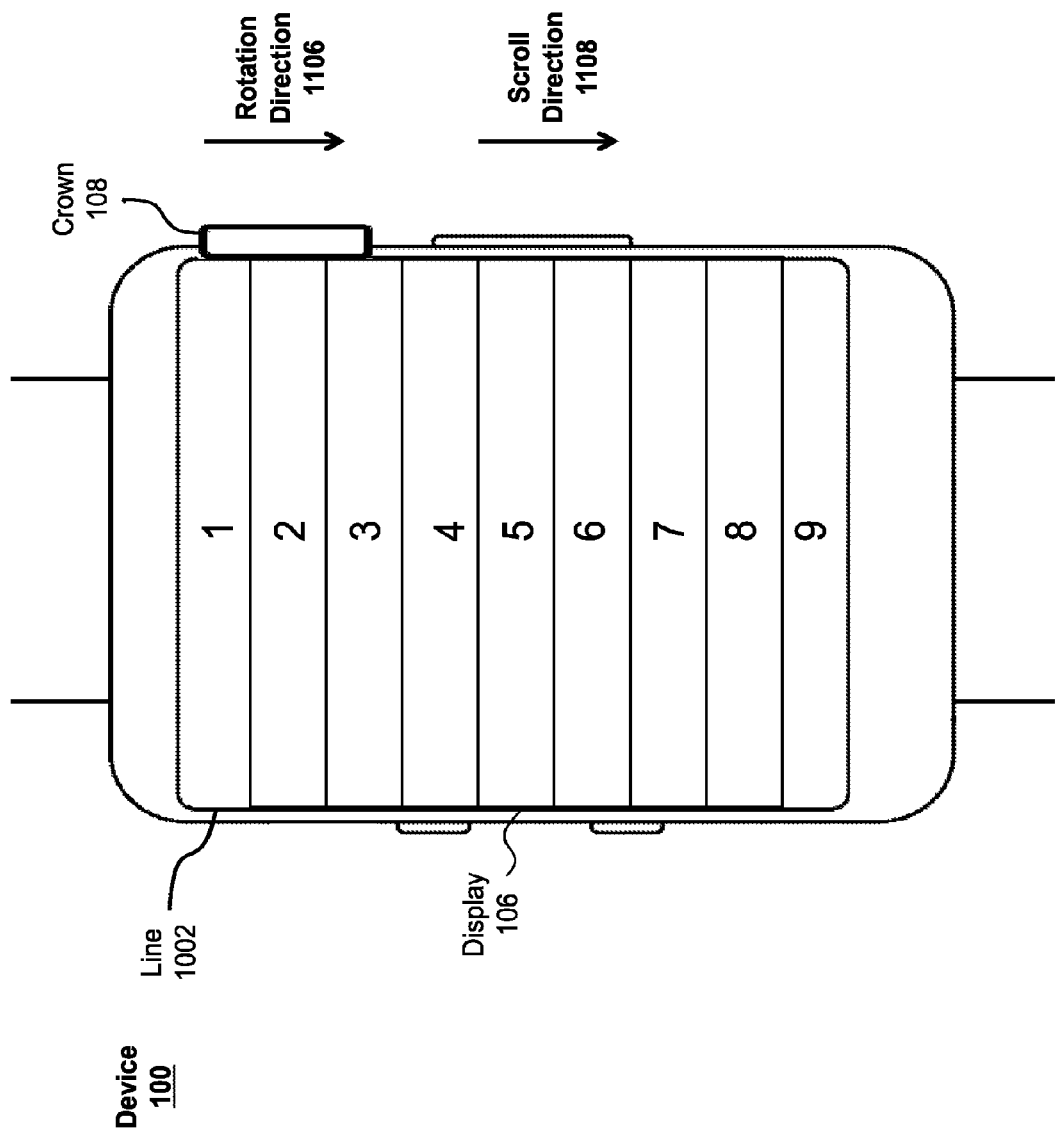

Referring now to FIG. 13, crown 108 is being rotated in the downward rotation direction 1106. Processor 202 can again receive crown position information that reflects this rotation from encoder 204 at block 902 of process 900. Thus, processor 202 can make a positive determination at block 904, causing the process to proceed to block 906. At block 906, processor 202 can cause display 106 to scroll the lines of text in scroll direction 1108 corresponding to rotation direction 1106. In this example, scroll direction 1108 is in the opposite direction of scroll direction 1104. However, it should be appreciated that scroll direction 1108 can be in any desired direction. Similar to the scrolling performed in response to rotation of crown 108 in rotation direction 1102, the scrolling performed in response to the rotation of crown 108 in rotation direction 1106 can depend on a characteristic (e.g., distance, velocity, acceleration, or the like) of the rotation of crown 108. In the illustrated example, the scroll distance can be proportional to the amount of rotation of crown 108. As shown, display 106 can scroll through the lines of text by causing the lines of text to translate in scroll direction 1108. As a result, a portion of line 1004 can be removed from display 106, while a portion of line 1002 can again be displayed at the top of display 106. As the user continues to rotate crown 108 in rotation direction 1106, processor 202 can continue to cause display 106 to scroll the lines of text in scroll direction 1108, as shown in FIG. 14. As shown in FIG. 14, line 1004 has been translated off of display 106, while line 1002 is now fully visible. In some examples, if line 1002 is the first line of text and the user continues to rotate crown 108 in rotation direction 1106, processor 202 can limit the scrolling of display 106 to stop scrolling once line 1002 is at the top of display 106. In other examples, processor 202 can continue the scrolling of display 106 by looping to the end of the lines of text to cause the last line of text (e.g., line 1004) to be displayed above line 1002. In yet other examples, a rubberbanding effect can be performed by displaying a blank space above line 1002, and snapping the lines of text back to align line 1002 with the top of display 106 in response to a stop in rotation of crown 108. It should be appreciated that the action performed in response to reaching the end of content displayed within display 106 can be selected based on the type of data being displayed.

While a specific scrolling example is provided, it should be appreciated that other types of data, such as media items, webpages, or the like, can similarly be scrolled using a mechanical crown of a wearable electronic device in a similar manner. Additionally, the distance or speed of scrolling can be configured to depend on any characteristic of the crown.

Figure 15:
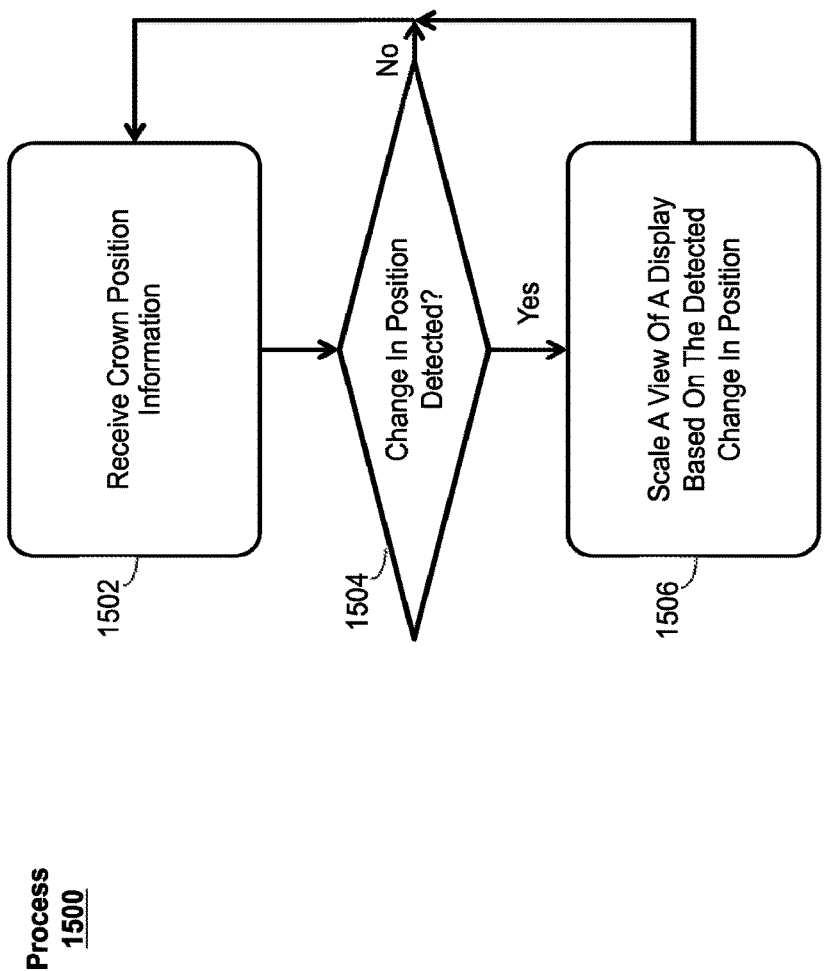
FIG. 15 illustrates an exemplary process for scaling a view of a display using a crown according to various examples.

FIG. 15 illustrates an exemplary process 1500 for scaling a view (e.g., zooming in or out) of a display using a crown according to various examples. The view can include a visual representation of any type of data being displayed. For example, the view can include a display of a text, a media item, a webpage, a map, or the like. Process 1500 can be similar to processes 300 and 900, except that instead of scrolling between applications or scrolling a view of a device, the view can be scaled positively or negatively in response to rotation of the crown. In some examples, process 1500 can be performed by a wearable electronic device similar to device 100. In these examples, content or any other view can be displayed on display 106 of device 100 and process 1500 can be performed to visually scale the view in response to a turning of crown 108.

At block 1502, crown position information can be received in a manner similar or identical to that described above with respect to block 302 or 902. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 1504, it can be determined if a change in position has been detected in a manner similar or identical to that described above with respect to block 304 or 904. For instance, block 1504 can include comparing the position of the crown at two different instances in time, or can include determining if an absolute value of a change in crown position is equal to zero or below a threshold value. If no change in position is detected, the process can return to block 1502. Alternatively, if a change in position is detected, the process can proceed to block 1506. As described herein, a positive determination at block 1504 can cause the process to proceed to block 1506, while a negative determination can cause the process to return to block 1502. However, it should be appreciated that the determination performed at block 1504 can be reversed such that a positive determination can cause the process to return to block 1502, while a negative determination can cause the process to proceed to block 1506. For example, block 1504 can alternatively determine if no change in position is detected.

At block 1506, a view of a display can be scaled based on the detected change in position. Block 1506 can include visually scaling a view (e.g., zooming in/out) in response to the detected change in position of the crown. For example, the display (e.g., display 106) can be displaying a portion of some content. In response to detecting a change in position of the crown (e.g., crown 108), the view can be scaled by increasing or decreasing the size of the currently displayed portion of the content in the view depending on the direction of the change in position of the crown. For example, turning the crown clockwise can cause the contents within a view of the display to increase in size (e.g., zooming in), while turning the crown counter-clockwise can cause the contents within the view of the display to decrease in size (e.g., zooming out). Additionally, the amount or speed of scaling can depend on the amount of detected change in the position of the crown. In some examples, the amount or speed of the scaling can be proportional to the amount of detected rotation of the crown. For instance, the amount of scaling corresponding to a half-turn of the crown can be equal to 50% of the amount of scaling corresponding to a full turn of the crown. The process can then return to block 1502 where new crown position information can be received.

It should be appreciated that the actual values used to linearly map the change in crown position to the amount or speed of scaling can be varied depending on the desired functionality of the device. Moreover, it should be appreciated that other mappings between the scale amount and change in position can be used. For example, acceleration, velocity (described in greater detail below with respect to FIGS. 21-44), or the like, can be used to determine the amount or speed of scaling. Additionally, non-linear mappings between the crown characteristic (e.g., position, velocity, acceleration, etc.) and the scale amount or scale speed can be used.

Figure 16:
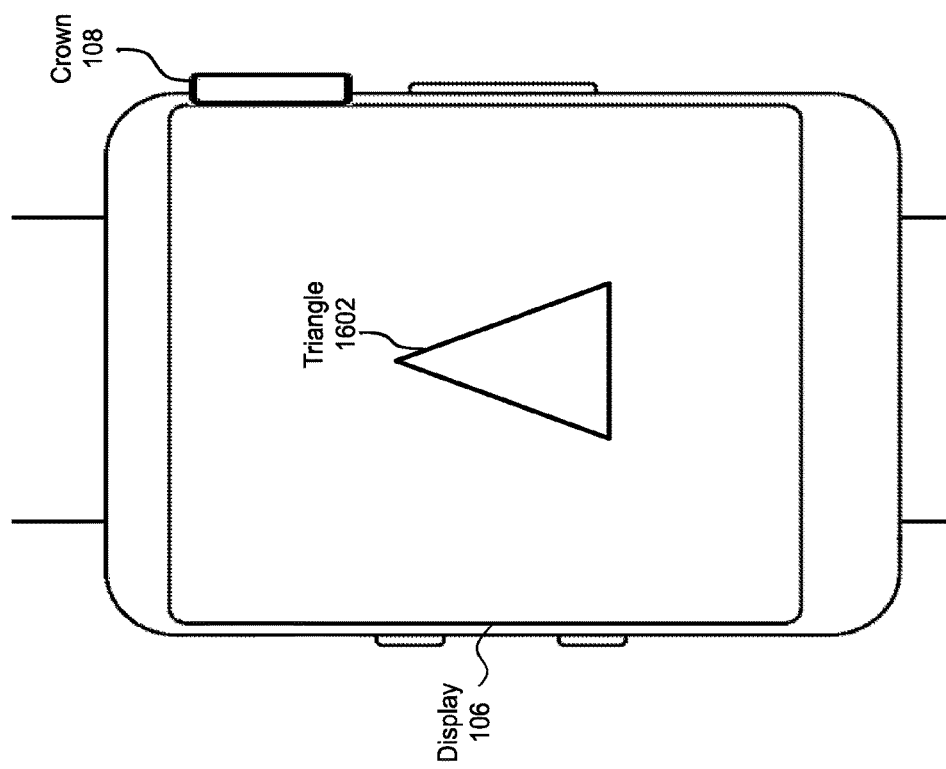
FIGS. 16-20 illustrate screens showing the scaling of a view of a display using the process of FIG. 15.

To further illustrate the operation of process 1500, FIG. 16 depicts an example interface of device 100 showing a triangle 1602. At block 1502 of process 1500, processor 202 of device 100 can receive crown position information from encoder 204. Since crown 108 is not being rotated in FIG. 16, a negative determination can be made by processor 202 at block 1504, causing the process to return to block 1502.

Figure 17:
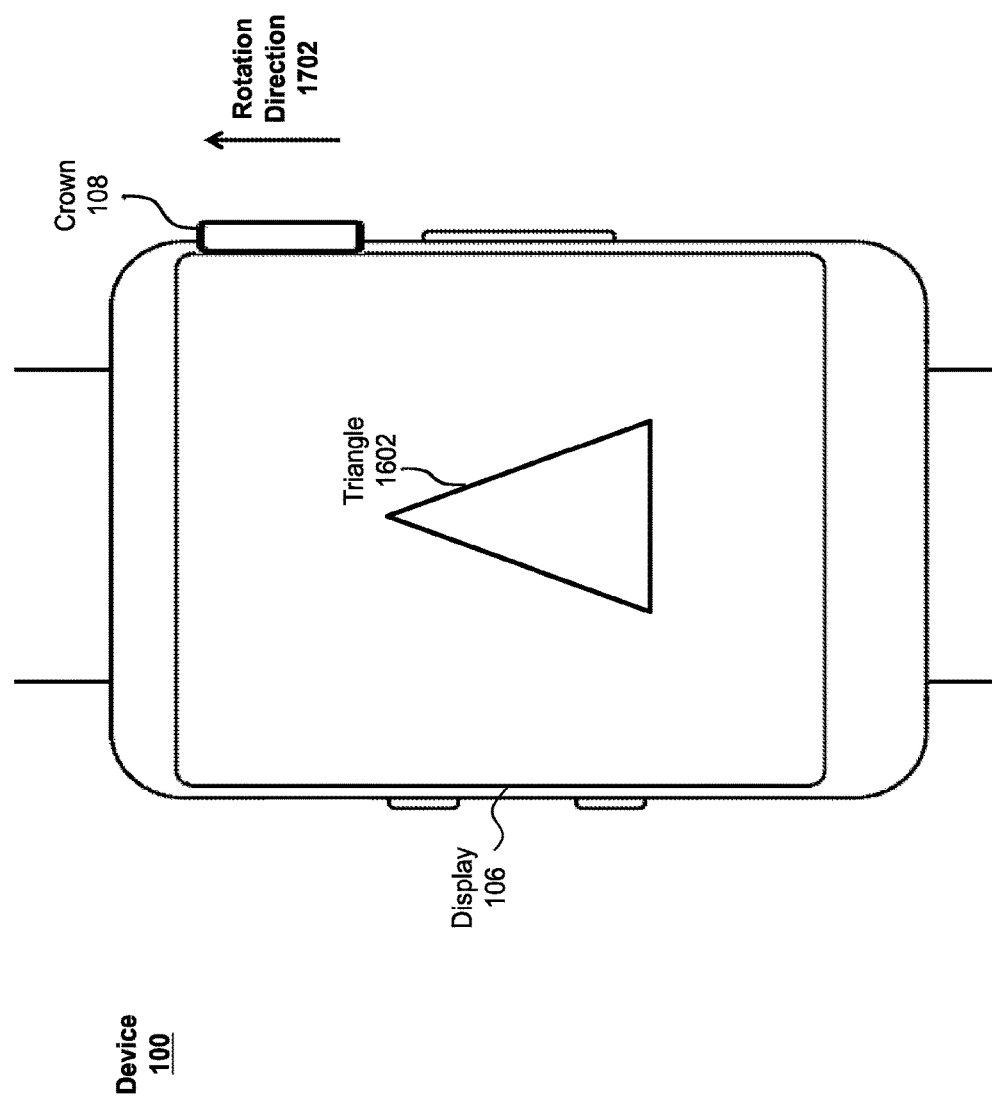
Figure 18:
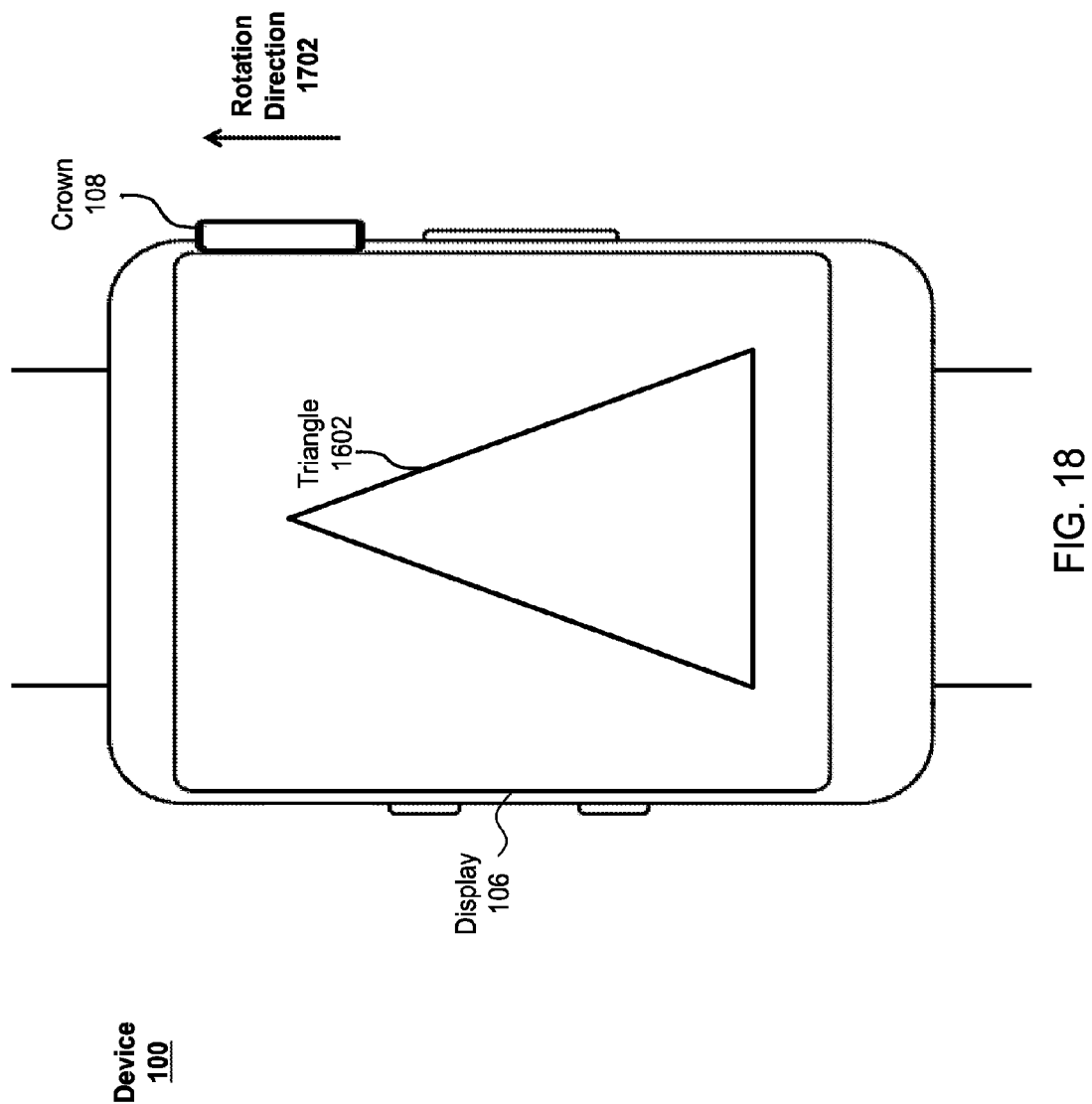

Referring now to FIG. 17, crown 108 is being rotated in the upward rotation direction 1702. Processor 202 can again receive crown position information that reflects this rotation from encoder 204 at block 1502 of process 1500. Thus, processor 202 can make a positive determination at block 1504, causing the process to proceed to block 1506. At block 1506, processor 202 can cause display 106 to scale the view being displayed on display 106. The scaling can increase or decrease the size of the view depending on the rotation direction of crown 108 and can have a scale amount or speed based on a characteristic (e.g., distance, velocity, acceleration, or the like) of the rotation of crown 108. In the illustrated example, the scale amount can be proportional to the amount of rotation of crown 108. As shown, display 106 can scale the view containing triangle 1602 using a positive scaling factor. As a result, triangle 1602 in FIG. 17 appears larger than that shown in FIG. 16. As the user continues to rotate crown 108 in rotation direction 1702, processor 202 can continue to cause display 106 to scaling the view containing the image of triangle 1602 using a positive scaling factor, as shown in FIG. 18. In FIG. 18, triangle 1602 appears larger than those shown in FIGS. 16 and 17. When the rotation of crown 108 stops, the scaling of the view containing triangle 1602 can similarly stop. In some examples, if the view of triangle 1602 has been scaled to its maximum amount and the user continues to rotate crown 108 in rotation direction 1702, processor 202 can limit the scaling of display 106. In yet other examples, a rubberbanding effect can be performed by allowing the view containing triangle 1602 to increase in size to a rubberbanding limit that is greater than the maximum scaling amount for the view and then snapping the size of the view back to its maximum scaling amount in response to a stop in rotation of crown 108. It should be appreciated that the action performed in response to reaching the scaling limit of display 106 can be configured in any desired manner.

Figure 19:
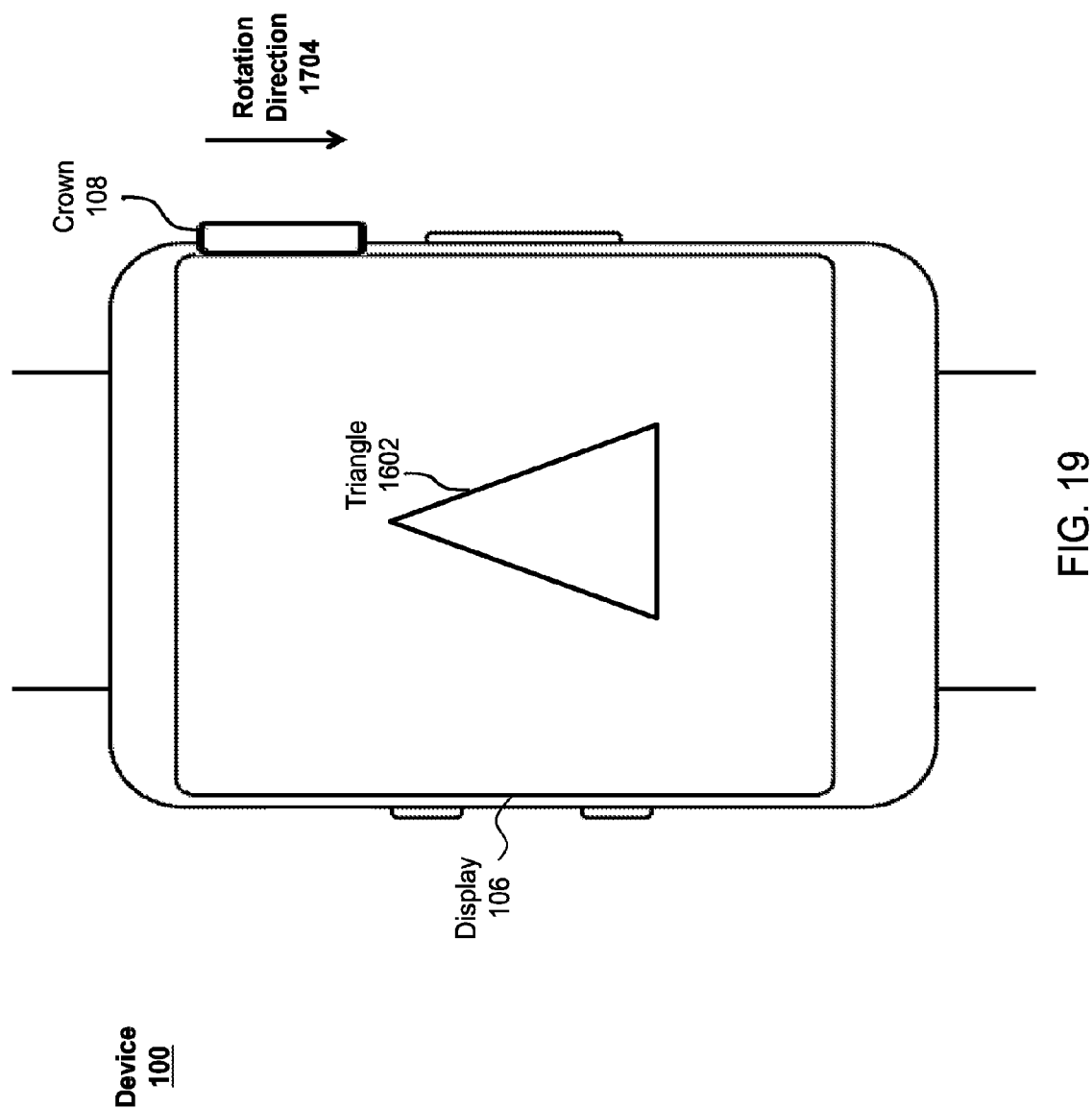
Figure 20:
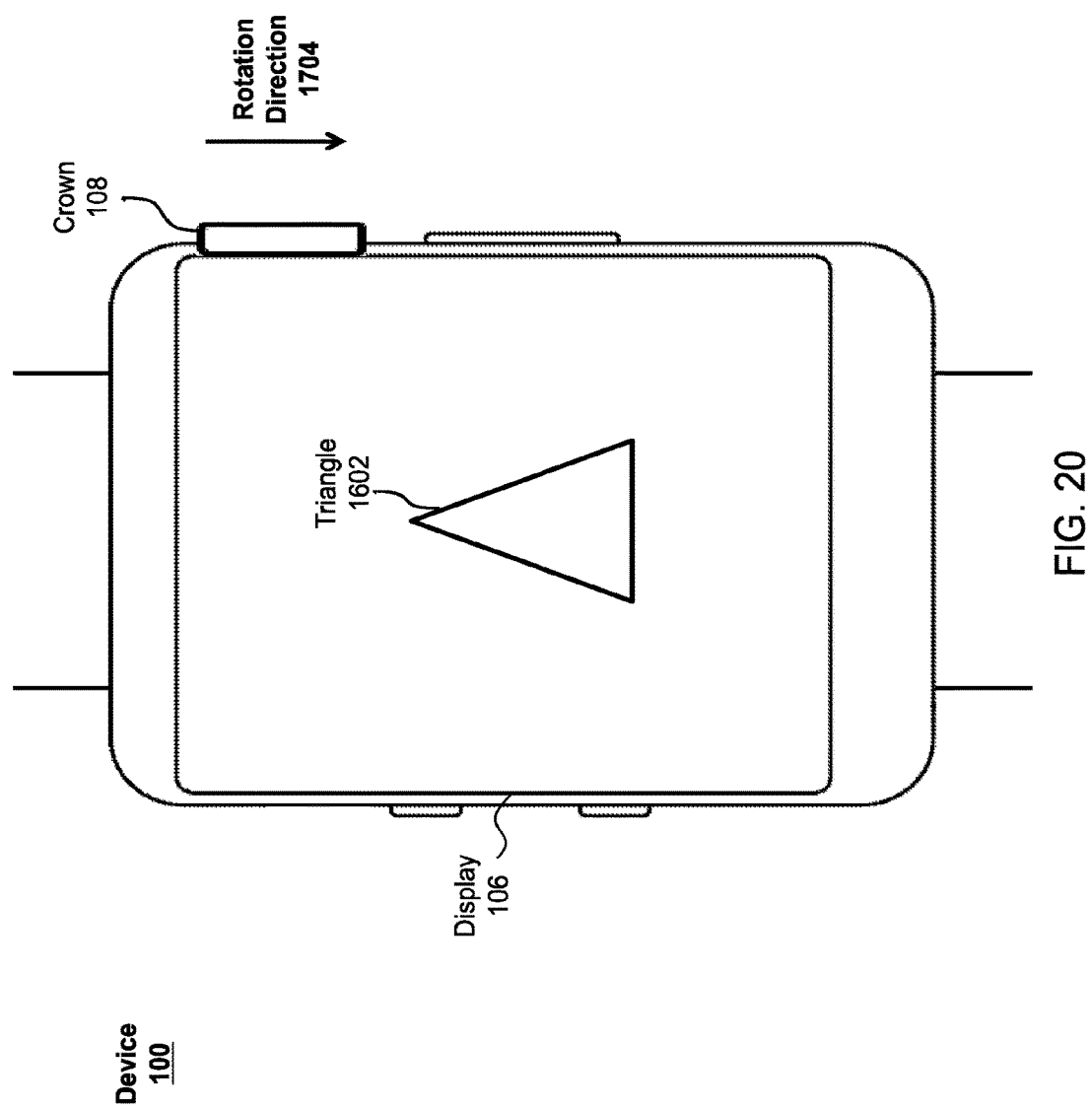

Referring now to FIG. 19, crown 108 is being rotated in the downward rotation direction 1704. Processor 202 can again receive crown position information that reflects this rotation from encoder 204 at block 1502 of process 1500. Thus, processor 202 can make a positive determination at block 1504, causing the process to proceed to block 1506. At block 1506, processor 202 can cause display 106 to scale the view using a negative scaling factor corresponding to rotation direction 1704. Similar to the scaling performed in response to rotation of crown 108 in rotation direction 1702, the scaling performed in response to the rotation of crown 108 in rotation direction 1704 can depend on a characteristic (e.g., distance, velocity, acceleration, or the like) of the rotation of crown 108. In the illustrated example, the scaling amount can be proportional to the amount of rotation of crown 108. As shown, display 106 can scale the view containing the image of triangle 1602 using a negative scaling factor. As a result, triangle 1602 in FIG. 19 is smaller than that shown in FIG. 18. As the user continues to rotate crown 108 in rotation direction 1704, processor 202 can continue to cause display 106 to scale the view of containing image of triangle 1602 using a negative scaling factor, as shown in FIG. 20. In FIG. 20, triangle 1602 is smaller than those shown in FIGS. 18 and 19. When the rotation of crown 108 stops, the scaling of the view containing triangle 1602 can similarly stop. In some examples, if the view containing triangle 1602 has been scaled to its minimum amount and the user continues to rotate crown 108 in rotation direction 1704, processor 202 can limit the scaling of display 106. In yet other examples, a rubberbanding effect can be performed by allowing the view containing triangle 1602 to decrease in size to a rubberbanding limit that is less than the minimum scaling amount for the view, and then snapping the size of the view back to its minimum scaling amount in response to a stop in rotation of crown 108. It should be appreciated that the action performed in response to reaching the scaling limit of display 106 can be configured in any desired manner.

While a specific scaling example is provided, it should be appreciated that views of other types of data, such as media items, webpages, or the like, can similarly be scaled using a mechanical crown of a wearable electronic device in a similar manner. Additionally, the amount or speed of scaling can be configured to depend on any characteristic of the crown. Moreover, in some examples, when reaching a minimum or maximum scaling of a view, continued rotation of the crown in the same direction can cause the scaling to reverse direction. For example, an upward rotation of the crown can cause a view to zoom-in. However, upon reaching a scaling limit, the upward rotation of the crown can then cause the view to scale in the opposite direction (e.g., zoom-out).

Figure 21:
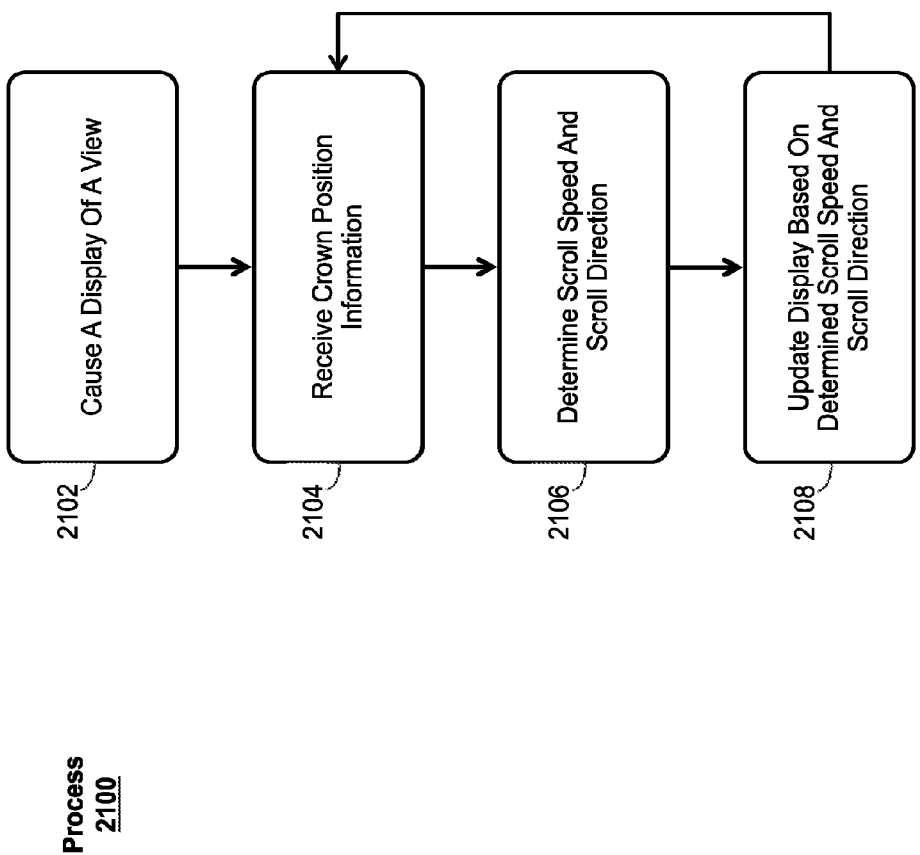
FIG. 21 illustrates an exemplary process for scrolling a view of a display based on a angular velocity of rotation of a crown according to various examples.

FIG. 21 illustrates an exemplary process 2100 for scrolling a view of a display based on an angular velocity of rotation of a crown according to various examples. The view can include a visual representation of any type of data being displayed. For example, the view can include a display of a text, a media item, a webpage, or the like. Process 2100 can be similar to process 900, except that it can scroll the view based on a scrolling velocity that depends on the angular velocity of rotation of the crown. In some examples, process 2100 can be performed by a wearable electronic device similar to device 100. In these examples, content or any other view can be displayed on display 106 of device 100 and process 2100 can be performed to visually scroll the view in response to a turning of crown 108. In some examples, the scrolling can be performed by translating the displayed contents along a fixed axis.

At block 2102, a view of the display of the wearable electronic device can be displayed. As mentioned above, the view can include any visual representation of any type of data that is displayed by a display of the device.

At block 2104, crown position information can be received in a manner similar or identical to that described above with respect to block 902 of process 900. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 2106, the scroll velocity (e.g., speed and scroll direction) can be determined. In some examples, the scrolling of a view can be determined using a physics-based modeling of the motion. For example, the view can be treated as an object having a movement velocity that corresponds to the velocity of scrolling across the display of the device. The rotation of the crown can be treated as a force being applied to the view in a direction corresponding to the direction of rotation of the crown, where the amount of force depends on the speed of angular rotation of the crown. For example, a greater speed of angular rotation can correspond to a greater amount of force being applied to the view. Any desired linear or non-linear mapping between the speed of angular rotation of the crown and the force being applied to the view can be used. In addition, a drag force can be applied in a direction opposite the direction of scroll. This can be used to cause the velocity of scrolling to decay over time, allowing the scrolling to stop absent additional input from the user. Thus, the velocity of scrolling at discrete moments in time can take the general form of:

$$V_T = V_{(T-1)} + \Delta V_{CROWN} - \Delta V_{DRAG}. \quad (1.1)$$

In equation 1.1, $V_T$ represents the determined scroll velocity (speed and direction) at time T, $V_{(T-1)}$ represents the previous scroll velocity (speed and direction) at time T−1, $\Delta V_{CROWN}$ represents the change in velocity caused by the force applied to the view in response to the rotation of the crown, and $\Delta V_{DRAG}$ represents the change in velocity of the view caused by the drag force opposing the motion of the view (scrolling of the view). As mentioned above, the force applied to the view by the crown can depend on the speed of angular rotation of the crown. Thus, $\Delta V_{CROWN}$ can also depend on the speed of angular rotation of the crown. Typically, the greater the speed of angular rotation of the crown, the greater the value of $\Delta V_{CROWN}$ will be. However, the actual mapping between the speed of angular rotation of the crown and $\Delta V_{CROWN}$ can be varied depending on the desired user feel of the scrolling effect. For example, various linear or non-linear mappings between the speed of angular rotation of the crown and $\Delta V_{CROWN}$ can be used. In some examples, $\Delta V_{DRAG}$ can depend on the velocity of scrolling such that at greater velocities, a greater opposing change in velocity can be produced. In other examples, $\Delta V_{DRAG}$ can have a constant value. However, it should be appreciated that any constant or variable amount of opposing change in velocity can be used to produce a desired scrolling effect. Note, typically, in the absence of user input in the form of $\Delta V_{CROWN}$, $V_T$ will approach (and become) zero based on $\Delta V_{DRAG}$ in accordance with equation 1.1, but $V_T$ would not change signs without user input in the form of crown rotation ($\Delta V_{CROWN}$).

As can be seen from equation 1.1, the velocity of scrolling can continue to increase as long as $\Delta V_{CROWN}$ is greater than $\Delta V_{DRAG}$. Additionally, the velocity of scrolling can have non-zero values even when no $\Delta V_{CROWN}$ input is being received. Thus, if the view is scrolling with a non-zero velocity, it can continue to scroll without the user rotating the crown. The scroll distance and time until the scrolling stops can depend on the scroll velocity at the time the user stops rotating the crown and the $\Delta V_{DRAG}$ component.

In some examples, when the crown is rotated in a direction corresponding to a scroll direction that is opposite the direction that the view is currently being scrolled, the $V_{(T-1)}$ component can be reset to a value of zero, allowing the user to quickly change the direction of the scrolling without having to provide a force sufficient to offset the current scroll velocity of the view.

At block 2108, the display can be updated based on the scroll speed and direction determined at block 2106. This can include translating the displayed view by an amount corresponding to the determined scroll speed and in a direction corresponding to the determined scroll direction.

The process can then return to block 2104, where additional crown position information can be received.

It should be appreciated that blocks 2104, 2106, and 2108 can be repeatedly performed at any desired frequency to continually determine the velocity of scrolling and to update the display accordingly.

Figure 22:
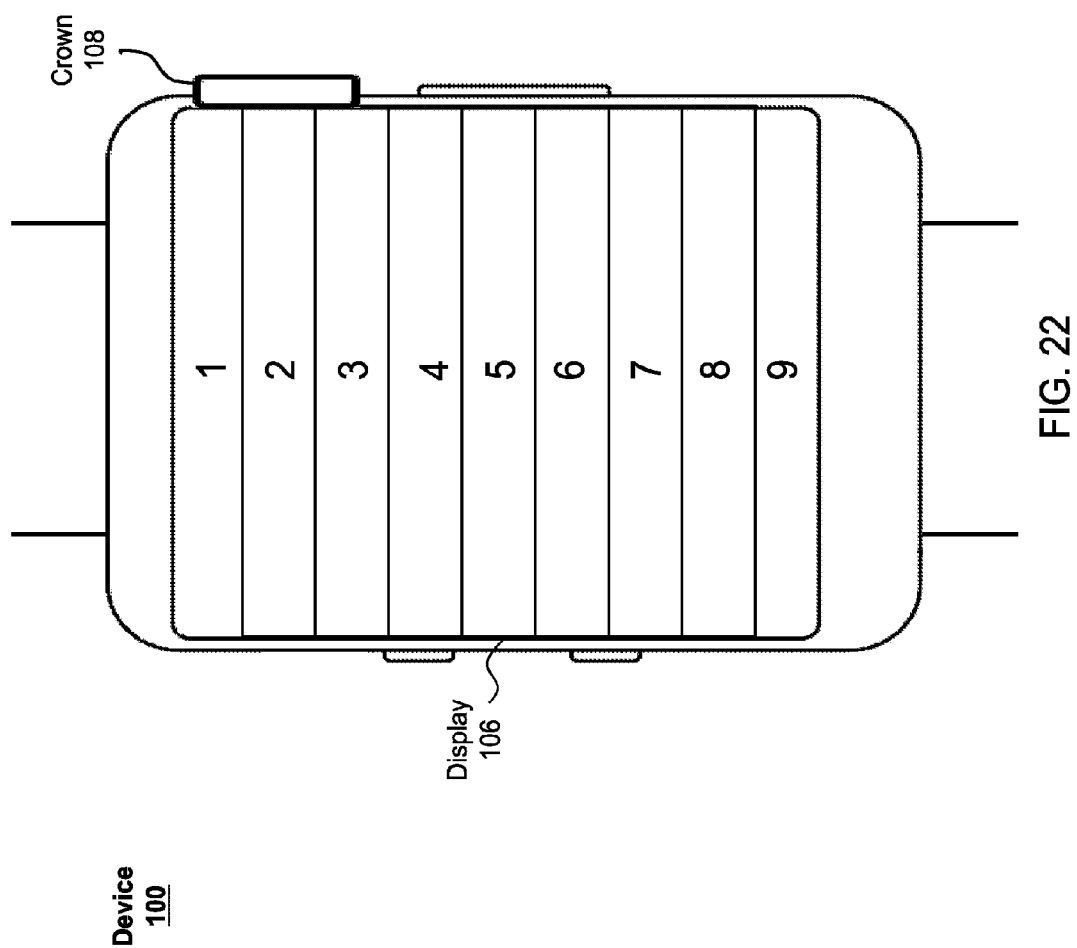
FIGS. 22-40 illustrate screens showing the scrolling of a view of a display using the process of FIG. 21.

To further illustrate the operation of process 2100, FIG. 22 depicts an example interface of device 100 having a visual representation of lines of text containing numbers 1-9. At block 2102 of process 2100, processor 202 of device 100 can cause display 106 to display the illustrated interface. At block 2104, processor 202 can receive crown position information from encoder 204. At block 2106, a scroll speed and scroll direction can be determined. Since the current scroll speed is zero and since crown 108 is not currently being rotated, it can be determined using equation 1.1 that the new velocity of scrolling is zero. At block 2108, processor 202 can cause display 106 to update the display using the speed and direction determined at block 2106. However, since the determined velocity was zero, no change to the display need be made. For purposes of explanation, FIGS. 23-29 depict subsequent views of the interface shown in FIG. 22 at different points of time, where the length of time between each view is equal.

Figure 23:
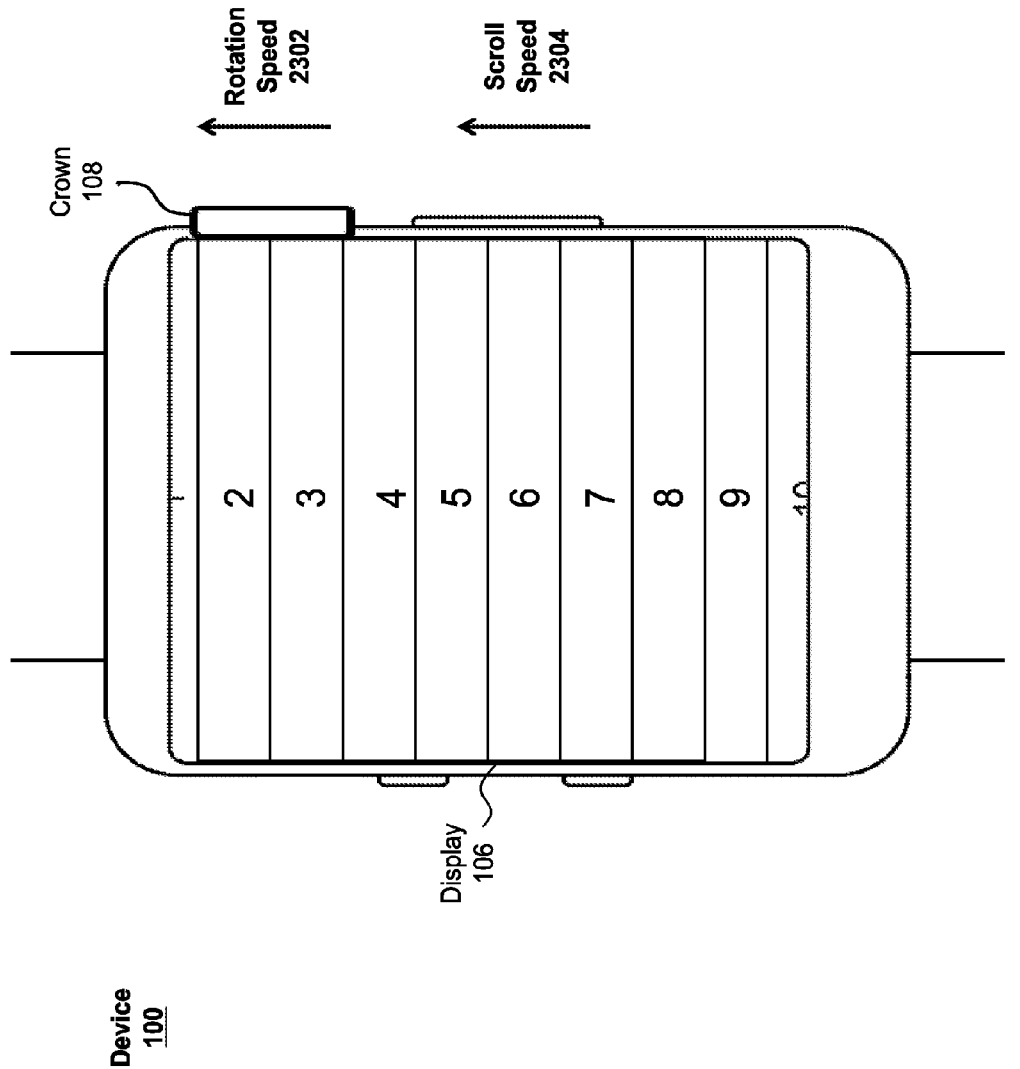

Referring now to FIG. 23, crown 108 is being rotated in the upward rotation direction with rotation speed 2302. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. In this example, rotation of crown 108 in the upward direction corresponds to an upward scroll direction. In other examples, other directions can be used. At block 2108, processor 202 can cause display 106 to update the display based on the determined scroll speed and direction. As shown in FIG. 23, this update has caused the lines of text to translate in the upward direction with scroll speed 2304. Since crown 108 has only begun to rotate, rotation speed 2302 can be relatively low compared to typical rotation speeds of the crown. Thus, scroll speed 2304 can similarly have a relatively low value compared to typical or maximum scroll speeds. As a result, only a portion of the line of text containing the value "1" has been translated off the display.

Figure 24:
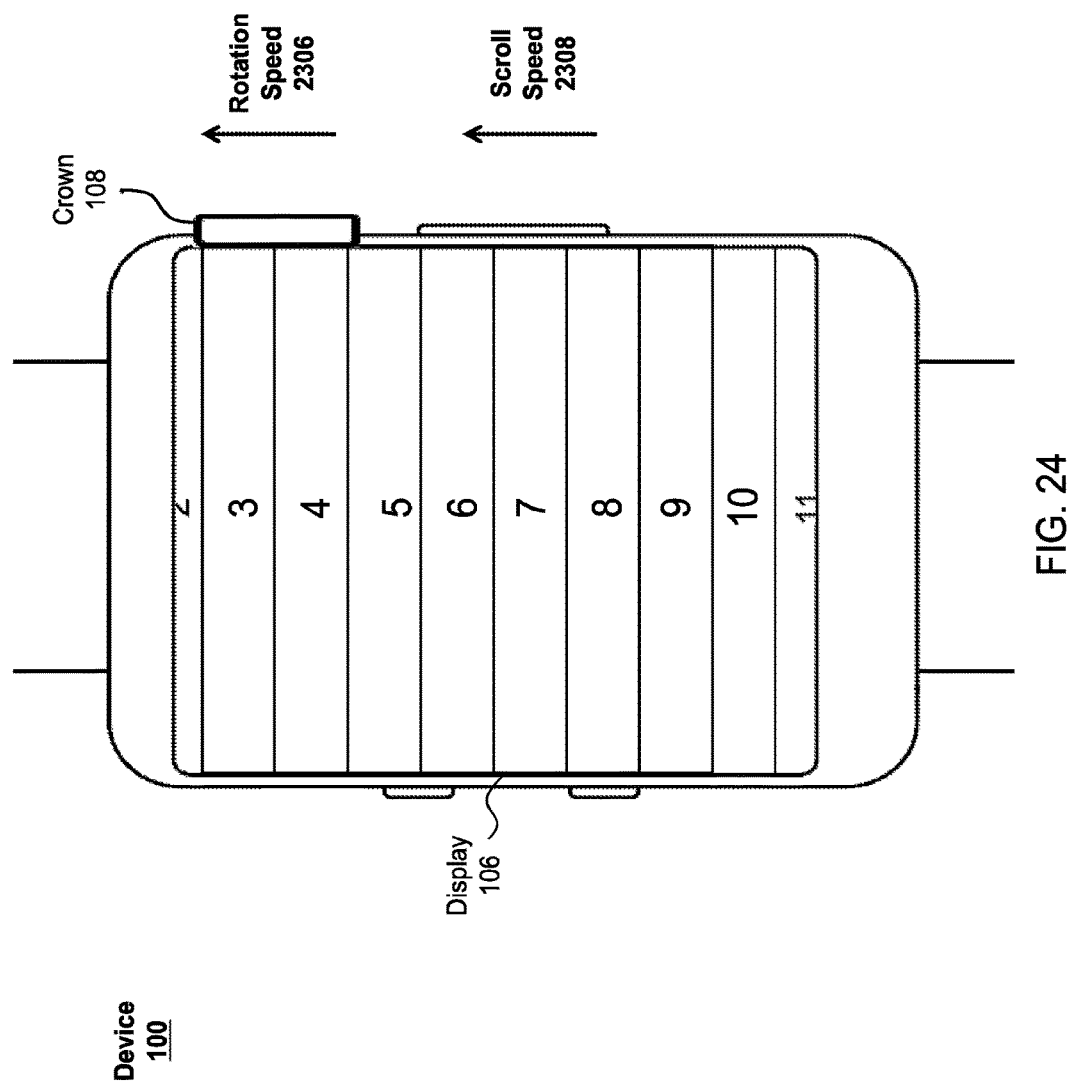

Referring now to FIG. 24, crown 108 is being rotated in the upward rotation direction with rotation speed 2306, which can be greater than rotation speed 2302. Processor 202 can again receive crown position information from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 23), the new $\Delta V_{CROWN}$ value corresponding to rotation speed 2306 can be added to the previous scroll velocity value $V_{(T-1)}$ (e.g., having scroll speed 2304). Thus, as long as the new $\Delta V_{CROWN}$ value is greater than the $\Delta V_{DRAG}$ value, the new scroll speed 2308 can be greater than scroll speed 2304. However, if the $\Delta V_{CROWN}$ value corresponding to rotation speed 2306 is less than the $\Delta V_{DRAG}$ value, the new scroll speed 2308 can be less than scroll speed 2304. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 24, this update has caused the lines of text to translate in the upward direction with scroll speed 2308. Since the $\Delta V_{CROWN}$ value corresponding to rotation speed 2306 is greater than the $\Delta V_{DRAG}$ value, scroll speed 2308 can be greater than scroll speed 2304. As a result, the lines of text have been translated a greater distance over the same length of time, causing a full line of text to be translated vertically off the display.

Figure 25:
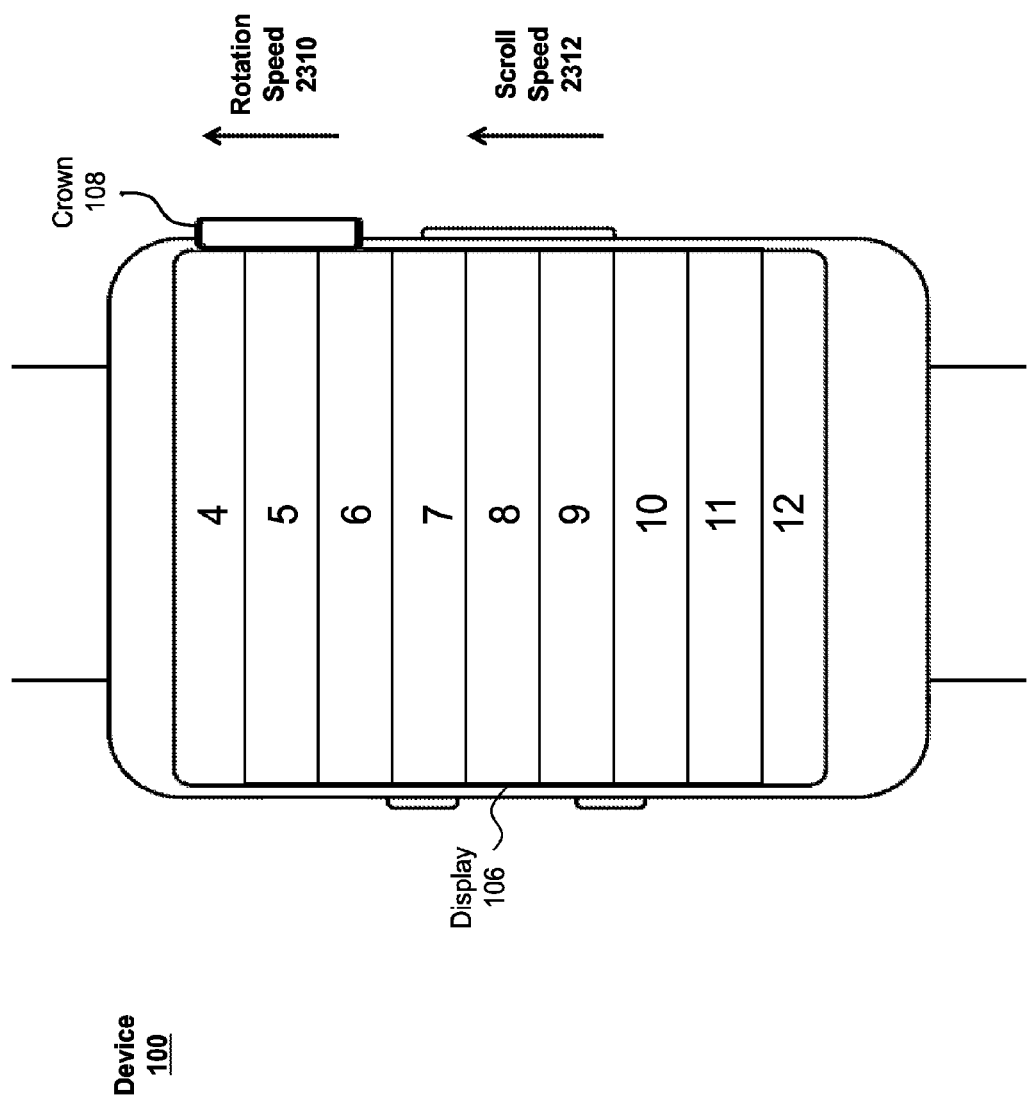

Referring now to FIG. 25, crown 108 is being rotated in the upward rotation direction with rotation speed 2310, which can be greater than rotation speed 2306. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 24), the new $\Delta V_{CROWN}$ value corresponding to rotation speed 2310 can be added to the previous scroll velocity value $V_{(T-1)}$ (e.g., having scroll speed 2308). Thus, as long as the new $\Delta V_{CROWN}$ value is greater than the $\Delta V_{DRAG}$ value, the new scroll speed 2312 can be greater than scroll speed 2308. However, if the $\Delta V_{CROWN}$ value corresponding to rotation speed 2310 is less than the $\Delta V_{DRAG}$ value, the new scroll speed 2312 can be less than scroll speed 2308. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 25, this update has caused the lines of text to translate in the upward direction with scroll speed 2312. Since the $\Delta V_{CROWN}$ value corresponding to rotation speed 2310 is greater than the $\Delta V_{DRAG}$ value, scroll speed 2312 can be greater than scroll speed 2308. As a result, the lines of text have been translated a greater distance over the same length of time, causing 1.5 lines of text to be translated vertically off the display.

Figure 26:
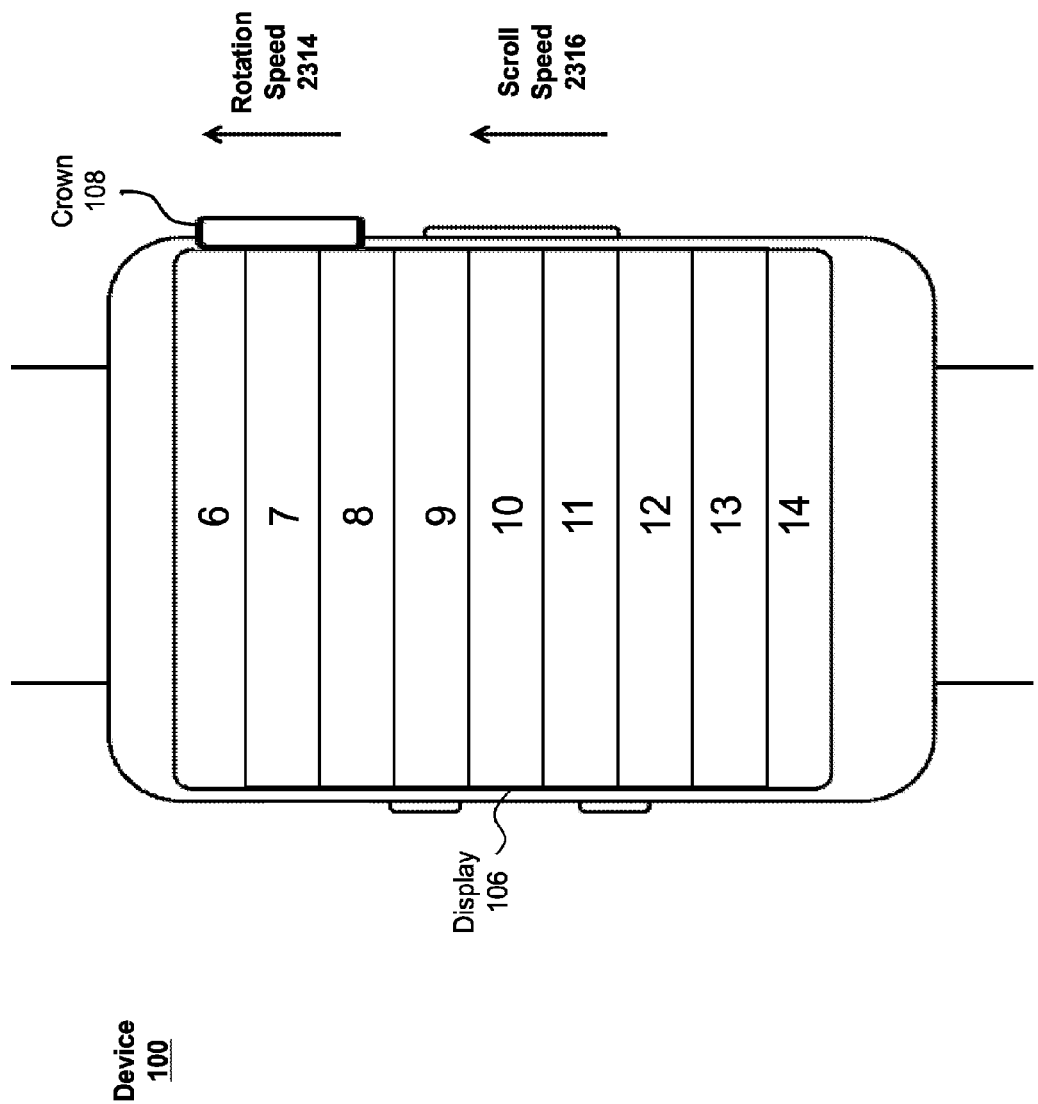

Referring now to FIG. 26, crown 108 is being rotated in the upward rotation direction with rotation speed 2314, which can be greater than rotation speed 2310. Processor 202 can again receive crown position information that reflects this rotation from encoder 204 at block 2104. Thus, at block 2110, processor 202 can convert this rotation speed into a $\Delta V_{CROWN}$ value to determine the new velocity of scrolling $V_T$. Since the display previously had a non-zero scroll speed value (e.g., as shown in FIG. 25), the new $\Delta V_{CROWN}$ value corresponding to rotation speed 2314 can be added to the previous scroll velocity value $V_{(T-1)}$ (e.g., having scroll speed 2312). Thus, as long as the new $\Delta V_{CROWN}$ value is greater than the $\Delta V_{DRAG}$ value, the new scroll speed 2316 can be greater than scroll speed 2312. However, if the $\Delta V_{CROWN}$ value corresponding to rotation speed 2314 is less than the $\Delta V_{DRAG}$ value, the new scroll speed 2316 can be less than scroll speed 2312. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 26, this update has caused the lines of text to translate in the upward direction with scroll speed 2316. Since the $\Delta V_{CROWN}$ value corresponding to rotation speed 2314 is greater than the $\Delta V_{DRAG}$ value, scroll speed 2316 can be greater than scroll speed 2312. As a result, the lines of text have been translated a greater distance over the same length of time, causing two lines of text to be translated vertically off the display.

Figure 27:
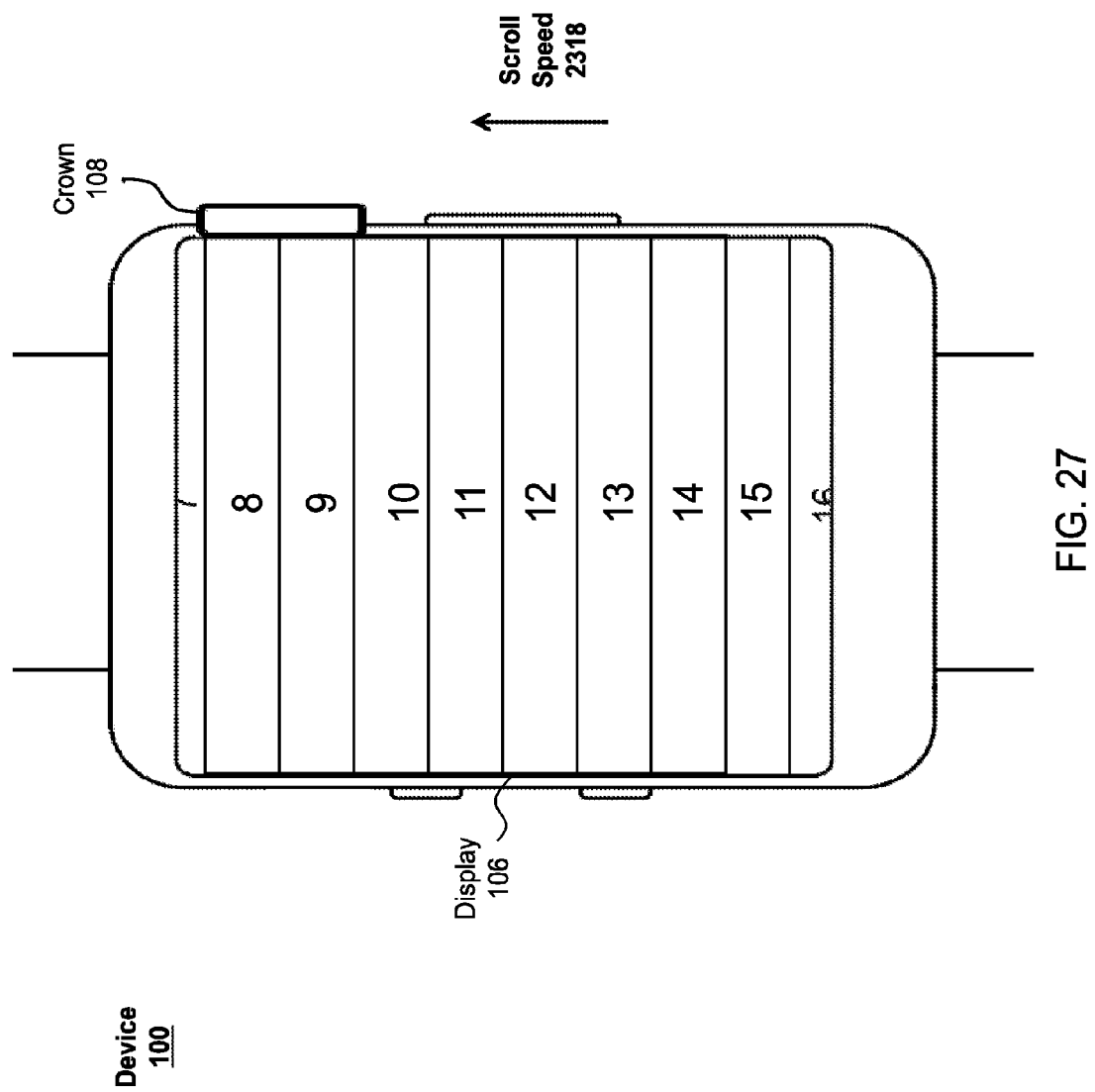

Referring now to FIG. 27, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2316) and the $\Delta V_{DRAG}$ value. Thus, as long as the previous scroll speed 2316 is greater than the $\Delta V_{DRAG}$ value, the scroll speed can have a non-zero value even when no rotation of the crown is being performed. However, if the previous scroll velocity $V_{(T-1)}$ (e.g., having scroll speed 2316) is equal to the $\Delta V_{DRAG}$ value, the scroll speed can have a value of zero. In the illustrated example, the previous scroll velocity $V_{(T-1)}$ (e.g., having scroll speed 2316) is assumed to be greater than the $\Delta V_{DRAG}$ value. At block 2108, processor 202 can cause display 106 to update the display based on the determined scroll speed and direction. As shown in FIG. 27, this update has caused the lines of text to translate in the upward direction with scroll speed 2318. Since $\Delta V_{DRAG}$ can have a non-zero value and because the previous scroll velocity $V_{(T-1)}$ (e.g., having scroll speed 2316) can be greater than the $\Delta V_{DRAG}$ value, scroll speed 2318 can have a non-zero value that is less than scroll speed 2316. As a result, the lines of text have been translated a shorter distance over the same length of time, causing 1.5 lines of text to be translated vertically off the display.

Figure 28:
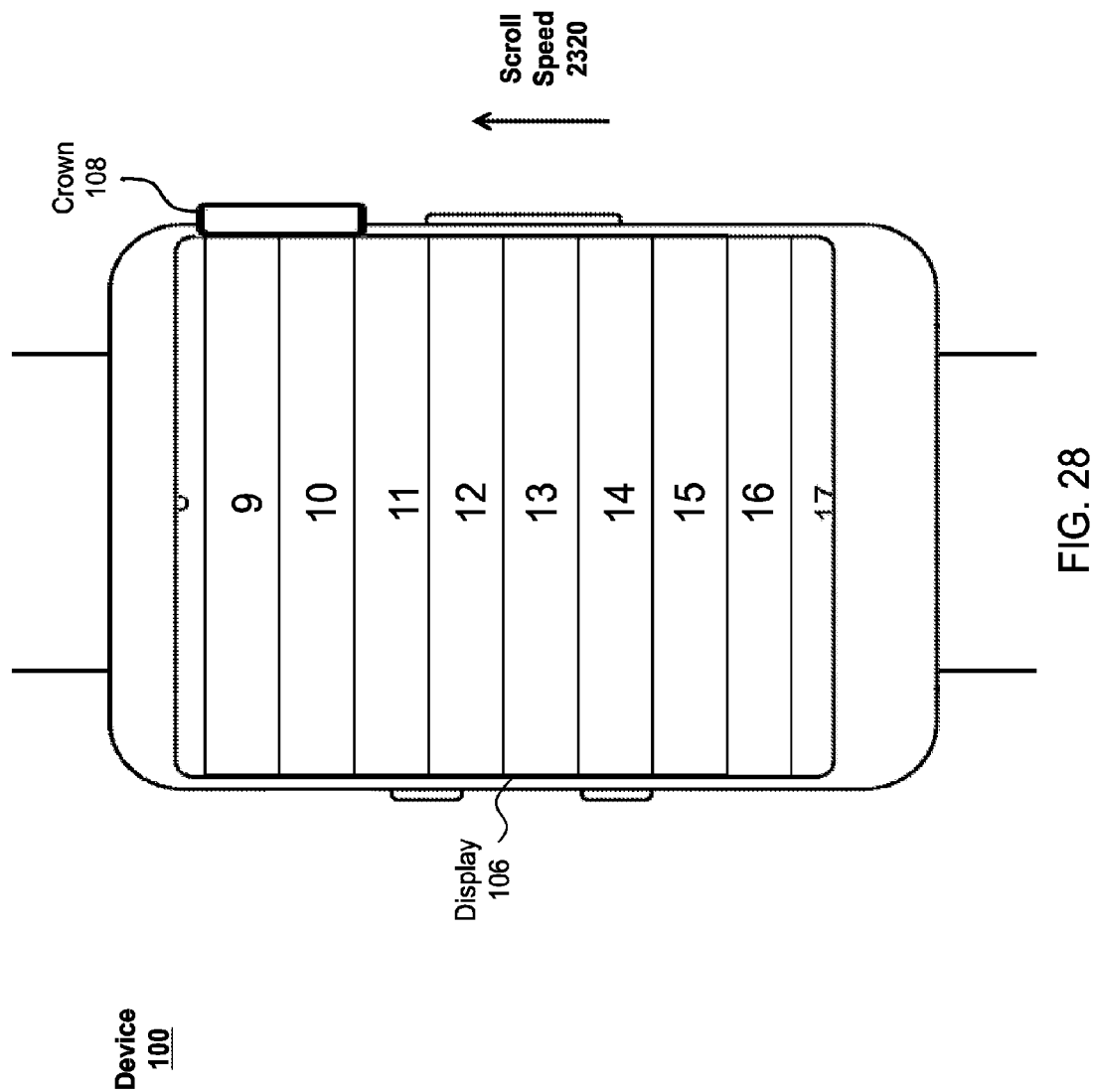

Referring now to FIG. 28, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2318) and the $\Delta V_{DRAG}$ value. Thus, as long as the previous scroll speed 2318 is greater than the $\Delta V_{DRAG}$ value, the scroll speed can have a non-zero value even when no rotation of the crown is being performed. However, if the previous scroll velocity $V_{(T-1)}$ (e.g., having scroll speed 2318) is equal to the $\Delta V_{DRAG}$ value, the scroll speed can have a value of zero. In the illustrated example, the previous scroll velocity $V_{(T-1)}$ (e.g., having scroll speed 2318) is assumed to be greater than the $\Delta V_{DRAG}$ value. At block 2108, processor 202 can cause display 106 to update the display based on the determined scroll speed and direction. As shown in FIG. 28, this update has caused the lines of text to translate in the upward direction with scroll speed 2320. Since $\Delta V_{DRAG}$ can have a non-zero value and because the previous scroll velocity $V_{(T-1)}$ (e.g., having scroll speed 2318) can be greater than the $\Delta V_{DRAG}$ value, scroll speed 2320 can have a non-zero value that is less than scroll speed 2318. As a result, the lines of text have been translated a shorter distance over the same length of time, causing one line of text to be translated vertically off the display.

Figure 29:
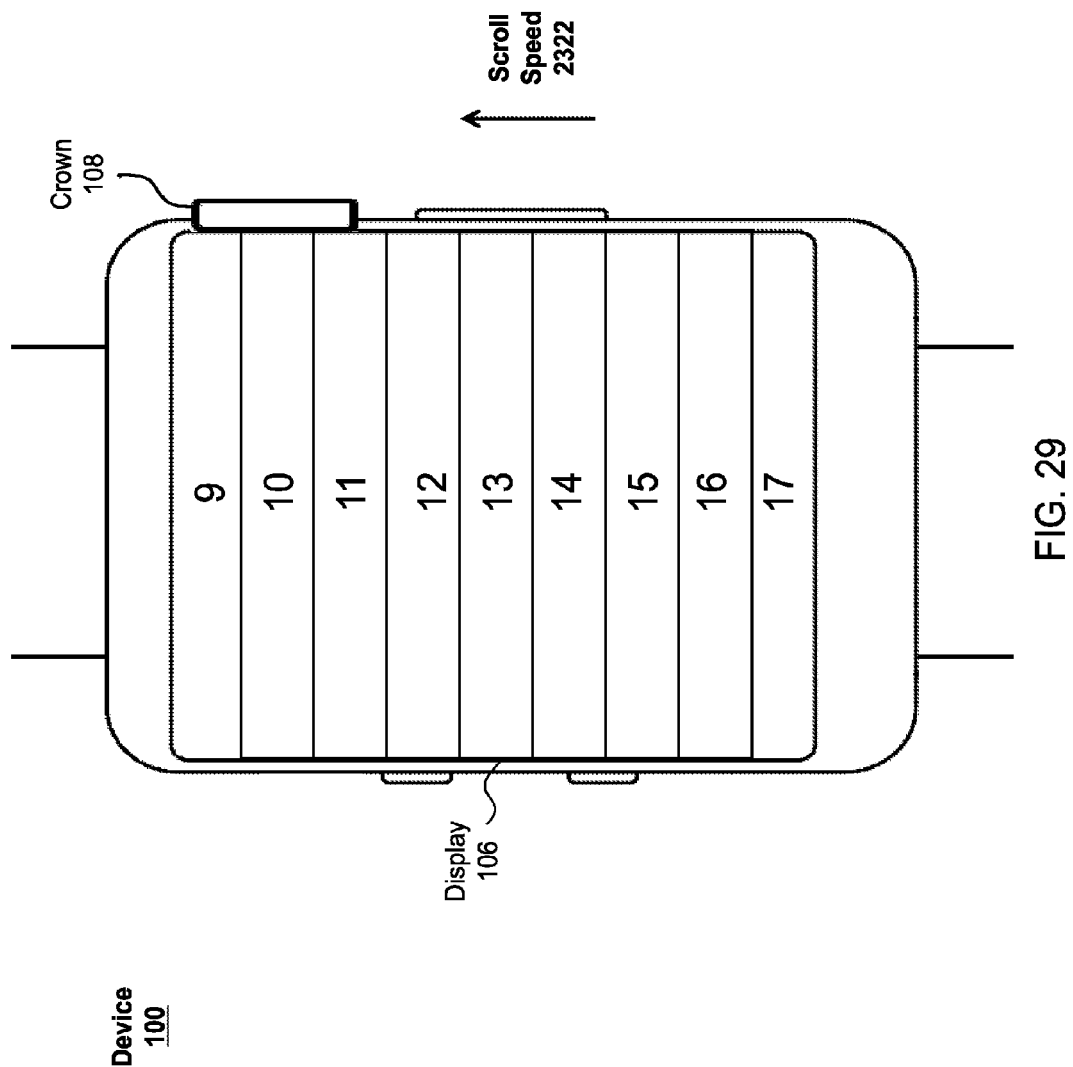

Referring now to FIG. 29, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2320) and the $\Delta V_{DRAG}$ value. Thus, as long as the previous scroll speed 2320 is greater than the $\Delta V_{DRAG}$ value, the scroll speed can have a non-zero value even when no rotation of the crown is being performed. However, if the previous scroll velocity $V_{(T-1)}$ (e.g., having scroll speed 2320) is equal to the $\Delta V_{DRAG}$ value, the scroll speed can have a value of zero. In the illustrated example, the previous scroll velocity $V_{(T-1)}$ (e.g., having scroll speed 2320) is assumed to be greater than the $\Delta V_{DRAG}$ value. At block 2108, processor 202 can cause display 106 to update the display based on the determined scroll speed and direction. As shown in FIG. 29, this update has caused the lines of text to translate in the upward direction with scroll speed 2322. Since $\Delta V_{DRAG}$ can have a non-zero value and because the previous scroll velocity $V_{(T-1)}$ (e.g., having scroll speed 2320) can be greater than the $\Delta V_{DRAG}$ value, scroll speed 2322 can have a non-zero value that is less than scroll speed 2320. As a result, the lines of text have been translated a shorter distance over the same length of time, causing 0.5 lines of text to be translated vertically off the display. This decay in scroll velocity can continue until the previous scroll velocity $V_{(T-1)}$ is equal to the $\Delta V_{DRAG}$ value, causing the scroll velocity to fall to zero. Alternatively, the decay in scroll velocity can continue until the previous scroll velocity $V_{(T-1)}$ falls below a threshold value, after which it can be set to a value of zero.

Figure 30:
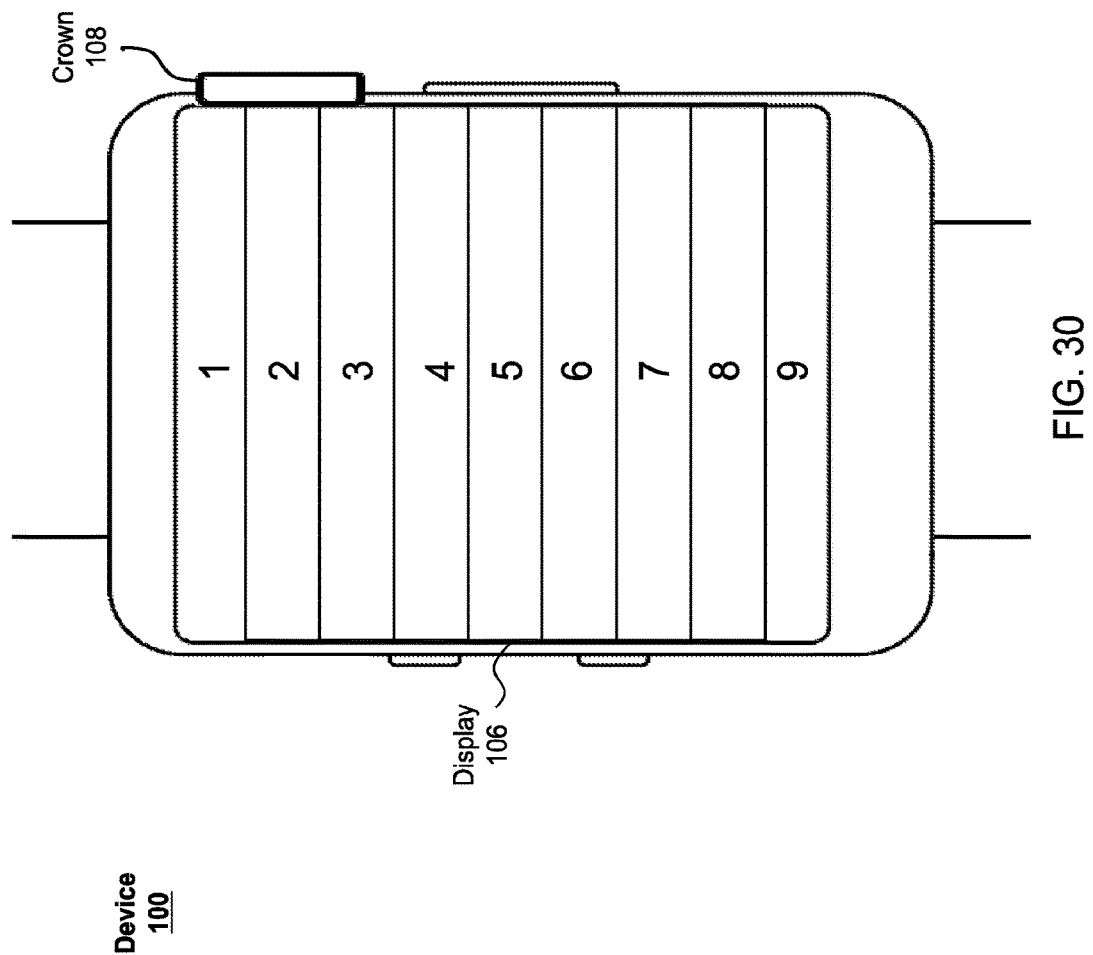
Figure 31:
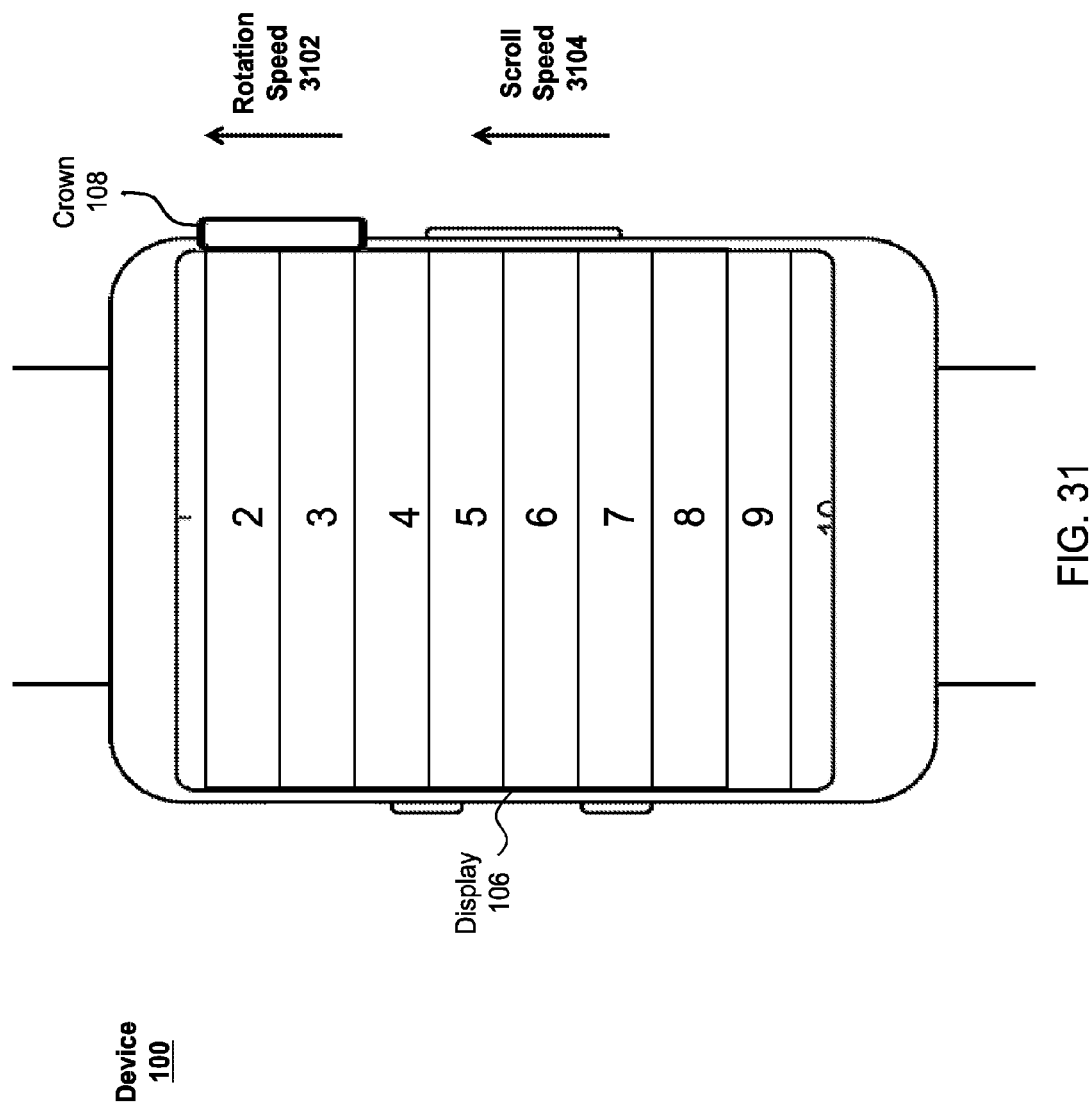
Figure 32:
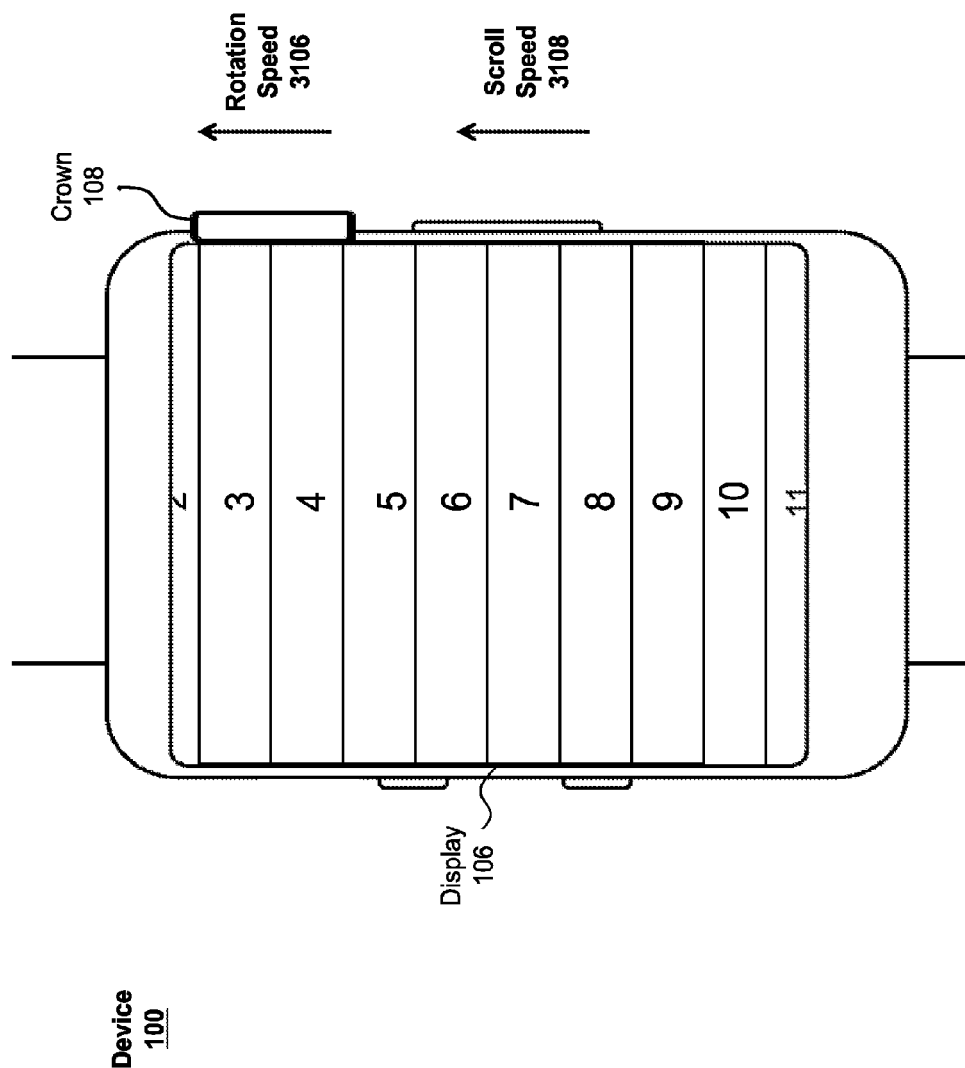
Figure 33:
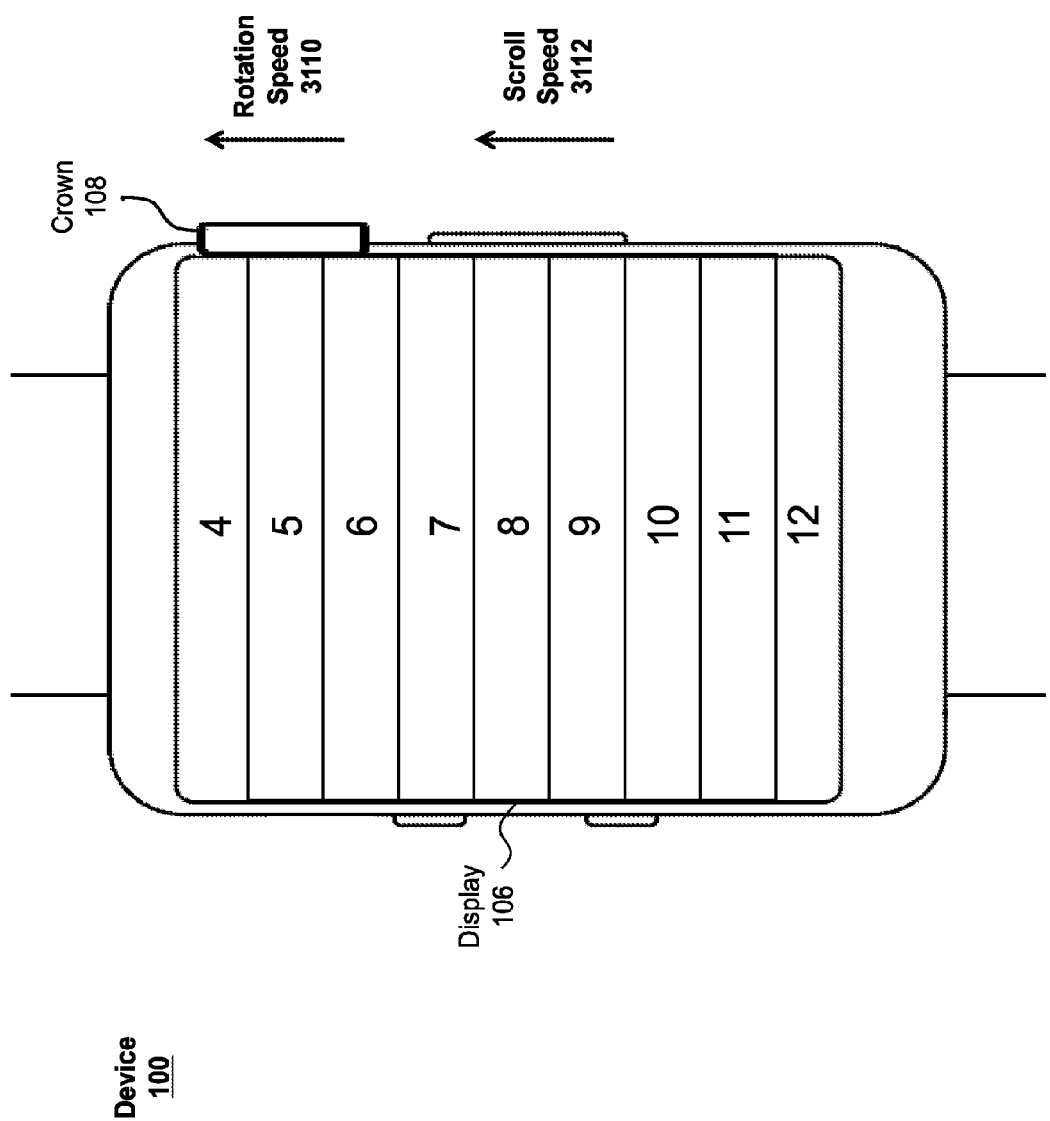
Figure 34:
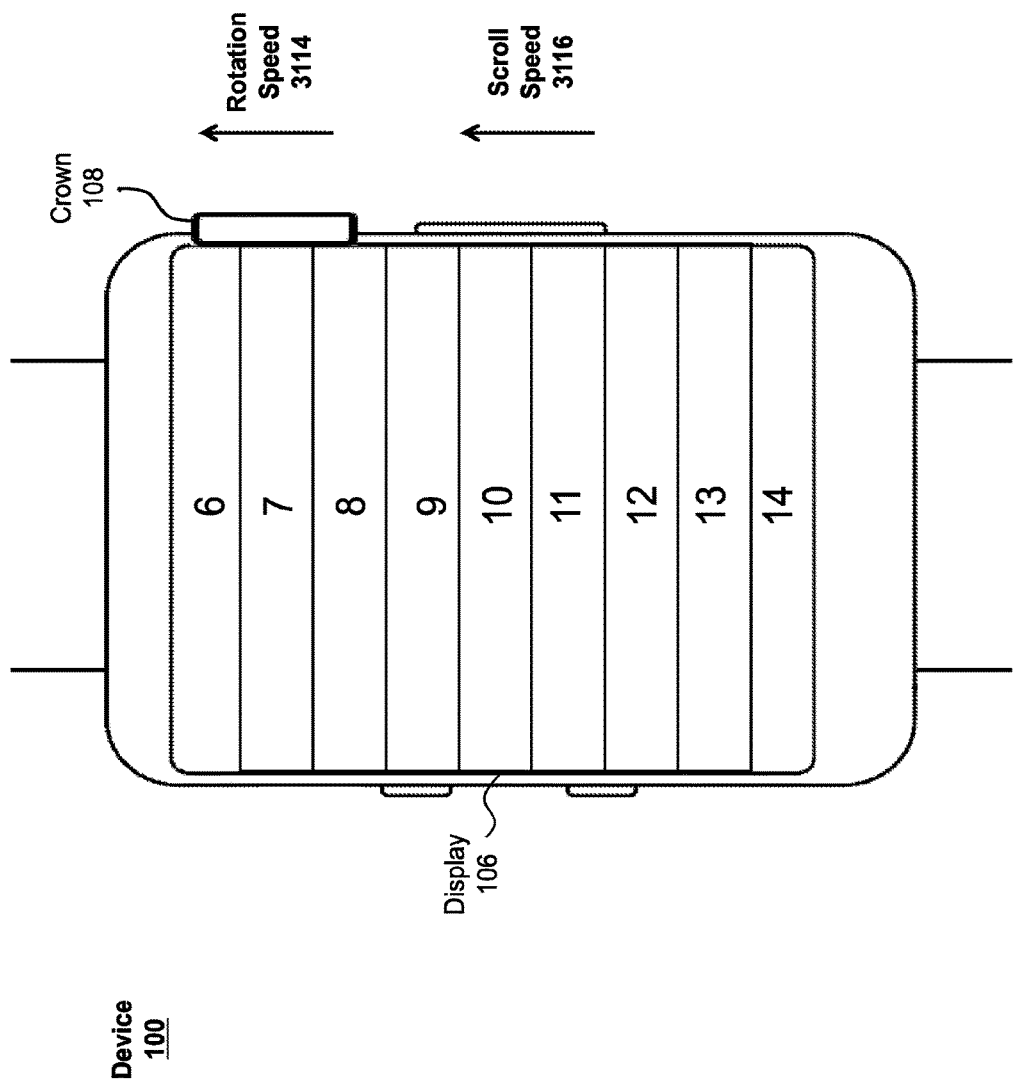
Figure 35:
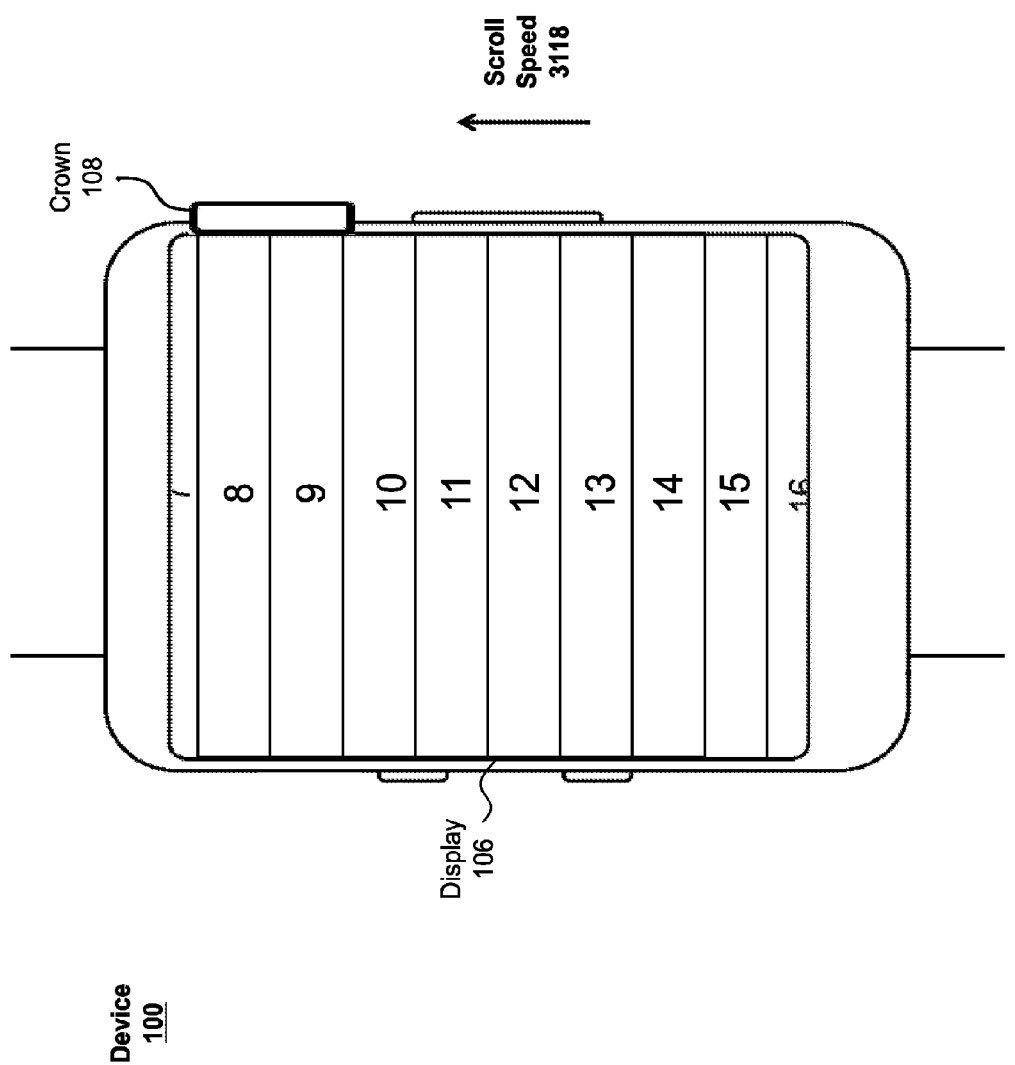
Figure 36:
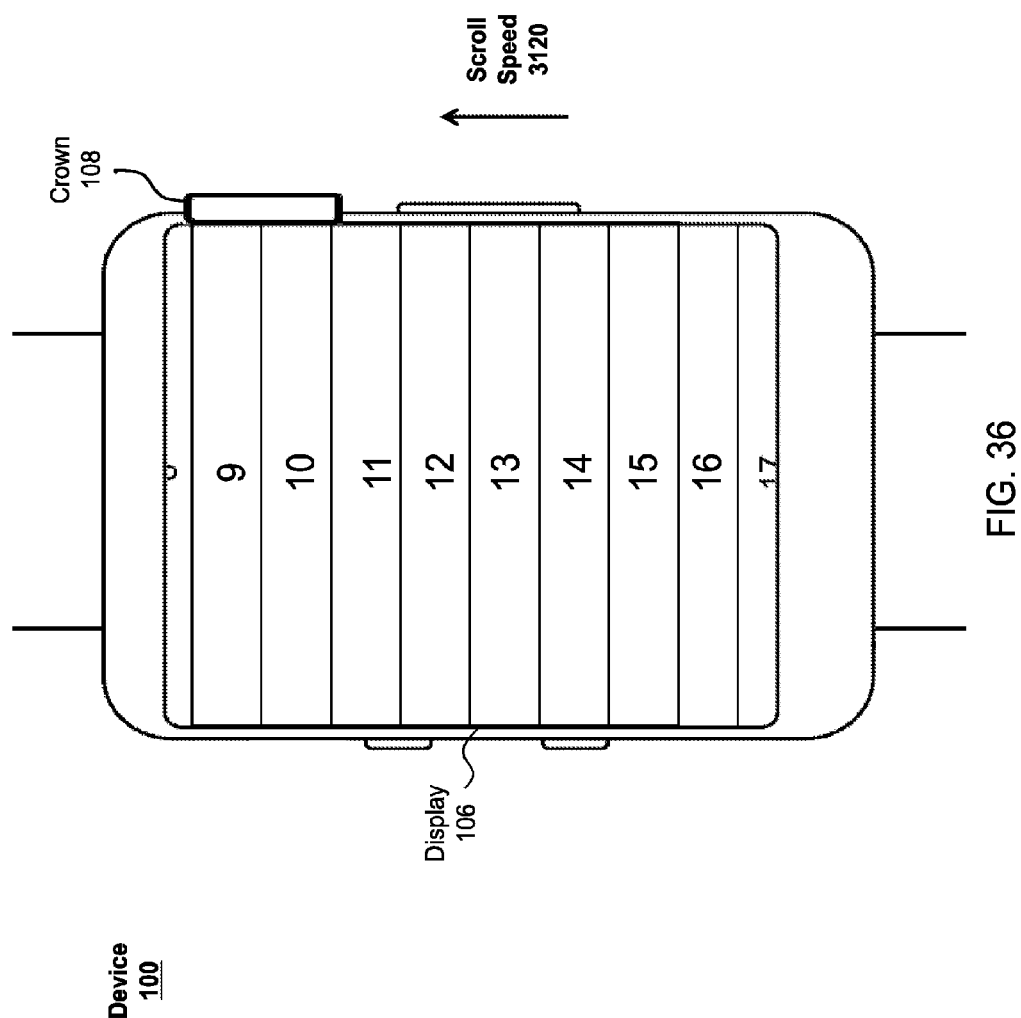

To further illustrate the operation of process 2100, FIG. 30 depicts an example interface of device 100 having a visual representation of lines of text containing numbers 1-9 similar to that shown in FIG. 22. FIGS. 31-36 illustrate the scrolling of the display at scroll speeds 3104, 3108, 3112, 3116, 3118, and 3120 based on input rotation speeds 3102, 3106, 3110, and 3114, in a similar manner as described above with respect to FIGS. 23-28. Thus, the lengths of time between subsequent views shown in FIGS. 31-36 are equal. For purposes of explanation, FIGS. 37-40 depict subsequent views of the interface shown in FIG. 36 at different points of time, where the length of time between each view is equal.

Figure 37:
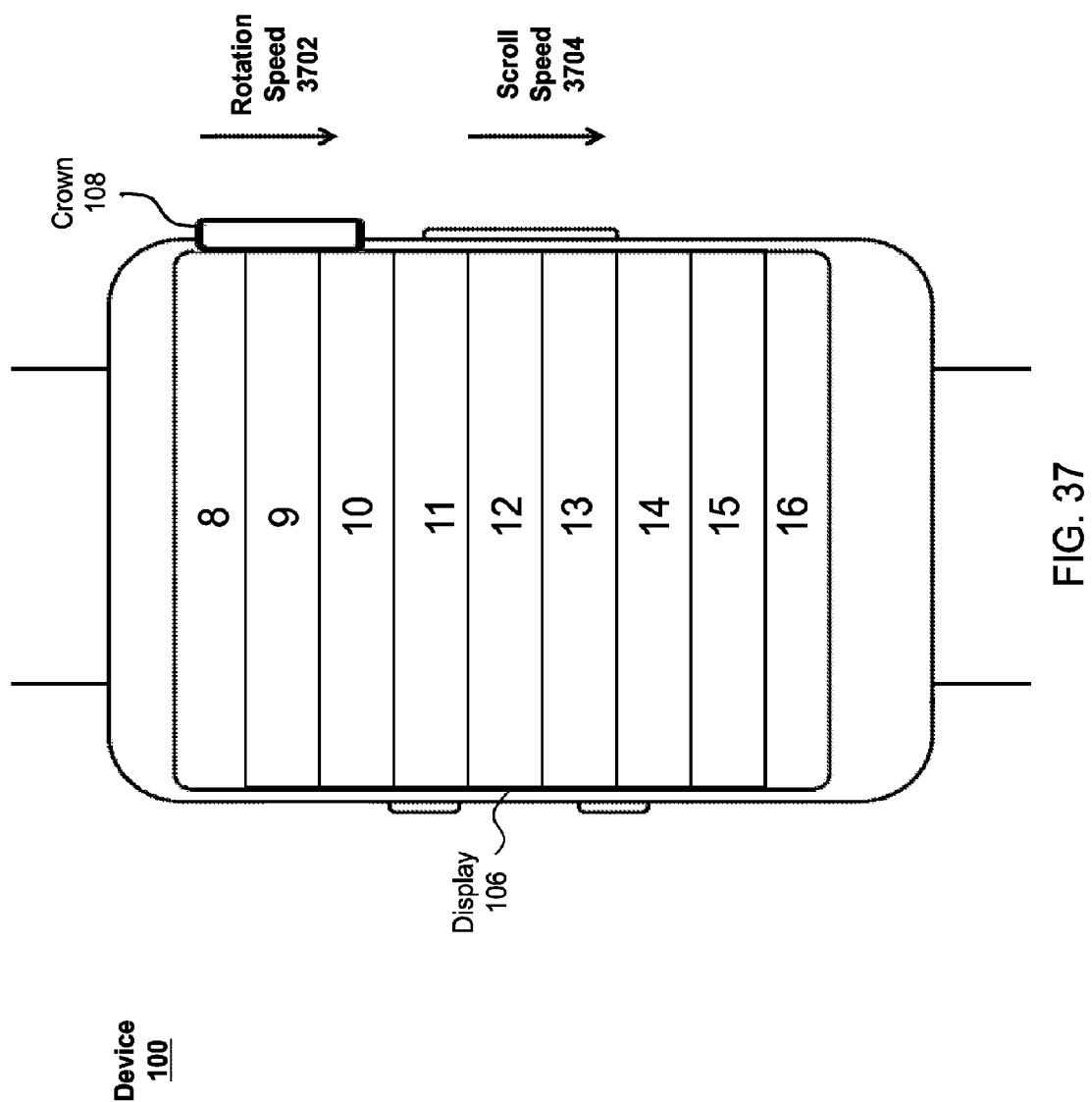

In contrast to FIG. 29 where no rotation input was received, a downward rotation having rotation speed 3702 can be performed at FIG. 37. In this instance, processor 202 can again receive crown position information from encoder 204 reflecting this downward rotation at block 2104. At block 2106, processor 202 can convert this rotation speed into a $\Delta V_{CROWN}$ value to determine the new velocity of scrolling $V_T$. Since the downward rotation of crown 108 is in the opposite direction of the scrolling shown in FIG. 36, the $\Delta V_{CROWN}$ value can have a polarity that is opposite that of the previous scroll velocity value $V_{(T-1)}$. In some examples, the new velocity of scrolling $V_T$ can be calculated by adding the new $\Delta V_{CROWN}$ value (having an opposite polarity) to the previous scroll velocity value $V_{(T-1)}$ and subtracting the $\Delta V_{DRAG}$ value. In other examples, such as that shown in FIG. 37, the previous scroll velocity value $V_{(T-1)}$ can be set to zero when rotation of crown 108 is in a direction opposite that of the previous scrolling (e.g., the polarity of $\Delta V_{CROWN}$ is opposite that of $V_{(T-1)}$). This can be performed to allow the user to quickly change the direction of scrolling without having to offset the previous velocity of scrolling. At block 2108, processor 202 can cause display 106 to update the display based on the determined scroll speed and direction. As shown in FIG. 37, this update has caused the lines of text to translate in the downward direction with scroll speed 3704. Since crown 108 has only begun to rotate, rotation speed 3702 can be relatively low compared to typical rotation speeds of the crown. Thus, scroll speed 3704 can similarly have a relatively low value compared to typical or maximum scroll speeds. As a result, a relatively slow scrolling can be performed, causing 0.5 lines of text to be translated vertically off the display.

Figure 38:
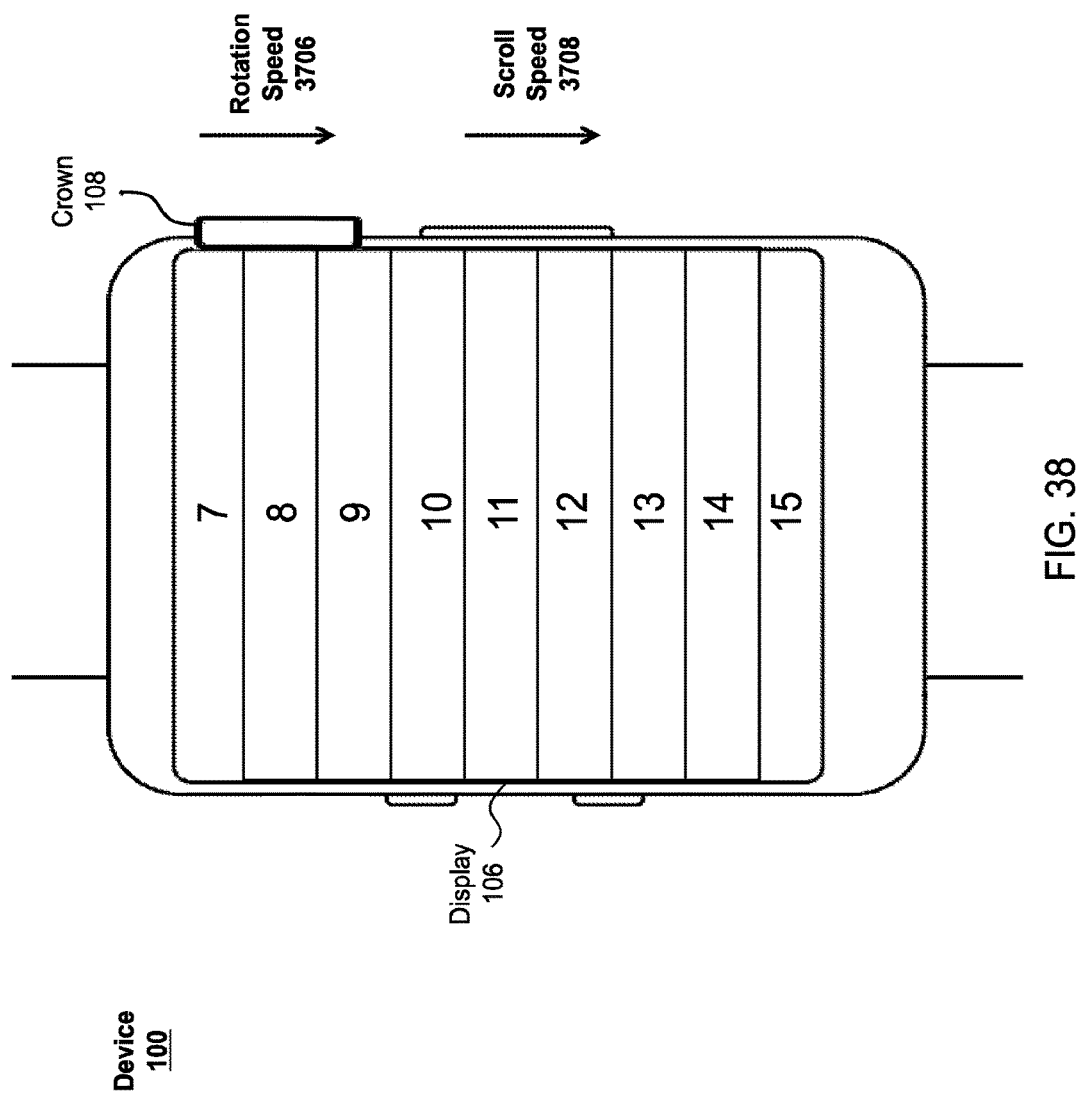

Referring now to FIG. 38, crown 108 is being rotated in the downward rotation direction with rotation speed 3706, which can be greater than rotation speed 3702. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 37), the new $\Delta V_{CROWN}$ value corresponding to rotation speed 3706 can be added to the previous scroll velocity value $V_{(T-1)}$ (e.g., having scroll speed 3704). Thus, as long as the new $\Delta V_{CROWN}$ value is greater than the $\Delta V_{DRAG}$ value, the new scroll speed 3708 can be greater than scroll speed 3704. However, if the $\Delta V_{CROWN}$ value corresponding to rotation speed 3706 is less than the $\Delta V_{DRAG}$ value, the new scroll speed 3708 can be less than scroll speed 3704. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 38, this update has caused the lines of text to translate in the downward direction with scroll speed 3708. Since the $\Delta V_{CROWN}$ value corresponding to rotation speed 3706 is greater than the $\Delta V_{DRAG}$ value, scroll speed 3708 can be greater than scroll speed 3704. As a result, the lines of text have been translated a greater distance over the same length of time, causing a full line of text to be translated vertically off the display.

Figure 39:
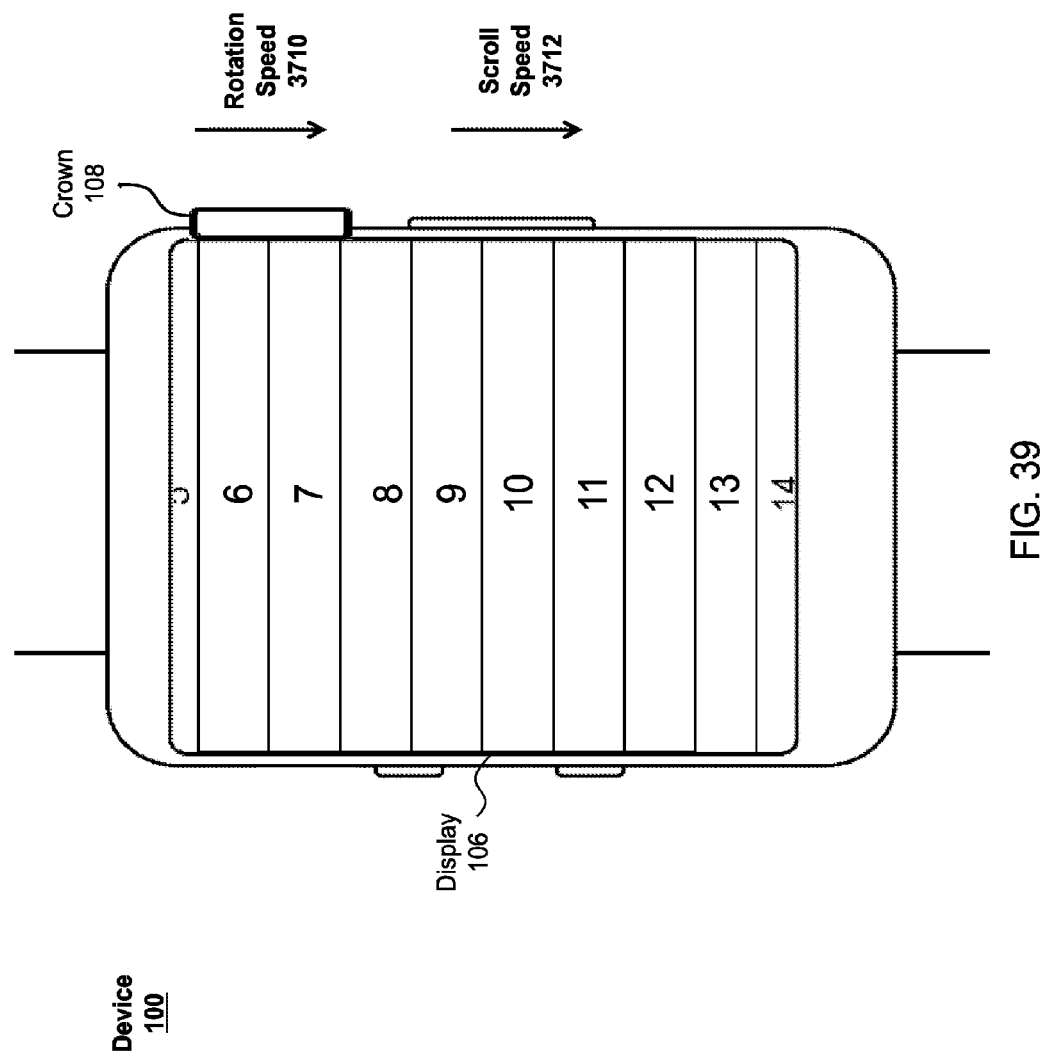

Referring now to FIG. 39, crown 108 is being rotated in the downward rotation direction with rotation speed 3710, which can be greater than rotation speed 3706. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 38), the new $\Delta V_{CROWN}$ value corresponding to rotation speed 3710 can be added to the previous scroll velocity value $V_{(T-1)}$ (e.g., having scroll speed 3708). Thus, as long as the new $\Delta V_{CROWN}$ value is greater than the $\Delta V_{DRAG}$ value, the new scroll speed 3712 can be greater than scroll speed 3708. However, if the $\Delta V_{CROWN}$ value corresponding to rotation speed 3710 is less than the $\Delta V_{DRAG}$ value, the new scroll speed 3712 can be less than scroll speed 3708. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 39, this update has caused the lines of text to translate in the downward direction with scroll speed 3712. Since the $\Delta V_{CROWN}$ value corresponding to rotation speed 3710 is greater than the $\Delta V_{DRAG}$ value, scroll speed 3712 can be greater than scroll speed 3708. As a result, the lines of text have been translated a greater distance over the same length of time, causing 1.5 lines of text to be translated vertically off the display.

Figure 40:
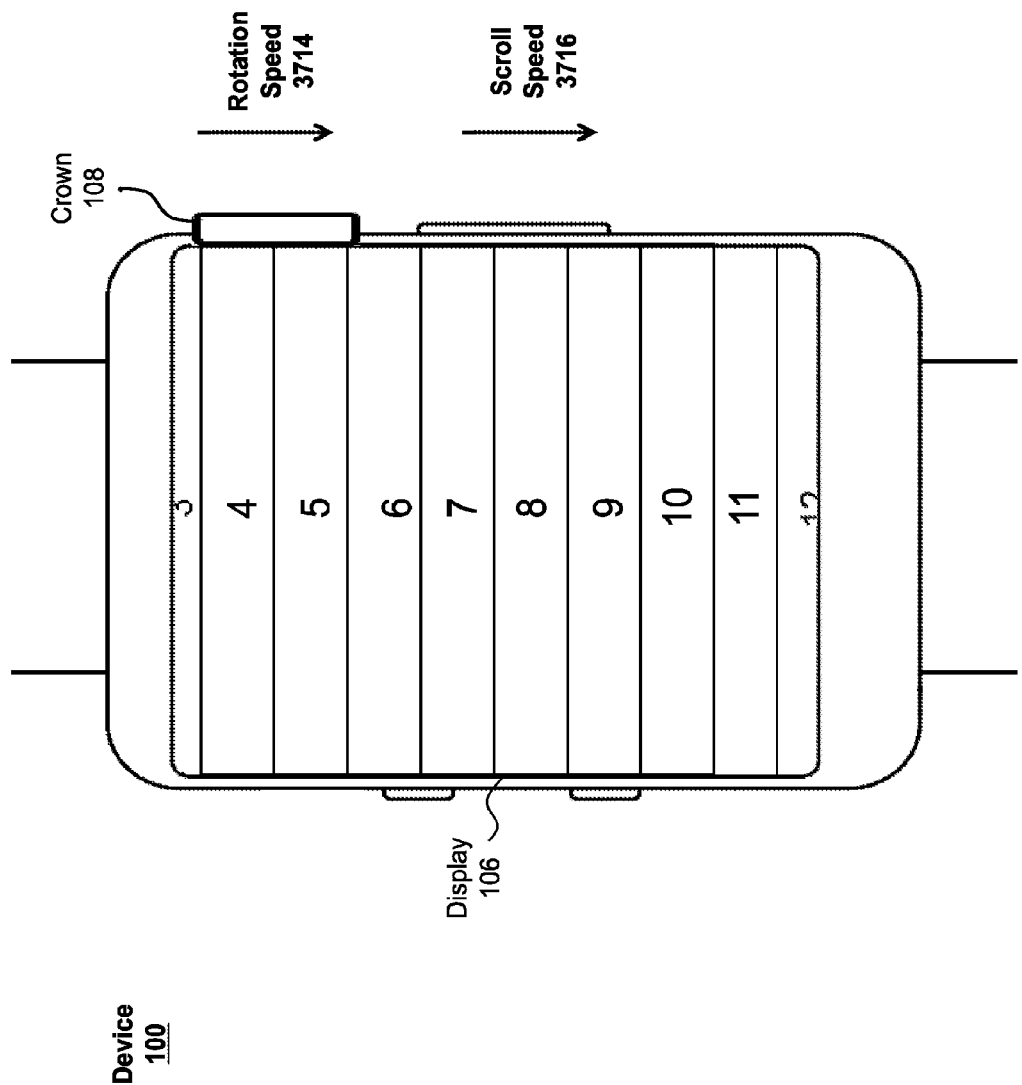

Referring now to FIG. 40, crown 108 is being rotated in the downward rotation direction with rotation speed 3714, which can be greater than rotation speed 3710. Processor 202 can again receive crown position information that reflects this rotation from encoder 204 at block 2104. Thus, at block 2110, processor 202 can convert this rotation speed into a $\Delta V_{CROWN}$ value to determine the new velocity of scrolling $V_T$. Since the display previously had a non-zero scroll speed value (e.g., as shown in FIG. 39), the new $\Delta V_{CROWN}$ value corresponding to rotation speed 3714 can be added to the previous scroll velocity value $V_{(T-1)}$ (e.g., having scroll speed 3712). Thus, as long as the new $\Delta V_{CROWN}$ value is greater than the $\Delta V_{DRAG}$ value, the new scroll speed 3716 can be greater than scroll speed 3712. However, if the $\Delta V_{CROWN}$ value corresponding to rotation speed 3714 is less than the $\Delta V_{DRAG}$ value, the new scroll speed 3716 can be less than scroll speed 3712. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 40, this update has caused the lines of text to translate in the downward direction with scroll speed 3716. Since the $\Delta V_{CROWN}$ value corresponding to rotation speed 3714 is greater than the $\Delta V_{DRAG}$ value, scroll speed 3716 can be greater than scroll speed 3712. As a result, the lines of text have been translated a greater distance over the same length of time, causing two lines of text to be translated vertically off the display.

While not shown, if the rotation of crown 108 stops, the view can continue to be scrolled in a downward direction in a manner similar to that described above with respect to FIGS. 35 and 36. The speed and amount of scroll that can be performed can depend on the scroll speed when the rotation of crown 108 stopped and the value used for $\Delta V_{DRAG}$.

While a specific scrolling example is provided, it should be appreciated that other types of data, such as media items, webpages, applications, or the like, can similarly be scrolled using process 2100 in a similar manner. For example, process 2100 can be performed to scroll through a list of applications in a manner similar to that described above with respect to process 300. However, the velocity of scrolling through the applications when using process 2100 can depend on the velocity of angular rotation of the crown.

Figure 41:
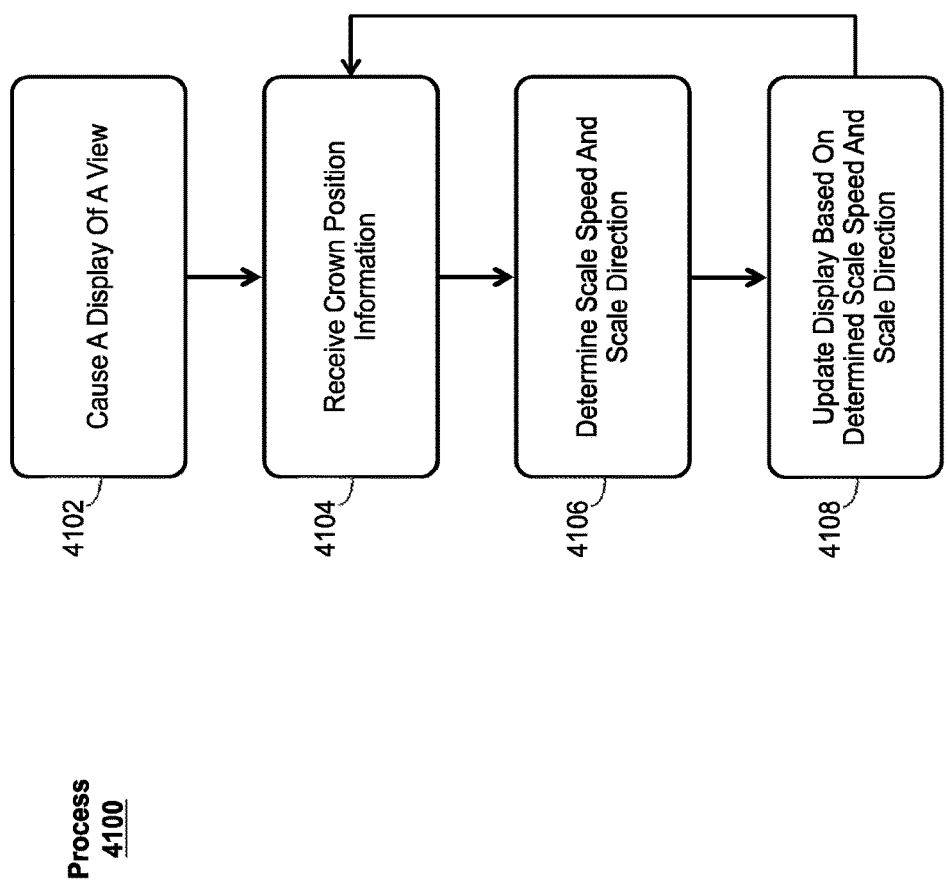
FIG. 41 illustrates an exemplary process for scaling a view of a display based on a angular velocity of rotation of a crown according to various examples.

FIG. 41 illustrates an exemplary process 4100 for scaling a view of a display based on an angular velocity of rotation of a crown according to various examples. The view can include a visual representation of any type of data being displayed. For example, the view can include a display of a text, a media item, a webpage, or the like. Process 4100 can be similar to process 2100, except that process 4100 can determine a scaling velocity (e.g., an amount and direction of change in size per unit time) rather than determine a scrolling velocity. While the quantities being determined are different, they can be determined in a similar manner. In some examples, process 4100 can be performed by a wearable electronic device similar to device 100. In these examples, content or any other view can be displayed on display 106 of device 100 and process 4100 can be performed to visually scale the view in response to a turning of crown 108.

At block 4102, a view of the display of the wearable electronic device can be displayed. As mentioned above, the view can include any visual representation of any type of data that is displayed by a display of the device.

At block 4104, crown position information can be received in a manner similar or identical to that described above with respect to block 902 of process 900. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 4106, the scale velocity (e.g., speed and positive/negative scaling direction) can be determined. In some examples, the scaling of a view can be determined using a physics-based modeling of motion. For example, the velocity of scaling can be treated as a velocity of a moving object. The rotation of the crown can be treated as a force being applied to the object in a direction corresponding to the direction of rotation of the crown, where the amount of force depends on the speed of angular rotation of the crown. As a result, the scaling velocity can increase or decrease and can move in different directions. For example, a greater speed of angular rotation can correspond to a greater amount of force being applied to the object. Any desired linear or non-linear mapping between speed of angular rotation and force being applied to the object can be used. In addition, a drag force can be applied in a direction opposite the direction of motion (e.g., scaling). This can be used to cause the velocity of scaling to decay over time, allowing the scaling to stop absent additional input from the user. Thus, the velocity of scaling at discrete moments in time can take the general form of:

$$V_T = V_{(T-1)} + \Delta V_{CROWN} - \Delta V_{DRAG}. \quad (1.2)$$

In equation 1.2, $V_T$ represents the determined scale velocity (speed and direction) at time T, $V_{(T-1)}$ represents the previous scale velocity (speed and direction) at time T−1, $\Delta V_{CROWN}$ represents the change in scale velocity caused by the force applied in response to the rotation of the crown, and $\Delta V_{DRAG}$ represents the change in scale velocity caused by the drag force opposing the motion of the scaling. As mentioned above, the force applied to the scaling by the crown can depend on the speed of angular rotation of the crown. Thus, $\Delta V_{CROWN}$ can also depend on the speed of angular rotation of the crown. Typically, the greater the speed of angular rotation of the crown, the greater the value of $\Delta V_{CROWN}$ will be. However, the actual mapping between the speed of angular rotation of the crown and $\Delta V_{CROWN}$ can be varied depending on the desired user feel of the scaling effect. In some examples, the $\Delta V_{DRAG}$ can depend on the velocity of scaling, such that at greater velocities, a greater opposing change in scaling can be produced. In other examples, $\Delta V_{DRAG}$ can have a constant value. However, it should be appreciated that any constant or variable amount of opposing change in velocity can be used to produce a desired scaling effect. Note, typically, in the absence of user input in the form of $\Delta V_{CROWN}$, $V_T$ will approach (and become) zero based on $\Delta V_{DRAG}$ in accordance with equation 1.2, but $V_T$ would not change signs without user input in the form of crown rotation ($\Delta V_{CROWN}$).

As can be seen from equation 1.2, the velocity of scaling can continue to increase as long as $\Delta V_{CROWN}$ is greater than $\Delta V_{DRAG}$. Additionally, the velocity of scaling can have non-zero values even when no $\Delta V_{CROWN}$ input is being received. Thus, if the view is scaling with a non-zero velocity, it can continue to scale without the user rotating the crown. The scale amount and time until the scaling stops can depend on the scale velocity at the time the user stops rotating the crown and the $\Delta V_{DRAG}$ component.

In some examples, when the crown is rotated in the opposite direction corresponding to a scale direction that is opposite the direction that the view is currently being scaled, the $V_{(T-1)}$ component can be reset to a value of zero, allowing the user to quickly change the direction of the scaling without having to provide a force sufficient to offset the current scale velocity of the view.

At block 4108, the display can be updated based on the scale speed and direction determined at block 4106. This can include scaling the view by an amount corresponding to the determined scale speed and in a direction (e.g., larger or smaller) corresponding to the determined scale direction. The process can then return to block 4104, where additional crown position information can be received.

It should be appreciated that blocks 4104, 4106, and 4108 can be repeatedly performed at any desired frequency to continually determine the speed of scaling and to update the display accordingly.

Figure 42:
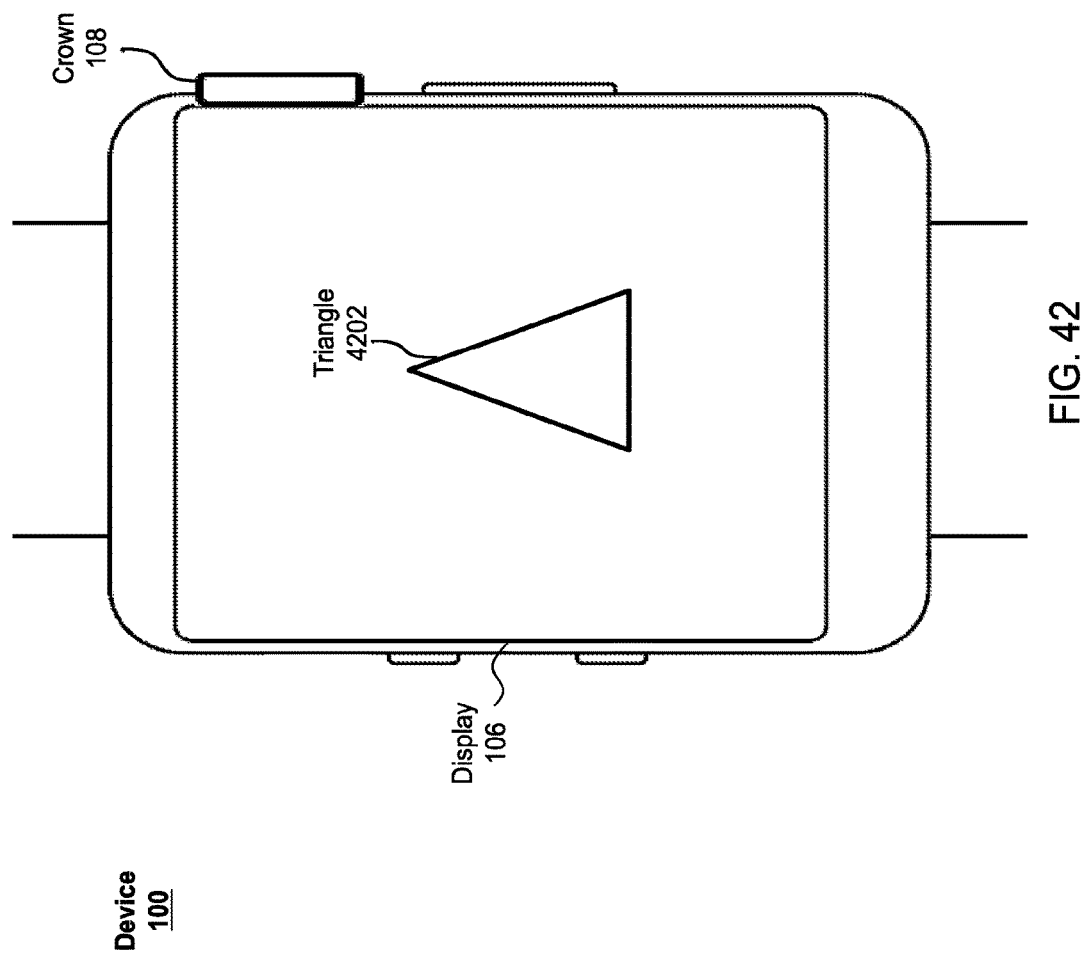
FIGS. 42-44 illustrate screens showing the scaling of a view of a display using the process of FIG. 41.

To further illustrate the operation of process 4100, FIG. 42 depicts an example interface of device 100 having an image of triangle 4202. At block 4102 of process 4100, processor 202 of device 100 can cause display 106 to display the illustrated triangle 4202. At block 4104, processor 202 can receive crown position information from encoder 204. At block 4106, a scale speed and scale direction can be determined. Since the current scroll velocity is zero and since crown 108 is not currently being rotated, it can be determined using equation 1.2 that the new velocity of scaling is zero. At block 4108, processor 202 can cause display 106 to update the display using the speed and direction determined at block 4106. However, since the determined velocity was zero, no change to the display need be made. For purposes of explanation, FIGS. 43 and 44 depict subsequent views of the interface shown in FIG. 42 at different points of time, where the length of time between each view is equal.

Figure 43:
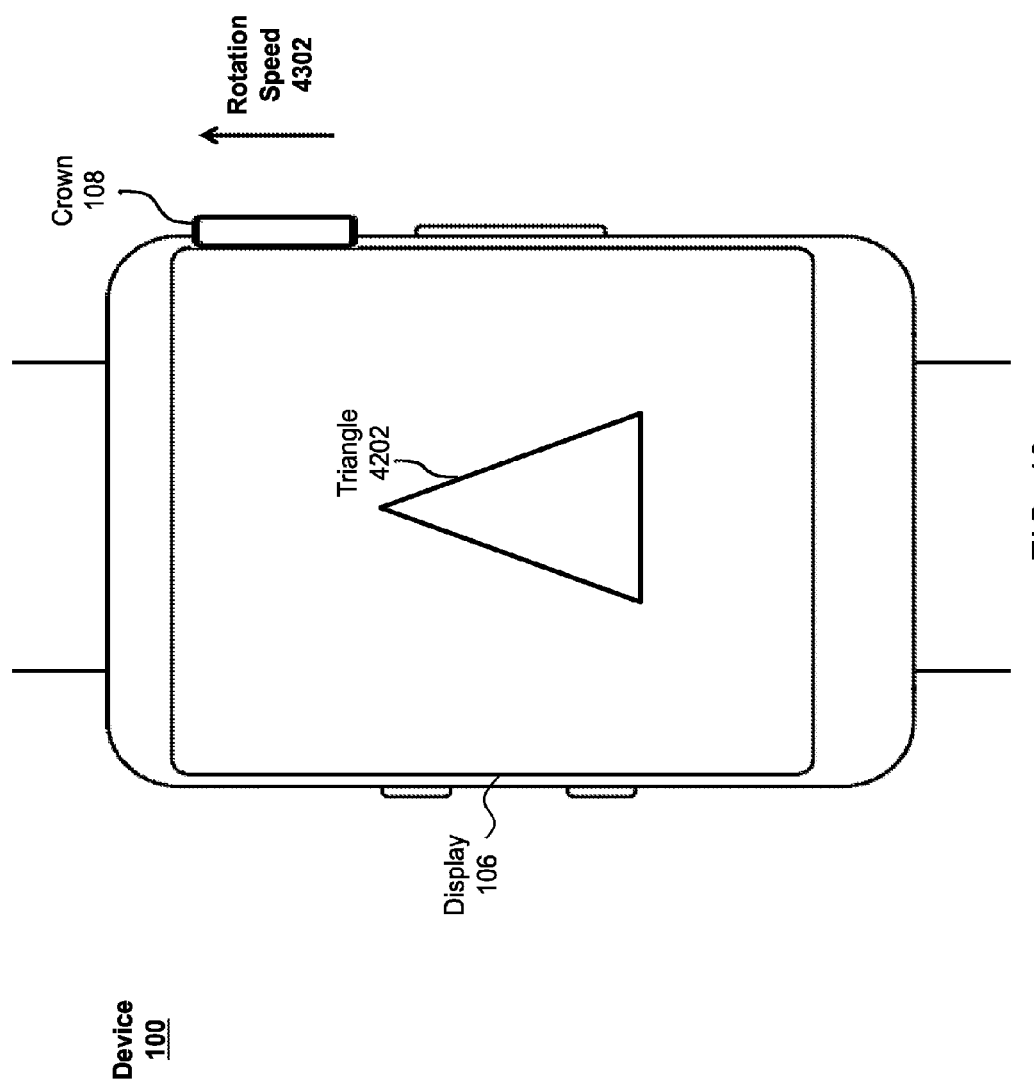
Figure 44:
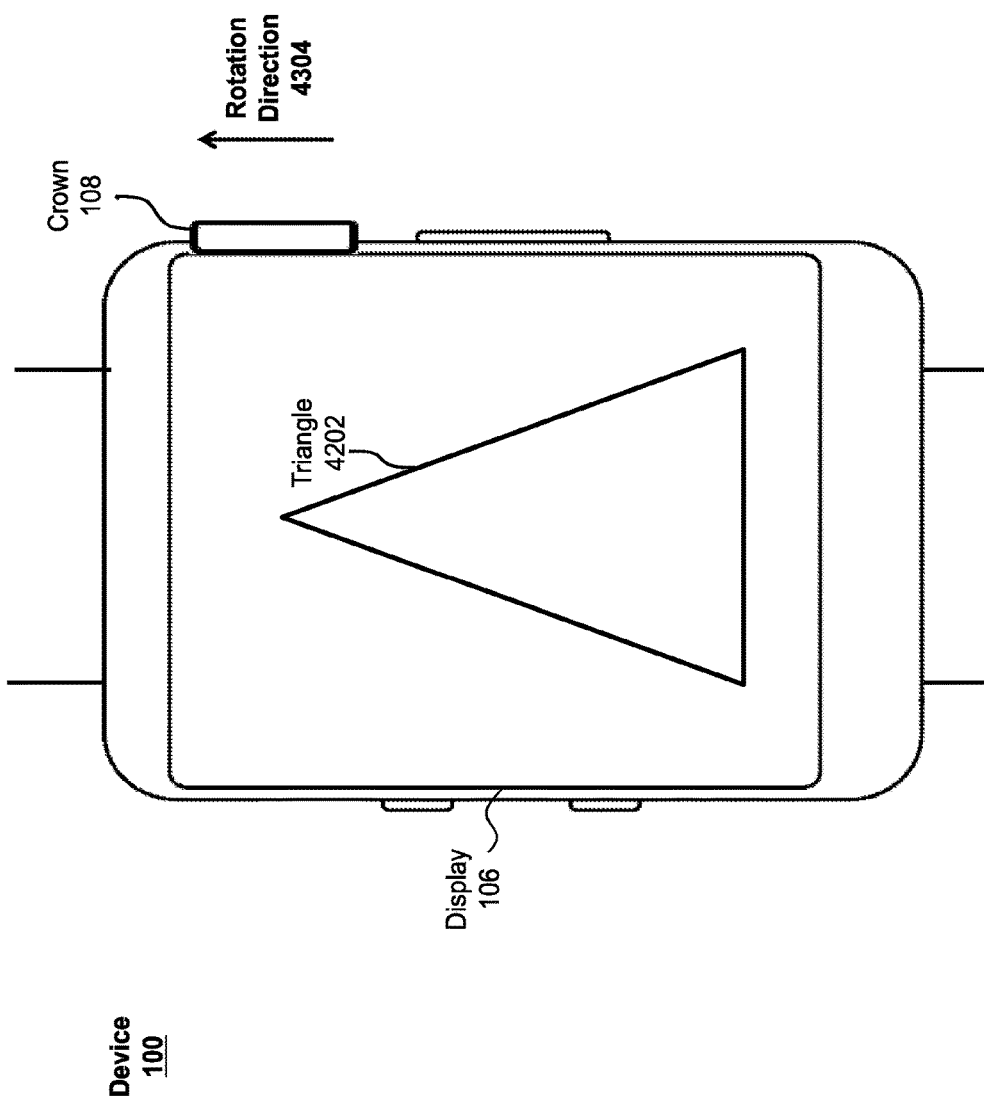

Referring now to FIG. 43, crown 108 is being rotated in the upward rotation direction with rotation speed 4302. Processor 202 can again receive crown position information that reflects this rotation from encoder 204 at block 4104. Thus, at block 4106, processor 202 can convert this rotation speed into a $\Delta V_{CROWN}$ value to determine the new velocity of scaling $V_T$. In this example, rotation of crown in the upward direction equates to a positive scaling direction (e.g., increasing the size of the view). In other examples, other directions can be used. At block 4108, processor 202 can cause display 106 to update the display based on the determined scale speed and direction. As shown in FIG. 43, this update has caused triangle 4202 to increase in size with a rate of change corresponding to the determined scale speed. Since crown 108 has only begun to rotate, rotation speed 4302 can be relatively low compared to typical rotation speeds of the crown. Thus, the scale speed can similarly have a relatively low value compared to typical or maximum scroll speeds. As a result, only a small change in size of triangle 4202 can be observed.

Referring now to FIG. 43, crown 108 is being rotated in the upward rotation direction with rotation speed 4304, which can be greater than rotation speed 4302. Processor 202 can again receive crown position information that reflects this rotation from encoder 204 at block 4104. Thus, at block 4106, processor 202 can convert this rotation speed into a $\Delta V_{CROWN}$ value to determine the new velocity of scaling $V_T$. Since the display previously had a non-zero scale velocity value (e.g., as shown in FIG. 43), the new $\Delta V_{CROWN}$ value corresponding to rotation speed 4304 can be added to the previous scale velocity value $V_{(T-1)}$. Thus, as long as the new $\Delta V_{CROWN}$ value is greater than the $\Delta V_{DRAG}$ value, the new scale velocity can be greater than the previous scale velocity. However, if the $\Delta V_{CROWN}$ value corresponding to rotation speed 4304 is less than the $\Delta V_{DRAG}$ value, the new scale velocity can be less than the previous scale velocity. In the illustrated example, the new $\Delta V_{CROWN}$ value is assumed to be greater than the $\Delta V_{DRAG}$ value. At block 4108, processor 202 can cause display 106 to update the display based on the determined scale speed and direction. As shown in FIG. 44, this update has caused triangle 4202 to increase in size with the determined scale velocity. Since the $\Delta V_{CROWN}$ value corresponding to rotation speed 4304 is greater than the $\Delta V_{DRAG}$ value, the scale velocity can be greater than the previous scale velocity. As a result, a larger change in size of triangle 4202 can be observed than that illustrated in FIG. 43.

Similar to the scrolling performed using process 2100, the scaling of the view containing triangle 4202 can continue after rotation of crown 108 has ceased. However, the rate at which the view containing triangle 4202 increases in size can decrease over time due to the $\Delta V_{DRAG}$ value of equation 1.2. Additionally, a similar scaling that decreases the size of the view containing triangle 4202 can be performed in response to crown 108 being rotated in the opposite direction. The velocity of the scaling can be calculated in a similar manner as that used to calculate the positive scaling shown in FIGS. 42-44. Moreover, similar to the scrolling performed using process 2100, the speed and direction of scaling can be set to zero in response to a rotation of crown 108 in a direction opposite the direction of scaling. This can be performed to allow the user to quickly change the direction of the scaling.

Moreover, in some examples, when reaching a minimum or maximum scaling of a view, the velocity scaling can reverse directions. For example, the velocity of scaling can cause the view to zoom-in with a non-zero speed. Upon reaching a scaling limit, the direction of the scaling can reverse to cause the view to scale in the opposite direction (e.g., zoom-out) with the same speed that the view was scaling prior to reaching the scaling limit.

In some examples, the scrolling or scaling performed in any of the processes described above (e.g., process 300, 900, 1500, 2100, or 4100) can be stopped in response to a change of context of the electronic device. A context can represent any condition that makes up the environment in which the crown position information is being received. For example, a context can include a current application being executed by the device, a type of application or process being displayed by the device, a selected object within a view of the device, or the like. To illustrate, if crown position information indicating that a change in position of crown 108 is being received while performing process 300, device 100 can scroll through a list of applications, as described above. However, in response to a change in context in the form of a user selecting one of the displayed applications, which causes device 100 to open the application, device 100 can cease to perform the previously occurring scrolling function of block 306 to prevent the scrolling function from being performed within the opened application. In some examples, after detecting a change in context, device 100 can also ignore inputs from crown 108 by ceasing to perform the scrolling function of block 306 even if crown 108 continues to be rotated. In some examples, device 100 can cease to perform the scrolling function of block 306 in response to a change in position of crown 108 for a threshold length of time after detecting a change in context. The threshold length of time can be any desired time, such as 1, 2, 3, 4, or more seconds. A similar behavior can also be performed in response to detecting a change in context while performing process 900 or 1500. For example, device 100 can cease to perform a previously occurring scrolling or scaling function in response to detecting a change in context. Additionally, in some examples after detecting a change in context, device 100 can also ignore inputs from crown 108 by ceasing to scroll or zoom a view in response to changes in position of crown 108 for a threshold length of time after detecting the change in context. A similar behavior can also be performed in response to detecting a change in context while performing blocks 2100 or 4100. For example, device 100 can stop a previously occurring scrolling or zooming function having a non-zero speed in response to detecting a change in context. Additionally, in some examples after detecting a change in context, device 100 can also ignore inputs from crown 108 by ceasing to scroll or zoom a view in response to changes in position of crown 108 for a threshold length of time after detecting the change in context. Stopping a scrolling or scaling function and/or ignoring future inputs from crown 108 in response to detecting a change in context can advantageously prevent an input entered while operating in one context from carrying over to another context in an undesired way. For example, a user can use crown 108 to scroll through a list of applications using process 300 and can select a desired music application while the momentum of crown 108 causes crown 108 to continue to spin. Without stopping the scrolling function and without ignoring inputs from crown 108 in response to detecting the change in context, device 100 can cause a scrolling function to be performed within the selected application or can interpret the input from crown 108 in another manner (e.g., to adjust a volume of the music application) unintended by the user.

In some examples, changes in certain types of contexts may not result in device 100 stopping an ongoing scrolling or scaling function and/or causing device 100 to ignore future inputs from crown 108. For example, if device 100 is simultaneously displaying multiple views or objects within display 106, selection between the displayed views or objects may not cause device 100 to stop the scrolling or scaling function and/or may not cause device 100 to ignore future inputs of crown 108, as described above. For example, device 100 can simultaneously display two sets of lines of text similar to that shown in FIG. 10. In this example, device 100 can scroll through one of the sets using process 900. In response to a user selection of the other set of lines of text (e.g., via a tap on the touch-sensitive display of device 100 at a location corresponding to the other set of lines of text), device 100 can begin to scroll through the other set of lines of text based on the previous scroll speed and/or current detected changes in position of crown 108. However, if a different type of change in context occurs (e.g., a new application is opened, an item not currently being displayed by device 100 is selected, or the like), device 100 can stop an ongoing scrolling or scaling function and/or can ignore inputs from crown 108 for a threshold length of time, as described above. In other examples, rather than begin to scroll through the other set of lines of text based on the previous scroll speed and/or the current change in position of crown 108 in response to a user selection of the other set of lines of text (e.g., via a tap on the touch-sensitive display of device 100 at a location corresponding to the other set of lines of text), device 100 can stop an ongoing scrolling or scaling function and/or can ignore inputs from crown 108 for a threshold length of time. However, the threshold length of time can be shorter than the threshold length of time used for changes in other types of changes in context (e.g., a new application is opened, an item not currently being displayed by device 100 is selected, or the like). While specific types of context changes are provided above, it should be appreciated that any type of context changes can be selected.

In some examples, device 100 can include a mechanism for detecting physical contact with crown 108. For example, device 100 can include a capacitive sensor configured to detect changes in capacitance caused by contact with crown 108, a resistive sensor configured to detect changes in resistance caused by contact with crown 108, a pressure sensor configured to detect a depression of crown 108 caused by contact with crown 108, a temperature sensor configured to detect a change in temperature of crown 108 caused by contact with crown 108, or the like. It should be appreciated that any desired mechanism for detecting contact with crown 108 can be used. In these examples, the presence or absence of contact with crown 108 can be used to stop the scrolling or scaling performed in any of the processes described above (e.g., process 300, 900, 1500, 2100, or 4100). For instance, in some examples, device 100 can be configured to perform scrolling or scaling functions as described above with respect to processes 300, 900, 1500, 2100, or 4100. In response to detecting an abrupt stop in the rotation of crown 108 (e.g., a stop or decrease in rotation speed that exceeds a threshold value) while contact with crown 108 is detected, device 100 can stop the scrolling or scaling being performed. This occurrence can represent the situation where the user quickly rotates crown 108, but intentionally brings it to a stop, indicating a desire to halt the scrolling or scaling. However, in response to detecting an abrupt stop in the rotation of crown 108 (e.g., a stop or decrease in rotation speed that exceeds a threshold value) while contact with crown 108 is not detected, device 100 can continue the scrolling or scaling being performed. This occurrence can represent the situation where the user quickly rotates crown 108 by performing a forward or backwards flicking gesture, removes their finger from crown 108, and rotates their wrist back in order to further wind crown 108 using another flicking gesture. In this situation, it is likely that the user does not intend for the scrolling or scaling to stop.

While processes 300, 900, 2100, ad 4100 have been described above as being used to perform scrolling or scaling of objects or views of a display, it should be appreciated that they can more generally be applied to adjust any type of value associated with the electronic device. For example, rather than scroll or scale a view in a particular direction in response to a change in position of crown 108, device 100 can instead increase a selected value (e.g., a volume, a time within a video, or any other value) by an amount or a speed in a manner similar to that described above for scrolling or scaling. Additionally, rather than scroll or scale a view in an opposite direction in response to a change in position of crown 108 in the opposite direction, device 100 can instead decrease the selected value by an amount or a speed in a manner similar to that described above for scrolling or scaling.

One or more of the functions relating to scaling or scrolling a user interface can be performed by a system similar or identical to system 4500 shown in FIG. 45. System 4500 can include instructions stored in a non-transitory computer readable storage medium, such as memory 4504 or storage device 4502, and executed by processor 4506. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 4500 can be included within device 100. In these examples, processor 4506 can be used as processor 202. Processor 4506 can be configured to receive the output from encoder 204, buttons 110, 112, and 114, and from touch-sensitive display 106. Processor 4506 can process these inputs as described above with respect to FIGS. 3, 9, 15, 21, and 41, and processes 300, 900, 1500, 2100, and 4100. It is to be understood that the system is not limited to the components and configuration of FIG. 45, but can include other or additional components in multiple configurations according to various examples.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A non-transitory computer-readable storage medium comprising instructions for:
  at an electronic device with a housing, a touch-sensitive display, and a physical crown that has a fixed axis about which the physical crown rotates relative to the touch-sensitive display and the housing:
    receiving crown position information associated with the physical crown of the electronic device including a rotational position of the physical crown;
    determining whether a rotation of the physical crown about the fixed axis relative to the touch-sensitive display and to the housing has occurred based on the received rotational position of the physical crown;
    in response to determining that the rotation of the physical crown has occurred about the fixed axis relative to the touch-sensitive display and to the housing, causing at least a portion of a first data displayed on the touch-sensitive display of the electronic device to be scrolled in a first direction parallel to the fixed axis about which the physical crown rotates relative to the touch-sensitive display and the housing;
    determining whether the rotation of the physical crown about the fixed axis relative to the touch-sensitive display and to the housing has stopped based on the received rotational position of the physical crown; and
    in response to determining that the rotation of the physical crown has stopped, causing at least the portion of the first data displayed on the touch-sensitive display of the electronic device to be scrolled in a second direction opposite the first direction parallel to the fixed axis about which the physical crown rotates relative to the touch-sensitive display and the housing.

2. The non-transitory computer-readable storage medium of claim 1, wherein the first data comprises all applications stored on the electronic device.

3. The non-transitory computer-readable storage medium of claim 1, wherein the first data comprises all open applications on the electronic device.

4. The non-transitory computer-readable storage medium of claim 1, wherein the first data comprises a user-generated set of applications on the electronic device.

5. The non-transitory computer-readable storage medium of claim 1, wherein the electronic device comprises a watch.

6. The non-transitory computer-readable storage medium of claim 1, wherein determining whether the rotation of the physical crown has occurred based on the received crown position information comprises determining an amount of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is proportional to the amount of rotation of the physical crown.

7. The non-transitory computer-readable storage medium of claim 1, wherein determining whether the rotation of the physical crown has occurred based on the received crown position information comprises determining a speed and a direction of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is based on the speed and direction of rotation of the physical crown.

8. The non-transitory computer-readable storage medium of claim 1, wherein the crown position information comprises a change in rotational position of the physical crown over a length of time.

9. The non-transitory computer-readable storage medium of claim 1, wherein the physical crown is a mechanical crown.

10. A computer-implemented method comprising:
at an electronic device with a housing, a touch-sensitive display, and a physical crown that has a fixed axis about which the physical crown rotates relative to the touch-sensitive display and the housing:
receiving crown position information associated with the physical crown of the electronic device including a rotational position of the physical crown;
determining whether a rotation of the physical crown about the fixed axis relative to the touch-sensitive display and to the housing has occurred based on the received rotational position of the physical crown;
in response to determining that the rotation of the physical crown has occurred about the fixed axis relative to the touch-sensitive display and to the housing, causing at least a portion of a first data displayed on the touch-sensitive display of the electronic device to be scrolled in a first direction parallel to the fixed axis about which the physical crown rotates relative to the touch-sensitive display and the housing;
determining whether the rotation of the physical crown about the fixed axis relative to the touch-sensitive display and to the housing has stopped based on the received rotational position of the physical crown; and
in response to determining that the rotation of the physical crown has stopped, causing at least the portion of the first data displayed on the touch-sensitive display of the electronic device to be scrolled in a second direction opposite the first direction parallel to the fixed axis about which the physical crown rotates relative to the touch-sensitive display and the housing.

11. The method of claim 10, wherein the first data comprises all applications stored on the electronic device.

12. The method of claim 10, wherein the first data comprises all open applications on the electronic device.

13. The method of claim 10, wherein the first data comprises a user-generated set of applications on the electronic device.

14. The method of claim 10, wherein the electronic device comprises a watch.

15. The method of claim 10, wherein determining whether the rotation of the physical crown has occurred based on the received crown position information comprises determining an amount of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is proportional to the amount of rotation of the physical crown.

16. The method of claim 10, wherein determining whether the rotation of the physical crown has occurred based on the received crown position information comprises determining a speed and a direction of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is based on the speed and direction of rotation of the physical crown.

17. The method of claim 10, wherein the crown position information comprises a change in rotational position of the physical crown over a length of time.

18. The method of claim 10, wherein the physical crown is a mechanical crown.

19. An electronic device comprising:
a housing;
one or more processors;
a touch-sensitive display;
a physical crown that has a fixed axis about which the physical crown rotates relative to the touch-sensitive display and the housing operatively coupled to the one or more processors; and
the touch-sensitive display operatively coupled to the one or more processors, the one or more processors configured to:
receive crown position information associated with the physical crown of the electronic device including a rotational position of the physical crown;
determine whether a rotation of the physical crown about the fixed axis relative to the touch-sensitive display and to the housing has occurred based on the received rotational position of the physical crown;
in response to determining that the rotation of the physical crown has occurred about the fixed axis relative to the touch-sensitive display and to the housing, cause at least a portion of a first data displayed on the touch-sensitive display of the electronic device to be scrolled in a first direction parallel to the fixed axis about which the physical crown rotates relative to the touch-sensitive display and the housing;
determine whether the rotation of the physical crown about the fixed axis relative to the touch-sensitive display and to the housing has stopped based on the received rotational position of the physical crown; and in response to determining that the rotation of the physical crown has stopped, cause at least the portion of the first data displayed on the touch-sensitive display of the electronic device to be scrolled in a second direction opposite the first direction parallel to the fixed axis about which the physical crown rotates relative to the touch-sensitive display and the housing.

20. The electronic device of claim 19, wherein the first data comprises all applications stored on the electronic device.

21. The electronic device of claim 19, wherein the first data comprises all open applications on the electronic device.

22. The electronic device of claim 19, wherein the first data comprises a user-generated set of applications on the electronic device.

23. The electronic device of claim 19, wherein the electronic device comprises a watch.

24. The electronic device of claim 19, wherein determining whether the rotation of the physical crown has occurred based on the received crown position information comprises determining an amount of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is proportional to the amount of rotation of the physical crown.

25. The electronic device of claim 19, wherein determining whether the rotation of the physical crown has occurred based on the received crown position information comprises determining a speed and a direction of rotation of the physical crown of the electronic device, and wherein causing at least the portion of the first data displayed on the touch-sensitive display of the electronic device to be scrolled comprises causing the touch-sensitive display to scroll through the at least the portion of the first data by a distance that is based on the speed and direction of rotation of the physical crown.

26. The electronic device of claim 19, wherein the crown position information comprises a change in rotational position of the physical crown over a length of time.

27. The electronic device of claim 19, wherein the physical crown is a mechanical crown.

* * * * *